(12) United States Patent
Yoshida et al.

(10) Patent No.: US 12,545,931 B2
(45) Date of Patent: *Feb. 10, 2026

(54) METHOD FOR TRANSFECTION INTO CARDIOMYOCYTES USING CATIONIC LIPID

(71) Applicant: Takeda Pharmaceutical Company Limited, Osaka (JP)

(72) Inventors: Yoshinori Yoshida, Kyoto (JP); Kenji Miki, Kyoto (JP); Satoru Matsumoto, Kanagawa (JP)

(73) Assignee: TAKEDA PHARMACEUTICAL COMPANY LIMITED, Osaka (JP)

(*) Notice: Subject to any disclaimer, the term of this patent is extended or adjusted under 35 U.S.C. 154(b) by 484 days.

This patent is subject to a terminal disclaimer.

(21) Appl. No.: 17/267,602

(22) PCT Filed: Aug. 8, 2019

(86) PCT No.: PCT/JP2019/031418
§ 371 (c)(1),
(2) Date: Feb. 10, 2021

(87) PCT Pub. No.: WO2020/032185
PCT Pub. Date: Feb. 13, 2020

(65) Prior Publication Data
US 2022/0145329 A1 May 12, 2022

(30) Foreign Application Priority Data
Aug. 10, 2018 (JP) ................................. 2018-151637

(51) Int. Cl.
*C12N 15/87* (2006.01)
*C12N 5/077* (2010.01)

(52) U.S. Cl.
CPC ........... *C12N 15/87* (2013.01); *C12N 5/0657* (2013.01); *C12N 2501/999* (2013.01); *C12N 2506/45* (2013.01); *C12N 2510/00* (2013.01); *C12N 2513/00* (2013.01)

(58) Field of Classification Search
CPC .................. C12N 15/87; C12N 5/0657; C12N 2501/999; C12N 2506/45; C12N 2510/00; C12N 2513/00
See application file for complete search history.

(56) References Cited

U.S. PATENT DOCUMENTS

| | | |
|---|---|---|
| 5,334,761 A | 8/1994 | Gebeyehu et al. |
| 5,965,404 A | 10/1999 | Buschle et al. |
| 6,235,310 B1 | 5/2001 | Wang et al. |
| 9,463,247 B2 | 10/2016 | Ansell et al. |
| 2003/0124727 A1 | 7/2003 | Gaucheron et al. |
| 2004/0043952 A1* | 3/2004 | Niedzinski ............ C07C 229/10 514/357 |
| 2006/0008910 A1 | 1/2006 | MacLachlan et al. |
| 2008/0145413 A1 | 6/2008 | Panzner et al. |
| 2010/0041152 A1 | 2/2010 | Wheeler et al. |
| 2010/0240731 A1 | 9/2010 | Adami et al. |
| 2012/0021044 A1 | 1/2012 | Oh et al. |
| 2013/0123485 A1 | 5/2013 | Park et al. |
| 2013/0149374 A1 | 6/2013 | Lee et al. |
| 2015/0064242 A1 | 3/2015 | Heyes et al. |
| 2015/0174261 A1 | 6/2015 | Kuboyama et al. |
| 2017/0197903 A1* | 7/2017 | Hoashi ............... A61K 31/7105 |
| 2017/0369846 A1 | 12/2017 | Yoshida et al. |
| 2018/0155304 A1 | 6/2018 | Nakai et al. |
| 2018/0185516 A1 | 7/2018 | Ansell et al. |
| 2020/0331841 A1 | 10/2020 | Matsumoto et al. |
| 2021/0052646 A1 | 2/2021 | Kuwae et al. |
| 2022/0098142 A1* | 3/2022 | Matsumoto ........... C07C 271/20 |
| 2023/0348361 A1 | 11/2023 | Zhang et al. |

FOREIGN PATENT DOCUMENTS

| | | |
|---|---|---|
| CN | 104672311 A | 6/2015 |
| CN | 106573877 A | 4/2017 |
| CN | 115850104 A | 3/2023 |
| CO | 4410255 A1 | 1/1997 |
| CO | 2020008972 A2 | 7/2020 |
| EA | 202091566 A1 | 9/2020 |
| EP | 3178807 A1 | 6/2017 |
| EP | 3733211 A1 | 11/2020 |
| EP | 3733844 A1 | 11/2020 |
| JP | 2010158206 A | 7/2010 |

(Continued)

OTHER PUBLICATIONS

Turnbull et al. "Myocardial delivery of lipidoid nanoparticle carrying modRNA induces rapid and transient expression." Molecular Therapy 24.1 (2016): 66-75 (Year: 2016).*
Jia et al., Reversed-Phase Liquid Chromatography-Quadrupole-Time-of-Flight Mass Spectrometry for High-Throughput Molecular Profiling of Sea Cucumber Cerebrosides. Lipids. Jul. 2015;50(7):667-79.
European Office Action for Application No. 19846186.5, dated May 6, 2022, 7 pages.
European Office Action for Application No. 19847498.3, dated May 11, 2022, 7 pages.
Singaporean Office Action for Application No. 11202101356Y, dated Jul. 5, 2022, 10 pages.
Russian Office Action for Application No. 2021105410, dated Feb. 10, 2022, 13 pages.
Yan, P. et al. (Jan. 30, 2009) "Cyclosporin-A potently induces highly cardiogenic progenitors from emryonic stem cells", Biochemical and Biophysical Research Communications, 379:115-120.

(Continued)

*Primary Examiner* — Fereydoun G Sajjadi
*Assistant Examiner* — Alexander W Nicol
(74) *Attorney, Agent, or Firm* — McCarter & English, LLP; David G. Conlin

(57) ABSTRACT

The present invention provides means which is excellent in efficiency with which a nucleic acid is introduced to cardiac muscle cells, especially a transfection method. A method for transfection of a nucleic acid into a cardiac muscle cell of the present invention comprises a step of contacting a composition comprising: a compound represented by the formula (I) or a salt thereof; a structured lipid; and a nucleic acid, with a cell population comprising cardiac muscle cells.

6 Claims, 1 Drawing Sheet

Specification includes a Sequence Listing.

(56) References Cited

FOREIGN PATENT DOCUMENTS

| | | | |
|---|---|---|---|
| JP | 2018-47872 | A | 3/2018 |
| MX | 2020006843 | A | 9/2020 |
| RU | 2014138476 | A | 4/2016 |
| SG | 11202006033 | Y | 7/2020 |
| TW | 201813632 | A | 4/2018 |
| TW | 201932446 | A | 8/2019 |
| TW | 202021945 | A | 6/2020 |
| WO | 2003102150 | A1 | 12/2003 |
| WO | 2003102150 | A2 | 12/2003 |
| WO | 2004/002453 | A1 | 1/2004 |
| WO | 2007002136 | A2 | 1/2007 |
| WO | 2009118928 | A1 | 10/2009 |
| WO | 2012/011693 | A2 | 1/2012 |
| WO | 2012/138453 | A1 | 10/2012 |
| WO | 2013086322 | A1 | 6/2013 |
| WO | 2014/007398 | A1 | 1/2014 |
| WO | 2014/071072 | A2 | 5/2014 |
| WO | 2015/074085 | A1 | 5/2015 |
| WO | 2015/095340 | A1 | 6/2015 |
| WO | 2015141827 | A1 | 9/2015 |
| WO | 2016021683 | A1 | 2/2016 |
| WO | 2018062413 | A1 | 4/2018 |
| WO | 2019131770 | A1 | 7/2019 |
| WO | 2019131829 | A1 | 7/2019 |
| WO | 2019131839 | A1 | 7/2019 |

OTHER PUBLICATIONS

Hayward, S. L., (2015) "Engineering of Lipid Nanoparticles for Advanced Drug Delivery Applications", DigitalCommons@University of Nebraska—Lincoln, Chemical & Biomolecular Engineering Theses, Dissertations & Student Research, 24.

International Search Report corresponding to International Application No. PCT/JP2019/031411 issued Oct. 29, 2019.

International Search Report corresponding to International Application No. PCT/JP2019/031418 issued Sep. 10, 2019.

Japanese Office Action for Application No. 2020-535882, dated Apr. 4, 2023, 7 pages.

Columbian Office Action for Application No. NC2021/0001745, dated Jul. 11, 2023, 21 pages.

Mexican Office Action for Application No. MX/a/2021/001654, dated Jun. 23, 2023, 10 pages.

Taiwan Office Action for Applicaiton No. 108128296, dated Jun. 14, 2023, 7 pages.

Chinese Office Action for Application No. 201980052837.1, dated Oct. 9, 2022, 17 pages.

Taiwan Office Action for Application No. 108128297, dated Oct. 11, 2023, 8 pages.

Dhaliwal et al., Intranasal Delivery and Transfection of mRNA Therapeutics in the Brain Using Cationic Liposomes. Mol Pharm. Jun. 1, 2020;17(6):1996-2005.

Tang et al., Cell-Selective Messenger RNA Delivery and CRISPR/Cas9 Genome Editing by Modulating the Interface of Phenylboronic Acid-Derived Lipid Nanoparticles and Cellular Surface Sialic Acid. ACS Appl Mater Interfaces. Dec. 18, 2019;11(50):46585-46590.

European Office Action for Application No. 19847498.3, dated Jun. 21, 2024, 134 pages.

Chinese Office Action for Application No. 202311153246.8, dated Jun. 3, 2025, 17 pages.

Columbian Office Action for Application No. NC2021/0001745, dated Mar. 8, 2024, 18 pages.

US Office Action for U.S. Appl. No. 17/267,179, dated May 3, 2024, 32 pages.

U.S. Appl. No. 17/267,179, filed Feb. 9, 2021, 2022-0098142, Published.

* cited by examiner

[Figure 1]
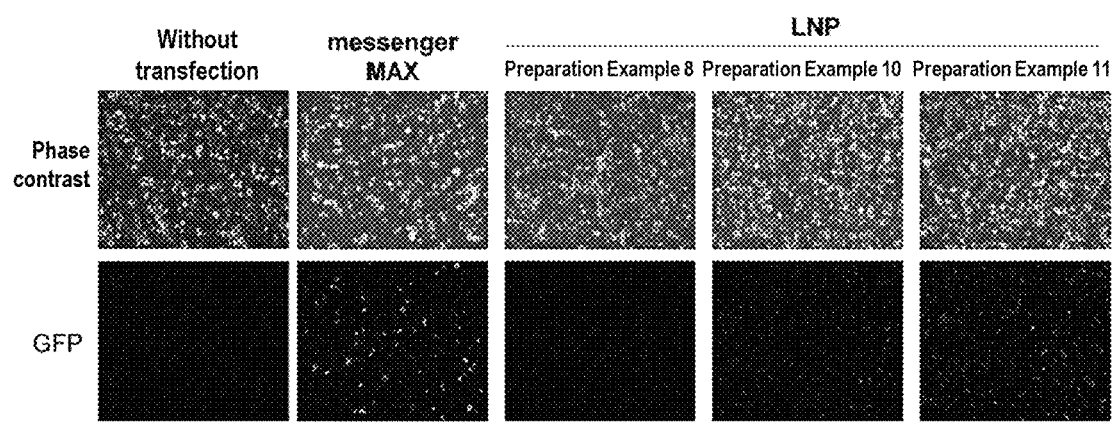
[Figure 2]
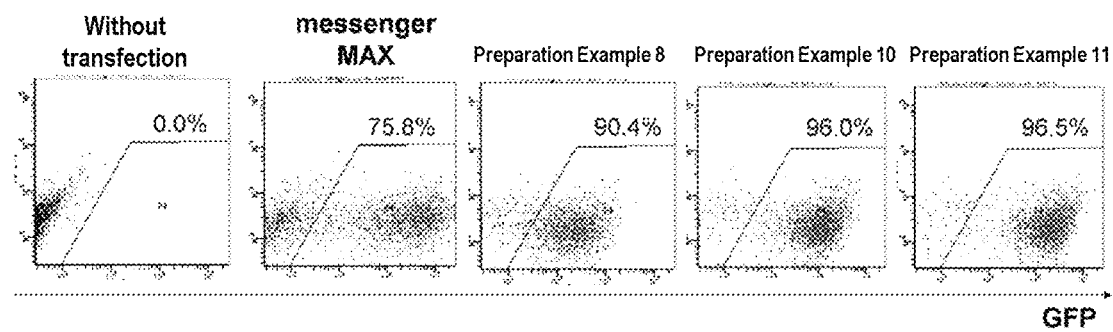

METHOD FOR TRANSFECTION INTO CARDIOMYOCYTES USING CATIONIC LIPID

RELATED APPLICATIONS

This application is a national stage application filed under 35 U.S.C. § 371 of International Patent Application No. PCT/JP2019/031418, filed Aug. 8, 2019, which claims the benefit of and priority to JP2018-151637, filed Aug. 10, 2018, the entire contents of which are hereby expressly incorporated by reference herein.

The contents of the text file named "PT38-9036US_Sequence Listing.txt", which was created on Mar. 8, 2024 and is 6,700 bytes in size, are hereby incorporated by reference in their entireties and for all purposes.

TECHNICAL FIELD

The present invention relates to a composition capable of introducing a nucleic acid to a cardiac muscle cell. The present invention further relates to a method for transfection of a nucleic acid into a cardiac muscle cell using such a composition, a method for purifying cardiac muscle cells and a method for producing cardiac muscle cells.

BACKGROUND ART

Cardiac muscle cells lose the division potential thereof simultaneously with birth, and are difficultly regenerated. Thus, substitution therapy, in which cardiac muscle cells obtained by differentiating cells such as embryonic stem cells (ES cells) or induced pluripotent stem cells (iPS cells) having pluripotency are transplanted into cardiac tissues damaged due to myocardial infarction, myocarditis, aging or the like, attracts attention in recent years. Many methods for differentiating these pluripotent stem cells into cardiac muscle cells have been reported (Patent Literature 1, Patent Literature 2, Patent Literature 3, and Non Patent Literature 1). However, the purity of cardiac muscle cells needs to be enhanced by sorting, or the like to be used as cells for transplant.

Many methods for sorting cardiac muscle cells using surface markers corresponding to cardiac muscle cells or cardiac muscle progenitor cells have been used heretofore as methods for sorting cardiac muscle cells. For example, Patent Literature 4 discloses that cardiac muscle cells contained in a cell population differentiated from pluripotent stem cells, etc. can be purified using "miRNA-responsive off-switch miRNA" corresponding to mRNA specifically expressed in cardiac muscle cells.

Meanwhile, for example, Non Patent Literature 2 discloses that fluorescence was observed in cultured cardiac muscle cells by transfecting FITC-dextran encapsulated in a lipid nanoparticle (LNP) formed by L-α-phosphatidylcholine (PC), 1,2-dipalmitoyl-sn-glycero-3-phopshoethanolamine (DPPE), and cholesterol (CHOL) into the cardiac muscle cells as to the introduction of a desired substance to cardiac muscle cells (transfection).

CITATION LIST

Patent Literature

Patent Literature 1: WO 2007/002136
Patent Literature 2: WO 2009/118928
Patent Literature 3: JP 2010-158206 A
Patent Literature 4: WO 2015/141827

Non Patent Literature

Non Patent Literature 1: Yan P, et al, Biochem Biophys Res Commun. 379:115-20 (2009)
Non Patent Literature 2: Stephen L. Hayward [Univ. Nebraska-Lincoln] (Digital Commons @University of Nebraska-Lincoln, 2015)

SUMMARY OF INVENTION

Technical Problem

An object of the present invention is to provide means which can be used to implement a method described, for example in the above-mentioned Patent Literature 4, and is excellent in efficiency with which a nucleic acid is introduced to a cardiac muscle cell, especially a transfection method. From another viewpoint, an object of the present invention is to provide a method for purifying cardiac muscle cells and a method for producing cardiac muscle cells using such means.

Solution to Problem

The present inventors have conducted diligent studies to attain the objects and consequently completed the present invention by finding that the use of lipid particles formed by a compound represented by the formula given below (one of cationic lipids) or a salt thereof and another structured lipid can efficiently introduce a nucleic acid to a cardiac muscle cell and attain the objects.

Specifically, the present invention relates to at least the following aspects.

[1]

A method for transfection of a nucleic acid into a cardiac muscle cell, comprising a step of contacting a composition comprising:

1) a compound represented by the formula (I):

[Formula 1]

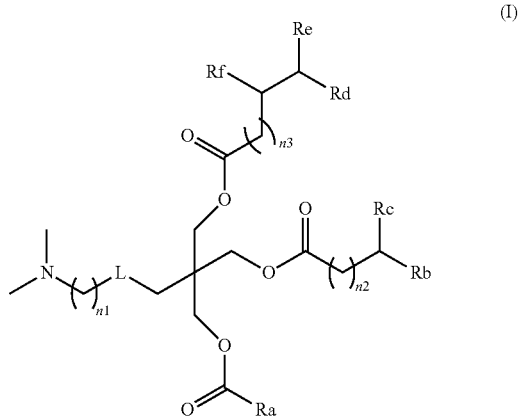

wherein n1 represents an integer of 2 to 6, n2 represents an integer of 0 to 2, n3 represents an integer of 0 to 2, L represents —C(O)O— or —NHC(O)O—, Ra represents a linear $C_{5-13}$ alkyl group, a linear $C_{13-17}$ alkenyl group or a linear $C_{17}$ alkadienyl group, Rb represents a linear $C_{2-9}$ alkyl group, Rc represents a hydrogen atom or a linear $C_{2-9}$ alkyl group,
Rd represents a hydrogen atom or a linear $C_{2-9}$ alkyl group,
Re represents a linear $C_{2-9}$ alkyl group, and
Rf represents a linear $C_{2-9}$ alkyl group,
or a salt thereof,
  2) a structured lipid; and
  3) a nucleic acid,
with a cell population comprising cardiac muscle cells.

[2]

The method according to item 1, wherein the nucleic acid is an mRNA.

[3]

The method according to item 2, wherein the mRNA comprises:
  (i) a cardiac muscle cell-specific miRNA-responsive mRNA comprising: a nucleotide sequence specifically recognized by miRNA specifically expressed in the cardiac muscle cells; and a nucleotide sequence encoding a functional gene; and/or
  (ii) an mRNA comprising a nucleotide sequence encoding a functional gene.

[4]

The method according to item 2, wherein the mRNA comprises:
  (i) a ventricular muscle cell-specific miRNA-responsive mRNA comprising: a nucleotide sequence specifically recognized by miRNA specifically expressed in ventricular muscle cells; and a nucleotide sequence encoding a functional gene; and/or
  (ii) an mRNA comprising a nucleotide sequence encoding a functional gene.

[5]

The method according to item 3 or 4, wherein the functional genes of the (i) and the (ii) are each independently one or more genes selected from the group consisting of a drug resistance gene, a gene encoding a fluorescent protein, an apoptosis-inducing gene, and a suicide gene.

[6]

The method according to item 1, wherein the cell population comprising the cardiac muscle cells is a cell population comprising cardiac muscle cells differentiated from induced pluripotent stem cells, embryonic stem cells, or other stem cells.

[7]

A method for purifying cardiac muscle cells, comprising a step of contacting a composition comprising:
  1) a compound represented by the formula (I):

[Formula 2]

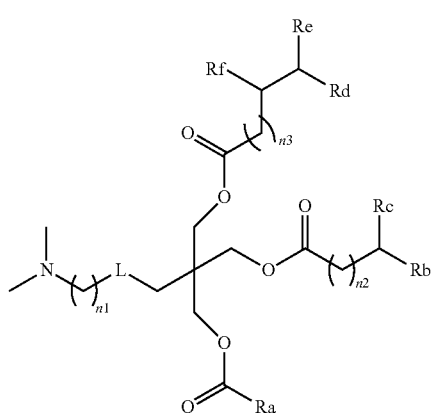

wherein n1 represents an integer of 2 to 6, n2 represents an integer of 0 to 2, n3 represents an integer of 0 to 2,
L represents —C(O)O— or —NHC(O)O—,
Ra represents a linear $C_{5-13}$ alkyl group, a linear $C_{13-17}$ alkenyl group or a linear $C_{17}$ alkadienyl group,
Rb represents a linear $C_{2-9}$ alkyl group,
Rc represents a hydrogen atom or a linear $C_{2-9}$ alkyl group,
Rd represents a hydrogen atom or a linear $C_{2-9}$ alkyl group,
Re represents a linear $C_{2-9}$ alkyl group, and
Rf represents a linear $C_{2-9}$ alkyl group,
or a salt thereof;
  2) a structured lipid; and
  3) an mRNA,
with a cell population comprising cardiac muscle cells, wherein the mRNA comprises:
  (i) a cardiac muscle cell-specific miRNA-responsive mRNA comprising: a nucleotide sequence specifically recognized by miRNA specifically expressed in the cardiac muscle cells; and a nucleotide sequence encoding a functional gene; and/or
  (ii) an mRNA comprising a nucleotide sequence encoding a functional gene.

[8]

A method for purifying ventricular muscle cells, comprising a step of contacting a composition comprising:
  1) a compound represented by the formula (I):

[Formula 3]

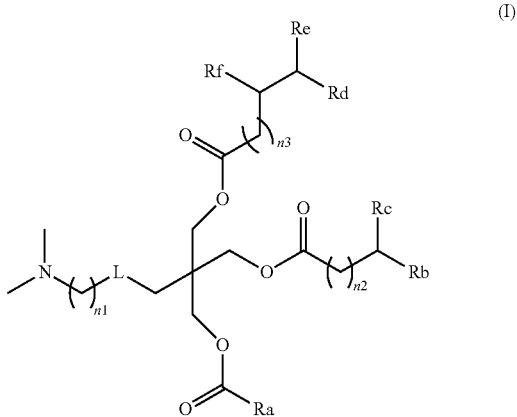

wherein n1 represents an integer of 2 to 6, n2 represents an integer of 0 to 2, n3 represents an integer of 0 to 2,
L represents —C(O)O— or —NHC(O)O—,
Ra represents a linear $C_{5-13}$ alkyl group, a linear $C_{13-17}$ alkenyl group or a linear $C_{17}$ alkadienyl group,
Rb represents a linear $C_{2-9}$ alkyl group,
Rc represents a hydrogen atom or a linear $C_{2-9}$ alkyl group,
Rd represents a hydrogen atom or a linear $C_{2-9}$ alkyl group,
Re represents a linear $C_{2-9}$ alkyl group, and
Rf represents a linear $C_{2-9}$ alkyl group,
or a salt thereof;
  2) a structured lipid; and
  3) an mRNA,
with a cell population comprising ventricular muscle cells, wherein the mRNA comprises:
  (i) a ventricular muscle cell-specific miRNA-responsive mRNA comprising: a nucleotide sequence specifically recognized by miRNA specifically expressed in the ventricular muscle cells; and a nucleotide sequence encoding a functional gene; and/or (ii) an mRNA comprising a nucleotide sequence encoding a functional gene.

[9]

A method for producing cardiac muscle cells, comprising a step of contacting a composition comprising:

1) a compound represented by the formula (I):

[Formula 4]

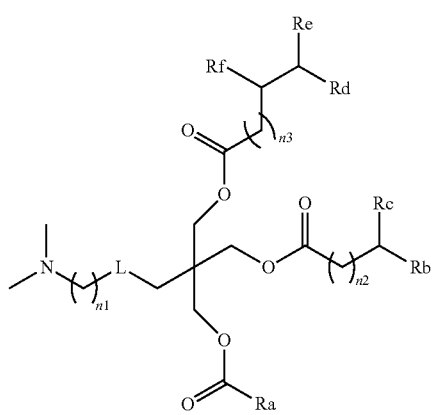

(I)

wherein n1 represents an integer of 2 to 6, n2 represents an integer of 0 to 2, n3 represents an integer of 0 to 2, L represents —C(O)O— or —NHC(O)O—, Ra represents a linear $C_{5-13}$ alkyl group, a linear $C_{13-17}$ alkenyl group or a linear $C_{17}$ alkadienyl group, Rb represents a linear $C_{2-9}$ alkyl group, Rc represents a hydrogen atom or a linear $C_{2-9}$ alkyl group, Rd represents a hydrogen atom or a linear $C_{2-9}$ alkyl group, Re represents a linear $C_{2-9}$ alkyl group, and Rf represents a linear $C_{2-9}$ alkyl group, or a salt thereof;

2) a structured lipid; and 3) an mRNA, with a cell population comprising cardiac muscle cells, wherein the mRNA comprises:

(i) a cardiac muscle cell-specific miRNA-responsive mRNA comprising: a nucleotide sequence specifically recognized by miRNA specifically expressed in the cardiac muscle cells; and a nucleotide sequence encoding a functional gene; and/or (ii) an mRNA comprising a nucleotide sequence encoding a functional gene.

[10]

A method for producing ventricular muscle cells, comprising a step of contacting a composition comprising:

1) a compound represented by the formula (I):

[Formula 5]

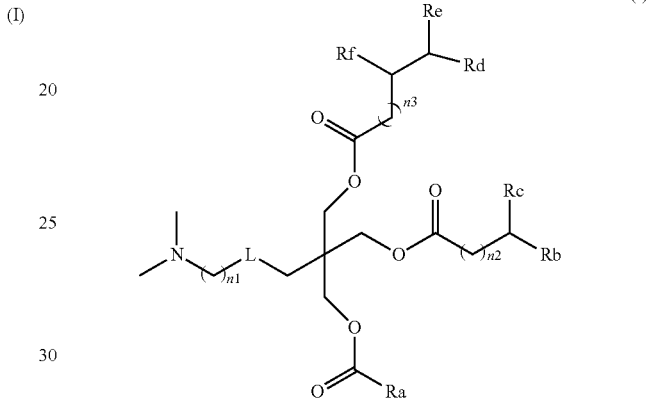

(I)

wherein n1 represents an integer of 2 to 6, n2 represents an integer of 0 to 2, n3 represents an integer of 0 to 2, L represents —C(O)O— or —NHC(O)O—, Ra represents a linear $C_{5-13}$ alkyl group, a linear $C_{13-17}$ alkenyl group or a linear $C_{17}$ alkadienyl group, Rb represents a linear $C_{2-9}$ alkyl group, Rc represents a hydrogen atom or a linear $C_{2-9}$ alkyl group, Rd represents a hydrogen atom or a linear $C_{2-9}$ alkyl group, Re represents a linear $C_{2-9}$ alkyl group, and Rf represents a linear $C_{2-9}$ alkyl group, or a salt thereof;

2) a structured lipid; and 3) an mRNA, with a cell population comprising ventricular muscle cells, wherein the mRNA comprises:

(i) a ventricular muscle cell-specific miRNA-responsive mRNA comprising: a nucleotide sequence specifically recognized by miRNA specifically expressed in the ventricular muscle cells; and a nucleotide sequence encoding a functional gene; and/or (ii) an mRNA comprising a nucleotide sequence encoding a functional gene.

[11]
A composition for transfection of a nucleic acid into a cardiac muscle cell, comprising:
1) a compound represented by the formula (I):

[Formula 6]

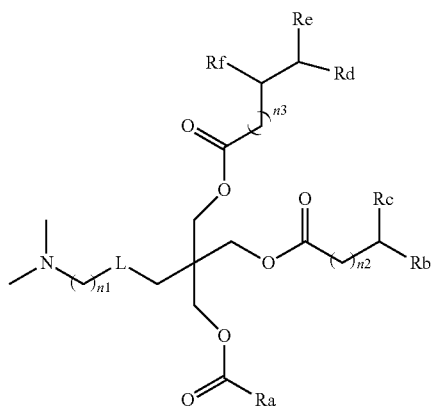

wherein n1 represents an integer of 2 to 6, n2 represents an integer of 0 to 2, n3 represents an integer of 0 to 2,
L represents —C(O)O— or —NHC(O)O—,
Ra represents a linear $C_{5-13}$ alkyl group, a linear $C_{13-17}$ alkenyl group or a linear $C_{17}$ alkadienyl group,
Rb represents a linear $C_{2-9}$ alkyl group,
Rc represents a hydrogen atom or a linear $C_{2-9}$ alkyl group,
Rd represents a hydrogen atom or a linear $C_{2-9}$ alkyl group,
Re represents a linear $C_{2-9}$ alkyl group, and
Rf represents a linear $C_{2-9}$ alkyl group,
or a salt thereof;
2) a structured lipid; and
3) a nucleic acid.

[12]
A kit for transfection of a nucleic acid into a cardiac muscle cell, comprising:
1) a compound represented by the formula (I):

[Formula 7]

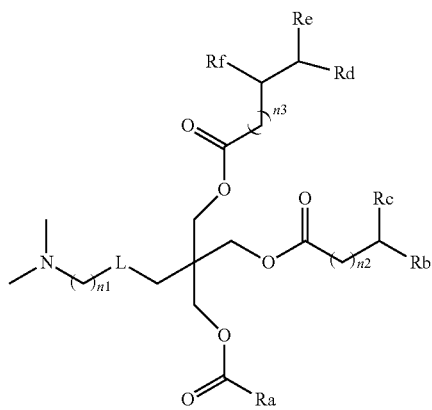

wherein n1 represents an integer of 2 to 6, n2 represents an integer of 0 to 2, n3 represents an integer of 0 to 2,
L represents —C(O)O— or —NHC(O)O—,
Ra represents a linear $C_{5-13}$ alkyl group, a linear $C_{13-17}$ alkenyl group or a linear $C_{17}$ alkadienyl group,
Rb represents a linear $C_{2-9}$ alkyl group,
Rc represents a hydrogen atom or a linear $C_{2-9}$ alkyl group,
Rd represents a hydrogen atom or a linear $C_{2-9}$ alkyl group,
Re represents a linear $C_{2-9}$ alkyl group, and
Rf represents a linear $C_{2-9}$ alkyl group,
or a salt thereof;
2) a structured lipid; and
3) a nucleic acid.

In the present specification, the "compound represented by the formula (I)" is also referred to as the "compound (I)". The "compound represented by formula (I) or salt thereof" is also referred to as the "compound of the present invention". The "lipid particle comprising (or containing) the compound represented by the formula (I) or the salt thereof (the compound of the present invention)" is also referred to as the "lipid particle of the present invention". The composition for transfection of a nucleic acid into a cardiac muscle cell, comprising the compound of the present invention, a structured lipid, and a nucleic acid is also referred to as the "composition of the present invention." The kit for transfection of a nucleic acid into a cardiac muscle cell, comprising the compound of the present invention, a structured lipid, and a nucleic acid is also referred to as the "kit of the present invention".

Advantageous Effects of Invention

The transfection method of the present invention enables various nucleic acids to be introduced to a cardiac muscle cell with excellent transfection efficiency. In such a transfection method, the use of a cardiac muscle cell-specific miRNA-responsive mRNA as a nucleic acid enables purifying cardiac muscle cells in a cell population efficiently, in other words, producing a purified cell population containing cardiac muscle cells efficiently.

Furthermore, in the transfection method of the present invention, the use of a specified cardiac muscle cell subtype (e.g., ventricular muscle cell)-specific miRNA-responsive mRNA as a nucleic acid enables purifying only a specified cardiac muscle cell subtype in a cell population efficiently.

BRIEF DESCRIPTION OF DRAWINGS

FIG. 1 is phase contrast micrographs and fluorescence micrographs on the day subsequent to the transfection of a green fluorescent protein (GFP) mRNA-containing lipid nanoparticle (LNP) prepared using "Messenger MAX" and GFP mRNA-containing LNPs prepared using compounds of the present invention (Preparation Examples 8, 10 and 11) into cell populations containing cardiac muscle cells derived from iPSCs in Examples.

FIG. 2 shows the results of flow cytometry analysis on the day subsequent to the transfection of the GFP mRNA-containing LNP prepared using "Messenger MAX" and the GFP mRNA-containing LNPs prepared using the compounds of the present invention (Preparation Examples 8, 10 and 11) into cell populations containing cardiac muscle cells derived from iPSCs in Examples.

DETAILED DESCRIPTION OF INVENTION

In the present specification, "transfection" means introducing any substance to the insides of cells. The insides of cells include at least the inside of cytoplasm and the insides of nuclei.

In the present specification, a "nucleic acid" (e.g., "mRNA") is introduced to the insides of cells by transfection. Although the amount of a nucleic acid used may vary depending on the conditions, the object, etc. of transfection, the amount of mRNA used is, for example, 1 ng to 100 μg, and preferably 100 ng to 5000 ng based on $1\times10^6$ cells.

"Culture" or "culturing" means, for example, maintaining, and proliferating and/or differentiating cells in a dish, a petri dish, a flask, or a culture tank outside tissues or the body.

"Pluripotency" means the ability to differentiate into tissues and cells having various different shapes and functions and differentiate into cells in any line of the three germinal layers. "Pluripotency" is distinguished from "totipotency", which may differentiate into any tissue of the living body including the germinal disk, in that "pluripotency" cannot differentiate into the germinal disk, and does not thus have the ability to form an individual.

"Multipotency" means the ability to differentiate into cells in a limited number of a plurality of lines. For example, mesenchymal stem cells, hematopoietic stem cells, or neural stem cells are not pluripotent but multipotent.

Examples of the "stem cells" include pluripotent stem cells.

In the present invention, usable "pluripotent stem cells" refers to stem cells which can differentiate into tissues and cells having various different shapes and functions of the living body and which have the ability to differentiate also into cells in any line of the three germinal layers (endoderm, mesoderm, and ectoderm). Examples thereof include, but are particularly limited to, embryonic stem cells (ESCs), embryonic stem cells derived from a cloned embryo obtained by nucleus transplant, sperm stem cells, embryonic germ cells, and induced pluripotent stem cells (in the present specification, occasionally referred to as "iPSCs").

In the present invention, usable "multipotent stem cells" refers to stem cells which have the ability to differentiate into cells in a limited number of a plurality of lines. In the present invention, examples of usable "multipotent stem cells" include dental pulp stem cells, stem cells derived from the oral mucous membrane, hair follicle stem cells, cultured fibroblasts, and somatic stem cells derived from bone marrow stem cells. Preferable pluripotent stem cells are ESCs and iPSCs.

"Induced pluripotent stem cells (iPSCs)" refer to cells obtained by introducing a specific factor (nucleus initializing factor) to mammal somatic cells or undifferentiated stem cells and reprogramming the mammal somatic cells or the undifferentiated stem cells. There are various "induced pluripotent stem cells" now. In addition to iPSCs established by Yamanaka et al. by introducing four factors which are Oct3/4, Sox2, Klf4, and c-Myc to mouse fibroblasts (Takahashi K, Yamanaka S., Cell (2006), 126: 663-676), human cell-derived iPSCs established by introducing the same four factors to human fibroblasts (Takahashi K, Yamanaka S., et al. Cell (2007), 131: 861-872); Nanog-iPS cells, which have been sorted using the expression of Nanog as an index after the introduction of the above-mentioned four factors and established (Okita, K., Ichisaka, T., and Yamanaka, S. (2007). Nature 448, 313-317); iPS cells produced by a method without c-Myc (Nakagawa M, Yamanaka S., et al. Nature Biotechnology (2008) 26, 101-106); and iPS cells established by introducing six factors by a virus-free method (Okita K et al. Nat. Methods 2011 May; 8(5):409-12, Okita K et al. Stem Cells. 31(3):458-66) can also be used. Induced pluripotent stem cells produced by Thomson et al. and established by introducing four factors which are OCT3/4, SOX2, NANOG, and LIN28 (Yu J., Thomson J A. et al., Science (2007) 318: 1917-1920); induced pluripotent stem cells produced by Daley et al. (Park I H, Daley G Q. et al., Nature (2007) 451: 141-146); induced pluripotent stem cells produced by Sakurada et al. (Japanese Patent Laid-Open No. 2008-307007); etc. can be used. In addition, all the induced pluripotent stem cells known in the art and described in all the exhibited papers (e.g., Shi Y., Ding S., et al., Cell Stem Cell, (2008) Vol 3, Issue 5, 568-574; Kim J B., Scholer H R., et al., Nature, (2008) 454, 646-650; and Huangfu D., Melton, D A., et al., Nature Biotechnology (2008), 26, No 7, 795-797), or all the patents (e.g., JP2008-307007, JP2008-283972, US2008-2336610, US2009-047263, WO2007-069666, WO2008-118220, WO2008-124133, WO2008-151058, WO2009-006930, WO2009-006997, and WO2009-007852) can be used.

As "induced pluripotent stem cells", various iPSC lines which NIH, Riken (Institute of Physical and Chemical Research), Kyoto University, etc. have established can be used. If the iPSCs are human iPSC lines, examples thereof include the HiPS-RIKEN-1A line, the HiPS-RIKEN-2A line, the HiPS-RIKEN-12A line, and the Nips-B2 line of Riken; and the 253G1 line, the 201B7 line, the 409B2 line, the 454E2 line, the 606A1 line, the 610B1 line, and the 648A1 line of Kyoto University. Alternatively, clinical grade cell lines provided from Kyoto University, Cellular Dynamics International, Inc., etc., cell lines for research and clinical use produced using those cell lines, etc. may be used.

If the "embryonic stem cells (ESCs)" are mouse ESCs, various mouse ESC lines established by inGenious targeting laboratory, Riken (Institute of Physical and Chemical Research), etc. can be used. If the "ESCs" are human ESCs, various human ESC lines established by NIH, Riken, Kyoto University, and Cellartis can be used. For example, as the human ESC lines, the CHB-1 to CHB-12 line, the RUES1 line, the RUES2 line, the HUES1 to HUES28 lines, etc. of NIH; the H1 line and the H9 line of WiCell Research; and the KhES-1 line, the KhES-2 line, the KhES-3 line, the KhES-4 line, the KhES-5 line, the SSES1 line, the SSES2 line, the SSES3 line, etc. of Riken can be used. Alternatively, clinical grade cell lines and cell lines for research and clinical use produced using those cell lines, etc. may be used.

In the present specification, the "cardiac muscle cell" contains one or more subtypes such as ventricular muscle cells, atrial muscle cells, and pacemaker cells unless otherwise specified particularly.

In the present specification, the "cell population containing cardiac muscle cells" means a cell population containing cardiac muscle cells and one or more types of cells other than cardiac muscle cells, and may be a cell population in the living body (in vivo), a cell population out of the living body (ex vivo), or a cultured cell population (in vitro). The cell population containing cardiac muscle cells may be a cell population contained in, for example, peripheral blood, the heart, myeloid tissue, adipose tissue, skeletal muscle tissue, amnion tissue, placenta tissue, cord blood, or the like existing in the living body or existing out of the living body by collection in any method or a cell population obtained by culturing cells capable of differentiating into cardiac muscle cells (e.g., stem cells, pluripotent stem cells, ESCs, or iPSCs) under conditions suitable for differentiation into cardiac muscle cells (including embryoids).

In the present specification, although the "a cell other than cardiac muscle cells" is not particularly limited, examples thereof include cells other than cardiac muscle cells contained in a living tissue or a culture from which the "cells containing cardiac muscle cells" are derived.

In one embodiment, the "cell population containing cardiac muscle cells" is a cell population containing cardiac muscle cells differentiated from iPSCs (including one or more subtypes) and cells other than cardiac muscle cells such as undifferentiated iPSCs.

In this specification, the "cell population containing ventricular muscle cells" is a cell population containing ventricular muscle cells and one or more type of cells other than ventricular muscle cells.

In this specification, although the "a cells other than ventricular muscle cells" is not particularly limited, examples thereof include subtypes of cardiac muscle cells other than ventricular muscle cells (e.g., atrial muscle cells and pacemaker cells) and cells other than cardiac muscle cells.

The "cardiac muscle cell", the "ventricular muscle cell", the "cell other than cardiac muscle cells", and the "cell other than ventricular muscle cells" in the present invention may be cells derived from humans, or may be cells derived from mammals other than humans (nonhuman mammals). Examples of the nonhuman mammals include a mouse, a rat, a hamster, a guinea pig, a rabbit, a dog, a cat, a pig, cattle, a horse, sheep, and a monkey.

In the present specification, the "a target cell" means a cardiac muscle cell or a specified subtype thereof to be transfected in the present invention (e.g., a ventricular muscle cell, an atrial muscle cell, a pacemaker cell, etc.).

In the present specification, "miRNA" is short chain non-coding RNA (usually 20 to 25 bases) which participates in gene expression regulation by preventing the translation from mRNA to a protein or decomposing mRNA and is present in cells. This miRNA is transcribed from DNA as single stranded pri-miRNA which can have a hairpin loop structure containing miRNA and its complementary strand, and a part thereof is cleaved off by an enzyme called Drosha and existing in nuclei, the pri-miRNA becomes pre-miRNA, which is transported out of nuclei and then further cleaved by dicer to function.

"Comprise(s) or comprising" means that the inclusion of elements following the word is indicated, but is not limited to the elements. Thus, although the word suggests the inclusion of the elements following the word, the word does not suggest the exclusion of other optional elements.

"Consist(s) of or consisting of" means the inclusion of all the elements following the phrase and the inclusion being limited to the elements. Thus, the phrase "consist(s) of or consisting of" indicates that the enumerated elements are demanded or indispensable, and other elements do not exist substantially. "Consist(s) essentially of or consisting essentially of" means the inclusion of any elements following the phrase and the elements being limited to other elements which do not influence the activity or the effect specified in the present disclosure. Thus, the phrase "consist(s) essentially of or consisting essentially of" indicates that the enumerated elements are demanded or indispensable, and the other elements are optionally selected, and may exist or may not exist depending on whether the other elements influence the activity or the effect of the enumerated elements.

Hereinafter, each substituent used in the present specification will be defined in detail. Each substituent has the following definition unless otherwise specified.

In the present specification, examples of the "linear $C_{5-13}$ alkyl group" include pentyl, hexyl, heptyl, octyl, nonyl, decanyl, undecanyl, dodecanyl, and tridecanyl.

In the present specification, examples of the "linear $C_{13-17}$ alkenyl group" include: 1-tridecenyl, 2-tridecenyl, 3-tridecenyl, 4-tridecenyl, 5-tridecenyl, 6-tridecenyl, 7-tridecenyl, 8-tridecenyl, 9-tridecenyl, 10-tridecenyl, 11-tridecenyl, and 12-tridecenyl; 1-tetradecenyl, 2-tetradecenyl, 3-tetradecenyl, 4-tetradecenyl, 5-tetradecenyl, 6-tetradecenyl, 7-tetradecenyl, 8-tetradecenyl, 9-tetradecenyl, 10-tetradecenyl, 11-tetradecenyl, 12-tetradecenyl, and 13-tetradecenyl; 1-pentadecenyl, 2-pentadecenyl, 3-pentadecenyl, 4-pentadecenyl, 5-pentadecenyl, 6-pentadecenyl, 7-pentadecenyl, 8-pentadecenyl, 9-pentadecenyl, 10-pentadecenyl, 11-pentadecenyl, 12-pentadecenyl, 13-pentadecenyl, and 14-pentadecenyl; 1-hexadecenyl, 2-hexadecenyl, 3-hexadecenyl, 4-hexadecenyl, 5-hexadecenyl, 6-hexadecenyl, 7-hexadecenyl, 8-hexadecenyl, 9-hexadecenyl, 10-hexadecenyl, 11-hexadecenyl, 12-hexadecenyl, 13-hexadecenyl, 14-hexadecenyl, and 15-hexadecenyl; and 1-heptadecenyl, 2-heptadecenyl, 3-heptadecenyl, 4-heptadecenyl, 5-heptadecenyl, 6-heptadecenyl, 7-heptadecenyl, 8-heptadecenyl, 9-heptadecenyl, 10-heptadecenyl, 11-heptadecenyl, 12-heptadecenyl, 13-heptadecenyl, 14-heptadecenyl, 15-heptadecenyl, and 16-heptadecenyl. These linear $C_{13-17}$ alkenyl groups contain one carbon-carbon double bond and may therefore assume cis and trans structures, any of which may be allowed.

In the present specification, examples of the "linear $C_{17}$ alkadienyl group" include 1,3-heptadecadienyl, 1,4-heptadecadienyl, 1,5-heptadecadienyl, 1,6-heptadecadienyl, 1,7-heptadecadienyl, 1,8-heptadecadienyl, 1,9-heptadecadienyl, 1,10-heptadecadienyl, 1,11-heptadecadienyl, 1,12-heptadecadienyl, 1,13-heptadecadienyl, 1,14-heptadecadienyl, 1,15-heptadecadienyl, 1,16-heptadecadienyl, 2,4-heptadecadienyl, 2,5-heptadecadienyl, 2,6-heptadecadienyl, 2,7-heptadecadienyl, 2,8-heptadecadienyl, 2,9-heptadecadienyl, 2,10-heptadecadienyl, 2,11-heptadecadienyl, 2,12-heptadecadienyl, 2,13-heptadecadienyl, 2,14-heptadecadienyl, 2,15-heptadecadienyl, 2,16-heptadecadienyl, 3,5-heptadecadienyl, 3,6-heptadecadienyl, 3,7-heptadecadienyl, 3,8-heptadecadienyl, 3,9-heptadecadienyl, 3,10-heptadecadienyl, 3,11-heptadecadienyl, 3,12-heptadecadienyl, 3,13-heptadecadienyl, 3,14-heptadecadienyl, 3,15-heptadecadienyl, 3,16-heptadecadienyl, 4,6-heptadecadienyl, 4,7-heptadecadienyl, 4,8-heptadecadienyl, 4,9-heptadecadienyl, 4,10-heptadecadienyl, 4,11-heptadecadienyl, 4,12-heptadecadienyl, 4,13-heptadecadienyl, 4,14-heptadecadienyl, 4,15-heptadecadienyl, 4,16-heptadecadienyl, 5,7-heptadecadienyl, 5,8-heptadecadienyl, 5,9-heptadecadienyl, 5,10-heptadecadienyl, 5,11-heptadecadienyl, 5,12-heptadecadienyl, 5,13-heptadecadienyl, 5,14-heptadecadienyl, 5,15-heptadecadienyl, 5,16-heptadecadienyl, 6,8-heptadecadienyl, 6,9-heptadecadienyl, 6,10-heptadecadienyl, 6,11-heptadecadienyl, 6,12-heptadecadienyl, 6,13-heptadecadienyl, 6,14-heptadecadienyl, 6,15-heptadecadienyl, 6,16-heptadecadienyl, 7,9-heptadecadienyl, 7,10-heptadecadienyl, 7,11-heptadecadienyl, 7,12-heptadecadienyl, 7,13-heptadecadienyl, 7,14-heptadecadienyl, 7,15-heptadecadienyl, 7,16-heptadecadienyl, 8,10-heptadecadienyl, 8,11-heptadecadienyl, 8,12-heptadecadienyl, 8,13-heptadecadienyl, 8,14-heptadecadienyl, 8,15-heptadecadienyl, 8,16-heptadecadienyl, 9,11-heptadecadienyl, 9,12-heptadecadienyl, 9,13-heptadecadienyl, 9,14-heptadecadienyl, 9,15-heptadecadienyl, 9,16-heptadecadienyl, 10,12-heptadecadienyl, 10,13-heptadecadienyl, 10,14-heptadecadienyl, 10,15-heptadecadienyl, 10,16-heptadecadienyl, 11,13-heptadecadienyl, 11,14-heptadecadienyl, 11,15-heptadecadienyl, 11,16-heptadecadienyl, 12,14-heptadecadienyl, 12,15- heptadecadienyl, 12,16-heptadecadienyl, 13,15-heptadecadienyl, 13,16-heptadecadienyl, and 14,16-heptadecadienyl. $C_{17}$ alkadienyl groups contain two carbon-carbon double bonds and may therefore assume cis and trans structures at each of the bonds independently, any of which may be allowed.

In the present specification, examples of the "linear $C_{2-9}$ alkyl group" include ethyl, butyl, propyl, pentyl, hexyl, heptyl, octyl, and nonyl.

Respective preferred examples of n1, n2, n3, L, Ra, Rb, Rc, Rd, Re, and Rf in the formula (I) are as follows.

n1 is preferably an integer of 3 to 5.
n2 is preferably an integer of 0 to 2.
n3 is preferably an integer of 0 to 2.
L is preferably —C(O)O—.
Ra is preferably a linear $C_{5-9}$ alkyl group, a linear $C_{13-17}$ alkenyl group or a linear $C_{17}$ alkadienyl group.
Rb is preferably a linear $C_{4-8}$ alkyl group.
Rc is preferably a hydrogen atom or a linear $C_{4-7}$ alkyl group.
Rd is preferably a hydrogen atom or a linear $C_{3-6}$ alkyl group.
Re is preferably a linear $C_{3-6}$ alkyl group.
Rf is preferably a linear $C_{3-7}$ alkyl group.

Preferred specific examples of the compound (I) are as follows.

Compound (I-A): a compound wherein n1 is an integer of 3 to 5, n2 is 0, n3 is an integer of 0 to 2, L is —C(O)O—, Ra is a linear $C_{5-9}$ alkyl group, Rb is a linear $C_{4-8}$ alkyl group, Rc is a hydrogen atom, Rd is a hydrogen atom, Re is a linear $C_{3-6}$ alkyl group, and Rf is a linear $C_{3-7}$ alkyl group.

Compound (I-B): a compound wherein n1 is an integer of 3 to 5, n2 is 0 or 1, n3 is 0 or 1, L is —C(O)O—, Ra is a linear $C_{5-9}$ alkyl group, Rb is a linear $C_{4-8}$ alkyl group, Rc is a linear $C_{5-7}$ alkyl group, Rd is a hydrogen atom, Re is a linear $C_{3-6}$ alkyl group, and Rf is a linear $C_{3-7}$ alkyl group.

Compound (I-C): a compound wherein n1 is an integer of 3 to 5, n2 is 0 or 1, n3 is an integer of 0 to 2, L is —C(O)O—, Ra is a linear $C_{5-9}$ alkyl group, Rb is a linear $C_{4-8}$ alkyl group, Rc is a hydrogen atom, Rd is a linear $C_{3-6}$ alkyl group, Re is a linear $C_{3-6}$ alkyl group, and Rf is a linear $C_{3-7}$ alkyl group.

Compound (I-D): a compound wherein n1 is an integer of 3 to 5, n2 is 0 or 1, n3 is an integer of 0 to 2, L is —C(O)O—, Ra is a linear $C_{13-17}$ alkenyl group or a linear $C_{17}$ alkadienyl group, Rb is a linear $C_{3-6}$ alkyl group, Rc is a linear $C_{3-6}$ alkyl group, Rd is a hydrogen atom, Re is a linear $C_{2-6}$ alkyl group, and Rf is a linear $C_{2-7}$ alkyl group.

More preferred specific examples of the compound (I) are as follows.

Compound (a): a compound wherein n1 is 3 or 4, n2 is 0, n3 is 0 or 2, L is —C(O)O—, Ra is a linear $C_7$ alkyl group, Rb is a linear $C_6$ alkyl group, Rc is a hydrogen atom, Rd is a hydrogen atom, Re is a linear $C_{5-6}$ alkyl group, and Rf is a linear $C_{6-7}$ alkyl group.

Compound (b): a compound wherein n1 is an integer of 3 to 5, n2 is 0 or 1, n3 is 0 or 1, L is —C(O)O—, Ra is a linear $C_{6-7}$ alkyl group, Rb is a linear $C_{5-6}$ alkyl group, Rc is a linear $C_{5-6}$ alkyl group, Rd is a hydrogen atom, Re is a linear $C_{4-5}$ alkyl group, and Rf is a linear $C_{5-6}$ alkyl group.

Compound (c): a compound wherein n1 is an integer of 3 to 5, n2 is 0, n3 is 2, L is —C(O)O—, Ra is a linear $C_{5-9}$ alkyl group, Rb is a linear $C_{4-8}$ alkyl group, Rc is a hydrogen atom, Rd is a linear $C_{3-5}$ alkyl group, Re is a linear $C_{3-5}$ alkyl group, and Rf is a linear $C_{3-5}$ alkyl group.

Compound (d): a compound wherein n1 is an integer of 3 to 5, n2 is 0 or 1, n3 is an integer of 0 to 2, L is —C(O)O—,
Ra is a linear $C_{13-17}$ alkenyl group or a linear $C_{17}$ alkadienyl group, Rb is a linear $C_{3-5}$ alkyl group, Rc is a linear $C_{3-5}$ alkyl group, Rd is a hydrogen atom, Re is a linear $C_{3-6}$ alkyl group, and Rf is a linear $C_{3-7}$ alkyl group.

The salt of the compound (I) is preferably a pharmacologically acceptable salt. Examples thereof include salts with inorganic bases, salts with organic bases, salts with inorganic acids, salts with organic acids, and salts with basic or acidic amino acids.

Preferred examples of the salts with inorganic bases include: alkali metal salts such as sodium salt and potassium salt; alkaline earth metal salts such as calcium salt and magnesium salt; aluminum salt; and ammonium salt. Sodium salt, potassium salt, calcium salt, and magnesium salt are preferred, and sodium salt and potassium salt are more preferred.

Preferred examples of the salts with organic bases include salts with trimethylamine, triethylamine, pyridine, picoline, ethanolamine, diethanolamine, triethanolamine, tromethamine [tris(hydroxymethyl)methylamine], tert-butylamine, cyclohexylamine, benzylamine, dicyclohexylamine, and N,N-dibenzylethylenediamine.

Preferred examples of the salts with inorganic acids include salts with hydrofluoric acid, hydrochloric acid, hydrobromic acid, hydroiodic acid, nitric acid, sulfuric acid, and phosphoric acid. Salts with hydrochloric acid and salts with phosphoric acid are preferred.

Preferred examples of the salts with organic acids include salts with formic acid, acetic acid, trifluoroacetic acid, phthalic acid, fumaric acid, oxalic acid, tartaric acid, maleic acid, citric acid, succinic acid, malic acid, methanesulfonic acid, benzenesulfonic acid, and p-toluenesulfonic acid.

Preferred examples of the salts with basic amino acids include salts with arginine, lysine, and ornithine.

Preferred examples of the salts with acidic amino acids include salts with aspartic acid and glutamic acid.

A composition of the present invention will be described hereinafter.

In a transfection method, a purification method, and a production method according to the present invention, a predetermined nucleic acid is introduced to cardiac muscle cells using the composition for transfecting a nucleic acid into a cardiac muscle cell, comprising: 1) the compound represented by the formula (I) or the salt thereof (the compound of the present invention); 2) a structured lipid; and 3) the nucleic acid, i.e., the composition of the present invention.

In a typical embodiment of the present invention, the compound of the present invention and the structured lipid contained in the composition of the present invention form a lipid particle, and the nucleic acid is encapsulated in this lipid particle.

As long as the "structured lipid" is mixed with the compound of the present invention to prepare a mixed lipid component, and the mixed lipid component can then form a lipid particle, the "structured lipid" is not particularly limited. For example, at least one member selected from the group consisting of:

sterols (e.g., cholesterol, cholesterol ester, and cholesteryl hemisuccinate);
phospholipids (e.g., phosphatidylcholines (e.g., dipalmitoylphosphatidylcholine, distearoylphosphatidylcholine, lysophosphatidylcholine, dioleoylphosphatidylcholine, palmitoyloleoylphosphatidylcholine, dilinolenoylphosphatidylcholine, MC-1010 (NOF Corporation), MC-2020 (NOF Corporation), MC-4040 (NOF Corporation), MC-6060 (NOF Corporation), and MC-8080(NOF Corporation)), phosphatidylserines (e.g., dipalmitoylphosphatidylserine, distearoylphosphatidylserine, dioleoylphosphatidylserine, and palmitoyloleoylphosphatidylserine), phosphatidylethanolamines (e.g., dipalmitoylphosphatidylethanolamine, distearoylphosphatidylethanolamine, dioleoylphosphatidylethanolamine, palmitoyloleoylphosphatidylethanolamine, and lysophosphatidylethanolamine), phosphatidylinositol, and phosphatidic acid); and polyethylene glycol lipids (PEG lipids) (e.g., PEG-DAA, PEG-DAG, PEG-phospholipid conjugate, PEG-Cer, PEG-cholesterol, PEG-C-DOMG, 2KPEG-CMG, GM-020 (NOF Corporation), GS-020 (NOF Corporation), and GS-050 (NOF Corporation)) can be used as such a structured lipid. In the present invention, all three members of a sterol (particularly, cholesterol), a phospholipid (particularly, phosphatidylcholine) and a polyethylene glycol lipid are preferably used as structured lipids.

The ratio of the structured lipid to the compound of the present invention in the composition of the present invention can be optionally adjusted depending on the object. For example, when the lipid particle is formed of the mixed lipid component containing the compound of the present invention and the structured lipid in the composition of the present invention, the molar ratio of the structured lipid to the compound of the present invention is usually a ratio of 0.008 to 4, and preferably a ratio of 0.4 to 1.5. According to another definition, the contents in the mixed lipid component are usually 1 to 4 mol of the compound of the present invention, usually 0 to 3 mol of the sterol, usually 0 to 2 mol of the phospholipid and usually 0 to 1 mol of the polyethylene glycol lipid. In a more preferred aspect, in the case of using the compound of the present invention and an additional lipid component in a mixture, the contents are 1 to 1.5 mol of the compound of the present invention, 0 to 1.25 mol of the sterol, 0 to 0.5 mol of the phospholipid and 0 to 0.125 mol of the polyethylene glycol lipid.

The "nucleic acid" can be any molecule of polymerized nucleotides and molecules having functions equivalent to those of the nucleotides. Examples thereof can include RNA which is a polymer of ribonucleotides, DNA which is a polymer of deoxyribonucleotides, a polymer of a mixture of ribonucleotides and deoxyribonucleotides, and a nucleotide polymer containing a nucleotide analog. Alternatively, a nucleotide polymer containing a nucleic acid derivative may be used. The nucleic acid may be a single-stranded nucleic acid or a double-stranded nucleic acid. The double-stranded nucleic acid also includes a double-stranded nucleic acid in which one of the strands hybridizes under stringent conditions to the other strand.

The nucleotide analog can be any molecule as long as the molecule is a ribonucleotide, a deoxyribonucleotide, RNA or DNA modified in order to improve nuclease resistance, in order to stabilize, in order to enhance affinity for a complementary strand nucleic acid, in order to enhance cell permeability, or in order to visualize the molecule, as compared with RNA or DNA. The nucleotide analog may be a naturally occurring molecule or a non-natural molecule. Examples thereof include a nucleotide analog with a modified sugar moiety and a nucleotide analog with a modified phosphodiester bond.

The nucleotide analog with a modified sugar moiety can be any molecule as long as an arbitrary chemical structural substance is added to or replaced for a portion or the whole of the chemical structure of a sugar in a nucleotide. Specific examples thereof include a nucleotide analog substituted by 2'-O-methyl ribose, a nucleotide analog substituted by 2'-O-propyl ribose, a nucleotide analog substituted by 2'-methoxyethoxy ribose, a nucleotide analog substituted by 2'-O-methoxyethyl ribose, a nucleotide analog substituted by 2'-O—[2-(guanidium)ethyl]ribose, a nucleotide analog substituted by 2'-fluoro ribose, a nucleic acid analog with a sugar moiety substituted by a morpholino ring (morpholino nucleic acid), bridged nucleic acid (BNA) having two cyclic structures by the introduction of a bridged structure to the sugar moiety, more specifically, locked nucleic acid (LNA) with an oxygen atom at position 2' and a carbon atom at position 4' bridged via methylene, and ethylene bridged nucleic acid (ENA) [Nucleic Acid Research, 32, e175 (2004)], and amide-bridged nucleic acid (AmNA) with a carbon atom at position 2' and a carbon atom at position 4' bridged via an amide bond, and can further include peptide nucleic acid (PNA)[Acc. Chem. Res., 32, 624 (1999)], oxypeptide nucleic acid (OPNA) [J. Am. Chem. Soc., 123, 4653 (2001)], and peptide ribonucleic acid (PRNA) [J. Am. Chem. Soc., 122, 6900 (2000)].

The nucleotide analog with a modified phosphodiester bond can be any molecule as long as an arbitrary chemical structural substance is added to or replaced for a portion or the whole of the chemical structure of a phosphodiester bond in a nucleotide. Specific examples thereof can include a nucleotide analog substituted by a phosphorothioate bond, and a nucleotide analog substituted by a N3'-P5' phosphoramidate bond [Cell Engineering, 16, 1463-1473 (1997)] [RNAi Method and Antisense Method, Kodansha Ltd. (2005)].

The nucleic acid derivative can be any molecule as long as the molecule is a nucleic acid with another chemical substance added thereto in order to improve nuclease resistance, in order to stabilize, in order to enhance affinity for a complementary strand nucleic acid, in order to enhance cell permeability, or in order to visualize the molecule, as compared with a nucleic acid. Specific examples thereof can include a 5'-polyamine-added derivative, a cholesterol-added derivative, a steroid-added derivative, a bile acid-added derivative, a vitamin-added derivative, a Cy5-added derivative, a Cy3-added derivative, a 6-FAM-added derivative, and a biotin-added derivative.

As long as the nucleic acid in the present invention enables achieving the purification or the production of the target cells, or other expected objects by contacting the nucleic acid with the cell population containing the target cells and transfecting the nucleic acid into the target cells, the nucleic acid in the present invention is not particularly limited.

In one preferable embodiment of the present invention, the nucleic acid is an mRNA. The "mRNA" means RNA containing a nucleotide sequence translatable into a protein. The mRNA according to the present invention is not particularly limited as long as the mRNA can cause intracellular expression of the desired protein. In one embodiment of the present invention, the mRNA is an mRNA containing a nucleotide sequence encoding a functional gene, which may have linked thereto a nucleotide sequence specifically recognized by miRNA specifically expressed in the target cells.

In one preferable embodiment of the present invention, the mRNA contains the following (i) and/or (ii):
(i) a cardiac muscle cell (or cardiac muscle cell subtype)-specific miRNA-responsive mRNA containing: a nucleotide sequence specifically recognized by miRNA specifically expressed in cardiac muscle cells (or cardiac muscle cell subtype); and a nucleotide sequence encoding a functional gene;

(ii) an mRNA containing a nucleotide sequence encoding a functional gene.

The "cardiac muscle cell (or cardiac muscle cell subtype)-specific miRNA-responsive mRNA" in an embodiment of (i) is a nucleic acid in which the "nucleotide sequence specifically recognized by the miRNA specifically expressed in cardiac muscle cells (or cardiac muscle cell subtype)" and the "functional gene" are "controllably connected". That is, the expression of the "functional gene" is controlled by the "nucleotide sequence specifically recognized by the miRNA specifically expressed in cardiac muscle cells (or cardiac muscle cell subtype)". When the "miRNA specifically expressed in cardiac muscle cells (or cardiac muscle cell subtype)" is present, the translation of the "functional gene" to a protein is adjusted according to the existing amount thereof. Typically, in cardiac muscle cells (or cardiac muscle cell subtype) in which the "miRNA specifically expressed in the cardiac muscle cells (or cardiac muscle cell subtype)" is present, the translation of the "functional gene" to the protein is suppressed according to the existing amount thereof, and the amount of the protein expressed (existing amount) in the cardiac muscle cells (or cardiac muscle cell subtype) decreases. Such a mechanism makes the cardiac muscle cells (or cardiac muscle cell subtype) in which the "miRNA specifically expressed in the cardiac muscle cells (or cardiac muscle cell subtype)" is present and cells other than cardiac muscle cells (or cardiac muscle cell subtype) wherein such miRNA does not exist different in the amount of the "functional gene" expressed. The cardiac muscle cells (or cardiac muscle cell subtype) can be distinguished from the other cells thereby.

As long as the "miRNA specifically expressed in the cardiac muscle cells" (hereinafter referred to as "cardiac muscle cell-specific miRNA") is miRNA which is more highly expressed in cardiac muscle cells than in cells other than cardiac muscle cells, more specifically, cells other than cardiac muscle cells in the cell population containing the cardiac muscle cells, the cardiac muscle cell-specific miRNA is not particularly limited. For example, the cardiac muscle cell-specific miRNA may be miRNA wherein the amount of the miRNA expressed in cardiac muscle cells is 10% or more, 20% or more, 30% or more, 40% or more, 50% or more, 60% or more, 70% or more, 80% or more, or 90% or more higher than the amount of the miRNA expressed in cells other than cardiac muscle cells. Such a miRNA can be suitably selected from miRNAs registered in information on a database (e.g., http://www.mirbase.org/ or http://www.microrna.org/) and/or miRNAs described in literature information described in the database. Examples of the miRNA specifically expressed in cardiac muscle cells include hsa-miR-1, hsa-miR-22-5p, hsa-miR-133a, hsa-miR-133b, hsa-miR-143-3p, hsa-miR-145-3p, hsa-miR-208a-3p, hsa-miR-208b-3p, hsa-miR-490-3p, hsa-miR-490-5p, hsa-miR-499a-5p, hsa-miR-1271-5p, hsa-miR-3907, hsa-miR-4324, and hsa-let-7e-5p. Among these, preferable specific examples of the cardiac muscle cell-specific miRNA include hsa-miR-1, hsa-miR-208a-3p, hsa-miR-208b-3p, and hsa-miR-499a-5p.

In the above-mentioned (i), as a specific embodiment of a cardiac muscle cell subtype specific miRNA-responsive mRNA containing: a nucleotide sequence specifically recognized by miRNA specifically expressed in miRNA specifically expressed in a cardiac muscle cell subtype; and a nucleotide sequence encoding a functional gene, a ventricular muscle cell-specific miRNA-responsive mRNA containing: a nucleotide sequence specifically recognized by miRNA specifically expressed in ventricular muscle cells; and a nucleotide sequence encoding a functional gene can be used. The "ventricular muscle cell-specific miRNA-responsive mRNA" is a nucleic acid in which the "nucleotide sequence specifically recognized by the miRNA specifically expressed in ventricular muscle cells" and the "functional gene" are "controllably connected". That is, the expression of the "functional gene" is controlled by the "nucleotide sequence specifically recognized by the miRNA specifically expressed in ventricular muscle cells". When the "miRNA specifically expressed in ventricular muscle cells" is present, the translation of the "functional gene" to a protein is adjusted according to the existing amount thereof. Typically, in ventricular muscle cells in which the "miRNA specifically expressed in the ventricular muscle cells" is present, the translation of the "functional gene" to the protein is suppressed according to the existing amount thereof, and the amount of the protein expressed (existing amount) in the ventricular muscle cells decreases. Such a mechanism makes the ventricular muscle cells in which the "miRNA specifically expressed in the ventricular muscle cells" is present and cells other than ventricular muscle cells wherein such miRNA does not exist different in the amount of the "functional gene" expressed. The ventricular muscle cells can be distinguished from the other cells thereby.

As long as the "miRNA specifically expressed in the ventricular muscle cells" (hereinafter referred to as "ventricular muscle cell-specific miRNA") is miRNA which is more highly expressed in ventricular muscle cells than in cells other than ventricular muscle cells, more specifically, cells other than the ventricular muscle cells in the cell population containing the ventricular muscle cells, the ventricular muscle cell-specific miRNA is not particularly limited. For example, the ventricular muscle cell-specific miRNA may be miRNA wherein the amount of the miRNA expressed in ventricular muscle cells is 10% or more, 20% or more, 30% or more, 40% or more, 50% or more, 60% or more, 70% or more, 80% or more, or 90% or more higher than the amount of the miRNA expressed in cells other than ventricular muscle cells. Such a miRNA can be suitably selected from miRNAs registered in information on a database (e.g., http://www.mirbase.org/or http://www.microrna.org/) and/or miRNAs described in literature information described in the database. Among cardiac muscle cell-specific miRNAs, preferable specific examples of the ventricular muscle cell-specific miRNA include hsa-miR-208b-3p.

The nucleotide sequences of cardiac muscle cell-specific miRNAs illustrated above are shown in the following Table 1.

TABLE 1

| Cardiac muscle cell specific miRNA | Nucleotide sequence of miRNA (5'->3') | SEQ ID NO |
|---|---|---|
| has-miR-1 | uggaauguaaagaaguauguau | 1 |
| has-miR-22-5p | aguucuucaguggcaagcuuua | 2 |
| has-miR-133a | uuugguccccuucaaccagcug | 3 |
| has-miR-133b | uuugguccccuucaaccagcua | 4 |
| has-miR-143-3p | ugagaugaagcacuguagcuc | 5 |
| has-miR-145-3p | ggauuccuggaaauacuguucu | 6 |
| has-miR-208a-3p | auaagacgagcaaaaagcuugu | 7 |

TABLE 1-continued

| Cardiac muscle cell specific miRNA | Nucleotide sequence of miRNA (5'->3') | SEQ ID NO |
|---|---|---|
| has-miR-208b-3p | auaagacgaacaaaagguuugu | 8 |
| has-miR-490-3p | caaccuggaggacuccaugcug | 9 |
| has-miR-490-5p | ccauggaucuccaggugggu | 10 |
| has-miR-499a-5p | uuaagacuugcagugauguuu | 11 |
| has-miR-1271-5p | cuuggcaccuagcaagcacuca | 12 |
| has-miR-3907 | aggugcuccaggcuggcucaca | 13 |
| has-miR-4324 | cccugagacccuaaccuuaa | 14 |
| has-let-7e-5p | ugagguaggagguuguauaguu | 15 |

The "nucleotide sequence specifically recognized by miRNA specifically expressed in cardiac muscle cells" (hereinafter referred to as a "cardiac muscle cell-specific miRNA recognition sequence") is a nucleotide sequence specifically recognized by the cardiac muscle cell-specific miRNA forming a RISC (RNA-induced silencing complex) by interaction with a plurality of predetermined proteins. The cardiac muscle cell-specific miRNA recognition sequence can be recognized and hybridized by the cardiac muscle cell-specific miRNA as a RISC, and may be a completely complementary sequence or may be a sequence having mismatches. For example, the cardiac muscle cell-specific miRNA recognition sequence may have 1% or less mismatches, 5% or less mismatches, 10% or less mismatches, 20% or less mismatches, 30% or less mismatches, 40% or less mismatches, or 50% or less mismatches, or may have a 1 base mismatch, 2 base mismatches, 3 base mismatches, 4 base mismatches, 5 base mismatches, 6 base mismatches, 7 base mismatches, 8 base mismatches, 9 base mismatches, or 10 base mismatches on the basis of the completely complementary sequence to the cardiac muscle cell-specific miRNA. Although the base length of the cardiac muscle cell-specific miRNA recognition sequence is not particularly limited, and can be a suitable base length corresponding to the cardiac muscle cell-specific miRNA (or RISC including thereof), for example, the base length is preferably 18 bases or more and 23 bases or less, and more preferably 20 bases or 21 bases.

Among cardiac muscle cell-specific miRNA recognition sequences, the "nucleotide sequence specifically recognized by miRNA specifically expressed in ventricular muscle cells" (hereinafter referred to as a "ventricular muscle cells specific miRNA recognition sequence") is a nucleotide sequence specifically recognized by the ventricular muscle cell-specific miRNA forming a RISC (RNA-induced silencing complex) by interaction with a plurality of predetermined proteins. The ventricular muscle cell-specific miRNA recognition sequence can be recognized and hybridized by the ventricular muscle cell-specific miRNA as a RISC, and may be a completely complementary sequence or may be a sequence having mismatches. For example, the ventricular muscle cell-specific miRNA recognition sequence may have 1% or less mismatches, 5% or less mismatches, 10% or less mismatches, 20% or less mismatches, 30% or less mismatches, 40% or less mismatches, or 50% or less mismatches, or may have 1 base mismatch, 2 base mismatches, 3 base mismatches, 4 base mismatches, 5 base mismatches, 6 base mismatches, 7 base mismatches, 8 base mismatches, 9 base mismatches, or 10 base mismatches on the basis of the completely complementary sequence to the ventricular muscle cell-specific miRNA. Although the base length of the ventricular muscle cell-specific miRNA recognition sequence is not particularly limited, and can be a suitable base length corresponding to the ventricular muscle cell-specific miRNA (or RISC including thereof), for example, the base length is preferably 18 bases or more and 23 bases or less, and more preferably 20 bases or 21 bases.

The standard cardiac muscle cell-specific miRNA recognition sequences corresponding to the nucleotide sequences of cardiac muscle cell-specific miRNAs (completely complementary nucleotide sequences) illustrated above is shown in the following Table 2.

TABLE 2

| Cardiac muscle cell specific miRNA | Standard recognition sequence (5'->3') | SEQ ID NO |
|---|---|---|
| has-miR-1 | auacauacuucuuuacauucca | 16 |
| has-miR-22-5p | uaaagcuugccacugaagaacu | 17 |
| has-miR-133a | cagcugguugaaggggaccaaa | 18 |
| has-miR-133b | uagcugguugaaggggaccaaa | 19 |
| has-miR-143-3p | gagcuacagugcuucaucuca | 20 |
| has-miR-145-3p | agaacaguauuuccaggaaucc | 21 |
| has-miR-208a-3p | acaagcuuuuugcucgucuuau | 22 |
| has-miR-208b-3p | acaaaccuuuuguucgucuuau | 23 |
| has-miR-490-3p | cagcauggaguccuccagguug | 24 |
| has-miR-490-5p | acccaccuggagauccaugg | 25 |
| has-miR-499a-5p | aaacaucacugcaagucuuaa | 26 |
| has-miR-1271-5p | ugagugcuugcuaggugccaag | 27 |
| has-miR-3907 | ugugagccagccuggagcaccu | 28 |
| has-miR-4324 | uuaagguuagggucucaggg | 29 |
| has-let-7e-5p | aacuauacaaccuccuaccuca | 30 |

The "functional gene" in the embodiment of (i) can be a known gene which can be used for purifying cardiac muscle cells in a cell population containing the cardiac muscle cells or purifying ventricular muscle cells in a cell population containing the ventricular muscle cells, more generally various genes which can be used for sorting specified cells from a cell population, and is not particularly limited. Examples of such a "functional gene" include drug resistance genes, genes encoding fluorescent proteins, apoptosis-inducing genes, and suicide genes. When a plurality of "functional genes" is used, for example, in the below-mentioned embodiment, the cardiac muscle cell-specific miRNA-responsive mRNA or the ventricular muscle cell-specific miRNA-responsive mRNA containing the "functional gene" of (i) and the mRNA containing the "functional gene" of (ii) are used in combination, each of the "functional genes" can be mutually selected independently from drug resistance genes, genes encoding fluorescent proteins, apoptosis-inducing genes, and suicide genes, and may be mutually the same or different.

Examples of the "drug resistance genes" include a kanamycin resistance gene, an ampicillin resistance gene, and a puromycin resistance gene. Any one of these genes may be used, or two or more thereof may be used.

Examples of the "genes encoding fluorescent proteins" include blue fluorescent proteins such as Sirius, BFP, and EBFP; cyan fluorescent proteins such as mTurquoise, TagCFP, AmCyan, mTFP1, MidoriishiCyan, and CFP; green fluorescent proteins such as TurboGFP, AcGFP, TagGFP, Azami-Green (e.g., hmAG1), ZsGreen, EmGFP, EGFP, GFP2, and HyPer; yellow fluorescent proteins such as TagYFP, EYFP, Venus, YFP, PhiYFP, PhiYFP-m, TurboYFP, ZsYellow, and mBanana; orange fluorescent proteins such as Kusabira Orange (e.g., hmKO2), and mOrange; red fluorescent proteins such as TurboRFP, DsRed-Express, DsRed2, TagRFP, DsRed-Monomer, AsRed2, and mStrawberry; and near-infrared fluorescent proteins such as TurboFP602, mRFP1, JRed, KillerRed, mCherry, HcRed, KeimaRed (e.g., hdKeimaRed), mRasberry, and mPlum. Any one of these genes may be used, or two or more thereof may be used. When two or more genes encoding fluorescent proteins are used, the fluorescent proteins do not preferably prevent the visibilities of each other in the case where the emission wavelengths of the fluorescent proteins are different.

Examples of the "apoptosis-inducing genes" include IκB, Smac/DIABLO, ICE, HtrA2/OMI, AIF, endonuclease G, Bax, Bak, Noxa, Hrk (harakiri), Mtd, Bim, Bad, Bid, PUMA, activated caspase-3, Fas, and Tk. Any one of these genes may be used, or two or more thereof may be used.

Examples of the "suicide genes" include genes encoding diphtheria toxin A, herpes simplex thymidine kinase (HSV-TK), carboxypeptidase G2 (CPG2), carboxylesterase (CA), cytosine deaminase (CD), cytochrome P450 (cyt-450), deoxycytidine kinase (dCK), nitroreductase (NR), purine nucleoside phosphorylase (PNP), thymidine phosphorylase (TP), varicella zoster virus thymidine kinase (VZV-TK), and xanthine-guanine phosphoribosyltransferase (XGPRT). Any one of these genes may be used, or two or more thereof may be used.

Those skilled in the art can design and produce suitable "cardiac muscle cell-specific miRNA-responsive mRNA" and "ventricular muscle cell-specific miRNA-responsive mRNA" (target cell-specific miRNA-responsive mRNAs) which contain the target cell-specific miRNA recognition sequence and the nucleotide sequence encoding the functional gene, and can be used in the present invention. For example, the above-mentioned Patent Literature 4 can be referred to for specific examples of the full-length nucleotide sequences of these target cell-specific miRNA-responsive mRNAs if required.

The target cell-specific miRNA-responsive mRNA may contain a nucleotide sequence other than the nucleotide sequence specifically recognized by the miRNA specifically expressed in target cells (target cell-specific miRNA recognition sequence) and the "functional gene" if needed. For example, the target cell-specific miRNA-responsive mRNA may contain a gene encoding a localization signal. As an example, in an embodiment in which a "gene encoding a fluorescent protein" is selected as the "functional gene", the gene encoding the localization signal may be connected to the gene. When a sorting step in the below-mentioned method for purifying target cells and method for producing target cells is performed based on the image using imaging cytometry, etc., such an embodiment is particularly advantageous.

In the target cell-specific miRNA-responsive mRNA, the fact that the target cell-specific miRNA recognition sequence and the "functional gene" are "controllably connected" means that at least one target cell-specific miRNA recognition sequence is contained in at least one of the 5' untranslated region (UTR) or the 3' UTR of the open reading frame (ORF) (however, including the initiation codon), or the ORF (on the 3' side of the initiation codon) of the "functional gene". The number of the target cell-specific miRNA recognition sequence may be one, two, three, four, five, six, seven, eight or more, and those recognition sequences may be contained in one or more of the 5' UTR, the 3' UTR, or the ORF.

In one embodiment of the present invention, the target cell-specific miRNA-responsive mRNA comprises a cap structure (7-methylguanosine 5'-phosphate), the ORF encoding the "functional gene", and a poly(A) tail in the direction from the 5' end to the 3' end, and comprises at least one target cell-specific miRNA recognition sequence in the 5' UTR, the 3' UTR, and/or the ORF. To achieve efficient control (suppression) of translation, the target cell-specific miRNA recognition sequence and the "functional gene" are preferably disposed in this order in the direction from the 5' end to 3' end. Thus, at least one target cell-specific miRNA recognition sequence is preferably contained in the 5' UTR.

The number of bases and the types of the bases between the cap structure and the target cell-specific miRNA recognition sequence may be arbitrary unless the bases constitute stem structure and three-dimensional structure. For example, the number of bases between the cap structure and the target cell-specific miRNA recognition sequence can be 0 to 50 bases, and preferably 10 to 30 bases.

The number of bases and the types of the bases between the target cell-specific miRNA recognition sequence and the initiation codon of the functional gene (usually AUG in eukaryotes) may be arbitrary unless the bases constitute stem structure and three-dimensional structure. For example, the number of the bases between the target cell-specific miRNA recognition sequence and the initiation codon of the functional gene can be 0 to 50 bases, and preferably 10 to 30 bases.

The nucleotide sequence which is an initiation codon does not preferably exist in the target cell-specific miRNA recognition sequence. For example, when the target cell-specific miRNA recognition sequence is present in the 5' UTR, and the recognition sequence contains AUG as an initiation codon, the recognition sequence is preferably designed to be in-frame in the relationship with the functional gene connected to the 3' side. When the target cell-specific miRNA recognition sequence contains AUG as an initiation codon, the AUG is converted into GUG, which is not an initiation codon, and the recognition sequence can then also be used. Meanwhile, to minimize the influence of the initiation codon in the target cell-specific miRNA recognition sequence, the position of the recognition sequence in the 5' UTR can be optionally adjusted. For example, the number of bases between the cap structure and the initiation codon (AUG) in the target cell-specific miRNA recognition sequence may be designed to be 0 to 60 bases, for example, 0 to 15 bases, 10 to 20 bases, 20 to 30 bases, 30 to 40 bases, 40 to 50 bases, or 50 to 60 bases.

If elements (sequences) contained in the target cell-specific miRNA-responsive mRNA is determined as mentioned above, the target cell-specific miRNA-responsive mRNA can be synthesized by an already-known genetic engineering method to those skilled in the art, commonly by an in vitro synthesis method using a template DNA containing a promotor sequence as a template.

The target cell-specific miRNA-responsive mRNA may be an target cell-specific miRNA-responsive mRNA wherein the effectiveness in sorting the target cells in the cell population is verified. That is, in the transfection method, the purification method, and the production method of the present invention, a step of verifying the effectiveness in sorting target cells in a cell population using the target cell-specific miRNA-responsive mRNA (and a step of selecting the target cell-specific miRNA-responsive mRNA based on the results of the step) may be performed beforehand before the implementation of the methods if necessary. Specifically, a plurality of target cell-specific miRNA-responsive mRNAs which have the 5' UTRs and are candidates as illustrated above are produced and transfected into cell populations having an already-known purity and containing the target cells separately, and target cell-specific miRNA-responsive mRNAs having high effectiveness in sorting target cells can be determined.

Only one of the target cell-specific miRNA-responsive mRNAs may be used, or two or more thereof may be used. When two or more target cell-specific miRNA-responsive mRNAs are used, the miRNA-responsive mRNaS are preferably different from each other in the target cell-specific miRNA recognition Examples of the "functional gene" contained in the mRNA of an embodiment of (ii) include the same as the "functional gene" contained in the mRNA of the embodiment of (i), for example, genes encoding a drug resistance gene and a fluorescent protein.

Alternatively, the "functional genes" contained in the mRNA of the embodiment of (ii) may be a gene which shows that the nucleic acid is introduced to cells, a so-called reporter gene, other than a drug resistance gene and a gene encoding a fluorescent protein. Examples of such a reporter gene include a gene of a protein which assists luminescence or coloration, other than fluorescent proteins and a gene of a membrane localized protein which is localized in cell membranes and expressed, and can bind to an antibody having it as an antigen.

In one embodiment of the present invention, the target cell-specific miRNA-responsive mRNA of (i) and the mRNA of (ii) can be used in combination. That is, both the miRNA-responsive mRNA of (i) and the mRNA of (ii) are contacted with a cell population containing target cells and introduced to the cells (especially cardiac muscle cells). In such an embodiment, the mRNA of (ii) can be referred to as a "control mRNA."

The use of the control mRNA in combination enables sorting target cells efficiently. For example, when a drug resistance gene was used as the "control mRNA", and an apoptosis-inducing gene or a suicide gene is used as the "functional gene", the selection of a cell population which is drug-resistant and in which cell death is not induced enables improving precision with which the target cells are sorted. More specifically, cells to which the nucleic acid is inefficiently introduced by transfection, i.e., target cells to which the target cell-specific miRNA-responsive mRNA is inefficiently introduced, and other cells are distinguished based on the exhibition of drug resistance, such cells are excluded, and target cells can then be more efficiently sorted by whether the "functional gene" which the target cell-specific miRNA-responsive mRNA contains is expressed or not. This is because in target cells, when the "cardiac muscle cell-specific miRNA" or the "ventricular muscle cells specific miRNA" existing in the cells hybridizes with the predetermined nucleotide sequence of the miRNA-responsive mRNA, the expression of the "functional gene" is suppressed, and meanwhile, in cells other than the target cells, since the "cardiac muscle cell-specific miRNA" or the "ventricular muscle cell-specific miRNA" does not exist in the cells, the expression of the "functional gene" is not suppressed. Cell populations which exhibit drug resistance can be selected by a known method.

When genes encoding fluorescent proteins are used as the "control mRNA" and the "functional gene", precision with which the target cells are sorted can be improved by selecting cell populations with lower fluorescence intensity. Target cells can be more specifically sorted more efficiently by distinguishing cells to which the nucleic acid is efficiently introduced by transfection based on the emission of fluorescence and selecting cell populations with lower fluorescence intensity in the cell population. This is because the amount of the fluorescent protein contained in the control mRNA introduced to the target cells and the other cells is proportional to the amount of the target cell-specific miRNA-responsive mRNA with which the target cells and the other cells are transfected simultaneously therewith introduced to the target cells and the other cells. Cells can be selected based on fluorescence intensity, for example, by selectively separating cells which exhibit higher fluorescence than a certain standard using a cell sorter (e.g., Becton Dickinson "FACS").

The steps of the transfection method of the present invention will be described hereinafter.

The transfection method of the present invention comprises at least a step of contacting a composition of the present invention with a cell population containing target cells (in the present specification, referred to as a "composition contact step"), and may further comprise another step relating to introducing a nucleic acid to a cardiac muscle cell (transfection) if required. In the transfection method of the present invention, the composition of the present invention is used as a reagent, and other technical matters than it can be basically according to a common transfection method, for example, a transfection (lipofection) method using a lipid nanoparticle (LNP) or liposomes. For example, the transfection method of the present invention can be performed under conditions under which a nucleic acid-containing LNP (conditions under which transfection may be induced) can be transfected into a cell population containing target cells.

When the composition of the present invention is contacted with a cell population existing in the living body and containing target cells, the composition can be administered to a target subject (e.g., a human or a nonhuman mammal, preferably a human) such that an effective amount of the nucleic acid is delivered to targeted target cells. Also, in such an embodiment, the composition of the present invention can be used with stability, low toxicity and safety.

In the case of using the composition of the present invention in vivo, the composition of the present invention is preferably prepared into injections such as intravenous injection, intraarterial injection, intramuscular injection, subcutaneous injection, and intraperitoneal injection, and if an effective amount of the nucleic acid can be delivered to cells of interest, the composition can be prepared into a dosage form adapted thereto.

In one of the preferable embodiments of the present invention, a cell population containing target cells is a cell population in vitro which is produced by culturing cells such as induced pluripotent stem cells (iPS cells), embryonic stem cells (ES cells), other stem cells, or progenitor cells capable of differentiating into target cells under conditions suitable to differentiation into target cells and in which the stem cells and the target cells are mixed.

Time when the composition containing the target cell-specific miRNA-responsive mRNA is contacted with a cell population prepared through the step of differentiation from iPS cells or other pluripotent stem cells (which may be embryoids) is not particularly limited if the time is after cells differentiate into the target cells to a certain degree. The time can be time suitable for transfecting the nucleic acid into the target cells depending on the object, for example time suitable for sorting the target cells to achieve an aimed purity of the target cells. For example, the composition of the present invention can be contacted with embryoids containing the target cells on or around the tenth to fortieth day, preferably on or around the fourteenth to twentieth day from a day when the embryoids are formed from iPS cells.

In the transfection method of the present invention, other steps, especially a step including treatment for dealing with the "nucleic acid" introduced to cells can be performed before and after the composition contact step.

For example, although the "mRNA containing the nucleotide sequence encoding the functional gene" can be used as the "nucleic acid" in the present invention, a "drug resistance gene", a "gene encoding a fluorescent protein", another positive selectable marker gene, or another negative selectable marker gene may be used as the "functional gene" to concentrate, isolate, or detect the cells to which the nucleic acid is introduced. In the embodiment using a "drug resistance gene", for example, a step of adding the drug (e.g., puromycin) corresponding to a drug resistance gene (e.g., puromycin resistance gene) to medium at an appropriate concentration, a step of culturing cells in the medium, a step of selecting cells to which the drug resistance gene was introduced by the culture, etc. can be performed after the composition contact step. In an embodiment using a "gene encoding a fluorescent protein", for example, a step of irradiating light at the excitation wavelength corresponding to the fluorescent protein, a step of detecting fluorescence emitted by the irradiation with a fluorescence microscope, a cell sorter, etc., a step of selecting cells in which the emission of the fluorescence by the fluorescent protein has a predetermined characteristic by the detection, etc. can be performed after the composition contact step.

In the present invention, the "cardiac muscle cell-specific miRNA-responsive mRNA containing: the nucleotide sequence specifically recognized by the miRNA specifically expressed in cardiac muscle cells; and the nucleotide sequence encoding the functional gene" or the "ventricular muscle cell-specific miRNA-responsive mRNA containing: the nucleotide sequence specifically recognized by the miRNA specifically expressed in ventricular muscle cells; and the nucleotide sequence encoding the functional gene" can also be used as the "nucleic acid". In this embodiment, in target cells, when the miRNA specifically expressed in the target cells and existing in the cells hybridizes with the predetermined nucleotide sequence of the miRNA-responsive mRNA, the expression of the "functional gene" is suppressed, and meanwhile, in the cells other than the target cells, since the miRNA specifically expressed in the target cells does not to exist in the cells, the expression of the "functional gene" is not suppressed. Thus, as the "functional gene", when the miRNA-responsive mRNA containing, for example, the "apoptosis-inducing gene" or the "suicide gene" which kills cells in which it is expressed is used, a step for concentrating, isolating, and detecting the target cells in the cell population in which cells other than the target cells coexist by whether those genes are expressed or not can be performed after the composition contact step. The "transfection method" of the present invention of such an embodiment is compatible with a "method for purifying cardiac muscle cells", a "method for producing cardiac muscle cells", a "method for purifying ventricular muscle cells", and a "method for producing ventricular muscle cells" of the present invention as mentioned below. The description of technical matters as to the "transfection method" can be applied to the "method for purifying cardiac muscle cells", the "method for producing cardiac muscle cells", the "method for purifying ventricular muscle cells", and the "method for producing ventricular muscle cells".

In one of the preferable embodiments of the present invention, the transfection method of the present invention is implemented as a method including the following step 1, and further including the following step 2 if required:

step 1: a step of forming aggregates of the cell population containing the target cells in a cell non-adhesive container under conditions under which a composition of the present invention can be transfected into the cell population containing the target cells (hereinafter occasionally referred to as an "aggregate formation step");

step 2: a step of sorting target cells based on a function in cells of a nucleic acid contained in the composition from the cell population into which the composition is transfected (hereinafter occasionally referred to as a "sorting step").

Either the following step 1-1 or 1-2 may be more specifically included in step 1 (aggregate formation step):

step 1-1: a step of culturing the cell population containing the target cells in the presence of the composition of the present invention and microcarriers in the cell non-adhesive container and forming the aggregates consisting of the cells to which the nucleic acid contained in the composition of the present invention is introduced and the microcarrier (hereinafter occasionally referred to as a "first embodiment of the aggregate formation step");

step 1-2: a step of culturing the cell population containing the target cells in the presence of the composition of the present invention in the cell non-adhesive container and forming the aggregate consisting of the cells to which the nucleic acid contained in the composition of the present invention is introduced (hereinafter occasionally referred to as a "second embodiment of the aggregate formation step").

The following steps A and B may be included before the step 1 (aggregate formation step) if required:

step A: a step of differentiating the pluripotent stem cells (population) into the target cells;

step B: a step of dispersing the cells (population) after the differentiation induction by the step A.

The cell population containing the target cells in the aggregate formation step is preferably an adhesive cell population. Here, the "adhesive cell (population)" means a cell (population) which can be maintained or proliferated optimally while adhering to the surface of a solid phase which is a scaffold. The "cell population containing the target cells" in step 1-2 is a population containing cells which has aggregation ability, and may form aggregates when the cells are cultured in a cell non-adhesive container. The "cell population containing the target cells" in step 1-1 is a population containing cells which has the ability to adhere to the microcarriers, and may adhere to the microcarriers when the cells are cultured with the microcarriers in a cell non-adhesive container.

The "cell population containing the target cells" may be prepared in any method. For example, in the transfection method of the present invention, a step for differentiating pluripotent stem cells into the target cells may be performed if required (as the step A performed before the step 1). The above-mentioned method for differentiating various pluripotent stem cells to the target cells is not particularly limited, and various known methods can be used. Examples of the method for differentiating pluripotent stem cells to the target cells include a method reported by Laflamme M A et al. (Laflamme M A & Murry C E, Nature 2011, Review). A method for forming a cell mass (embryoid) by the suspension culture of induced pluripotent stem cells (iPS cells) to produce cardiac muscle cells, a method for producing cardiac muscle cells in the presence of a substance which suppresses BMP signal transmission (WO 2005/033298), a method for adding Activin A and BMP sequentially to produce cardiac muscle cells (WO 2007/002136), a method for producing cardiac muscle cells in the presence of a substance which accelerates the activation of the canonical Wnt signal pathway (WO2007/126077), a method for isolating Flk/KDR-positive cells from induced pluripotent stem cells to produce cardiac muscle cells in the presence of cyclosporin A (WO 2009/118928), etc. can also be illustrated.

The differentiated target cells means cells which express at least cardiac muscle troponin (cTnT) or α-MHC. In the case of cTnT derived from a human, the accession number NM_000364 of NCBI is illustrated. In the case of cTnT derived from a mouse, NM_001130174 is illustrated. In the case of α-MHC derived from a human, the accession number NM_002471 of NCBI is illustrated. In the case of α-MHC derived from a mouse, the accession number NM_001164171 is illustrated.

A dispersed cell population is preferably subjected to the aggregate formation step. That is, in the transfection method of the present invention, a step for the dispersion treatment of the cell population containing the target cells, preferably the cell population after differentiation from pluripotent stem cells to the target cells is performed (as the step B performed before the step 1) may be performed in the step preceding the aggregate formation step beforehand if required. The dispersion treatment can be performed by a known technique, and chemical treatment by enzyme, etc., physical treatment by pipetting, etc., and the combination thereof can be adopted. A commercial reagent (e.g., Liberase TM Research Grade, Roche Diagnostics K.K.; StemPro Accutase Cell Dissociation Reagent, Gibco; TrypLE Select CTS, Gibco; or the like) can be used for chemical treatment.

As the "cell non-adhesive container" used for culturing the cell population in the aggregate formation step, (a) a cell non-adhesive container wherein the surface of the container is not artificially treated (e.g., coating treatment with an extracellular matrix, etc.) to improve adhesiveness to cells, or (b) a cell non-adhesive container wherein the surface of the container is artificially treated (e.g., coating treatment with hydrophobic molecules) to reduce adhesiveness to cells. "Cell non-adhesive" means that adhesive cells do not adhere, or hardly adhere, for example, that, based on the total number of cells seeded into the container, less than 20%, preferably less than 10%, further preferably less than 1% of the cells adhere to the container Examples of the material of the cell non-adhesive container include polycarbonate, polyethylene, polypropylene, Teflon®, polyethylene terephthalate, polymethyl methacrylate, nylon 6,6, polyvinyl alcohol, cellulose, silicone, polystyrene, glass, polyacrylamide, polydimethylacrylamide, and stainless steel.

Examples of the shape of the cell non-adhesive container include microplates, petri dishes (dishes), cell culture flasks (spinner flasks, shaker flasks, etc.), cell culture bags, roller bottles, bioreactors, and culture tanks. The size of the cell non-adhesive container can also be suitably selected according to the production scale (i.e., in the range of 1 mL to 2000 L), and a large-capacity (e.g., 100 mL to 2000 L) cell non-adhesive container is particularly preferable in the present invention.

The first embodiment of the aggregate formation step (step 1-1) is performed, for example, by adding the composition of the present invention and the microcarriers to the cell population which is an adhesive cell population and contains the target cells in the cell non-adhesive container and subjecting the cell population to stationary culture in the presence thereof. In such a step, the cell population containing the target cells adheres to the microcarriers, aggregates are formed, and the nucleic acid contained in the composition of the present invention is introduced to the cells constituting the cell population in the process.

Thus, the "aggregates" in the first embodiment of the aggregate formation step means a conglomerate containing at least one cell and one microcarrier. The size of these aggregates depends on the size of the microcarriers to be used, and is not particular limited. Although the number of the cells adhering to one microcarrier is not particularly limited, the number is, for example, 2 to 500 cells, and preferably 50 to 300 cells. Cells forming aggregates (aggregate-forming cells) and cells not forming aggregates (non-aggregate-forming cells) are contained in the cell population cultured in the first embodiment of the aggregate formation step. Although the ratio of the aggregate-forming cells to the total thereof is not particularly limited, the ratio is, for example, 10% or more, 20% or more, 30% or more, 40% or more, 50% or more, 60% or more, 70% or more, 80% or more, 90% or more, or 100%.

The "microcarriers" used in the first embodiment of the aggregate formation step means carriers which enable adhering the cell population containing the target cells to the surface thereof. The microcarriers can be suspended in liquid medium with the cell population containing the target cells adhered, and can play the role of culturing the cell population adhered thereby. The material, the shape, the size, etc. thereof are not particularly limited.

Examples of the material of the microcarriers include dextran, gelatin, collagen, polystyrene, polyethylene, polyacrylamide, glass, and cellulose.

Examples of the shape of the microcarriers include a spherical shape (bead), and a disk shape.

The size of the spherical microcarriers is, for example, 2 to 1000 μm, and preferably 100 to 300 μm in diameter.

The microcarrier may be porous.

Although the number of the microcarriers used for culturing cells is not particularly limited, the number is, for example, one microcarrier per ten cells. Although the amount of the microcarriers used for culturing cells is not particularly limited, the amount of the microcarriers is, for example, 0.1 g based on $1 \times 10^6$ to $5 \times 10^7$ cells, and preferably 0.1 g based on $2 \times 10^7$ cells to $3 \times 10^7$ cells.

The microcarriers may be a commercial item, for example, a high-concentration Synthemax II microcarrier (Corning Incorporated) can be used.

The second embodiment of the aggregate formation step (step 1-2) is performed, for example, by adding the composition of the present invention to the cell population which is an adhesive cell population and contains the target cells in the cell non-adhesive container and subjecting the cell population to stationary culture in the presence thereof. In such a step, even though microcarriers do not exist with the cell population containing the target cells, cells form aggregates, and the nucleic acid contained in the composition of the present invention is introduced to the cells constituting the cell population in the process.

Thus, an "aggregate" in the second embodiment of the aggregate formation step means a conglomerate containing at least two cells. Many of the aggregates are aggregates in which many cells adhere to each other. Although the number of cells forming one aggregate is not particularly limited, the number is, for example, 2 to 500, and preferably 50 to 300. Cells forming aggregates (aggregate-forming cells) and cells not forming aggregates (non-aggregate-forming cells) are contained in the cell population cultured in the second embodiment of the aggregate formation step. Although the ratio of the aggregate-forming cells to the total number thereof is not particularly limited, the ratio is, for example, 10% or more, 20% or more, 30% or more, 40% or more, 50% or more, 60% or more, 70% or more, 80% or more, 90% or more, or 100%.

Stationary culture in the aggregate-formation step (the first embodiment and the second embodiment) may be performed for an enough period for forming the aggregates and completing transfection. Although the period of stationary culture is not particularly limited, the period is, for example, around 2 to 10 hours, preferably around 3 to 6 hours, and more preferably 4 to 5 hours. Although the conditions of stationary culture are not particularly limited, either, the conditions are, for example, around 37° C. and presence of 5% $O_2$.

Spinner culture may be performed to maintain the formed aggregates after stationary culture. Although the period of spinner culture is not particularly limited, the period is, for example, around 12 to 48 hours, preferably around 24 hours. Although the conditions of spinner culture are not particularly limited, either, the conditions are, for example, around 37° C. and presence of 5% $O_2$.

Although stirring speed and time are suitably set according to cell density and the size of the culture container, the culture is typically left to stand for 4 to 6 hours and stirred at 25 rpm for 12 hours or more. Excessive stirring or shake may give physical stress to cells, and hinder the maintenance of the aggregates. Thus, it is desirable to control stirring speed so that the medium components and the oxygen concentration in the medium can be homogenized, and the maintenance of the aggregates is not hindered.

As medium, conventionally known medium suitable for culturing the cell population containing the target cells can be used. For example, BME medium, BGJb medium, CMRL 1066 medium, Glasgow MEM medium, improved MEM (IMEM) medium, improved MDM (IMDM) medium, Medium 199, Eagle MEM medium, α-MEM medium, DMEM medium (high glucose, low glucose), DMEM/F12 medium, Ham's medium, RPMI 1640 medium, Fischer's medium, mixed medium thereof, etc. are used. Those skilled in the art can set the type of the medium and the amount of the medium used suitably depending on cells and culture conditions.

Additives such as amino acids, L-glutamine, GlutaMAX (product name), nonessential amino acids, vitamins, antibiotics (e.g., penicillin, streptomycin, or a mixture thereof), antimicrobial agents (e.g., amphotericin B), antioxidants, pyruvic acid, buffers, inorganic salts, etc. may be added to the medium if required. Those skilled in the art can set the types of the additives and the amounts of the additives used suitably depending on cells and culture conditions.

According to the transfection method including the above-mentioned aggregate formation step, the cardiac muscle cells (the cell population containing the cardiac muscle cells) to which the desired nucleic acid is introduced can be obtained in a large amount at a commercial level without limitation by the area of the surface of the container unlike a conventional method for culturing cells with the cells adhered to the surface of the container (a petri dish, a dish, etc.).

The steps of the method for purifying target cells of the present invention will be described hereinafter.

The method for purifying the target cells of the present invention include at least a step of contacting the composition of the present invention with the cell population containing the target cells (composition contact step), and may further include other steps as to the purification of the target cells if required. In the method for purifying target cells, although the composition of the present invention containing a specific nucleic acid is used to purify the target cells in the cell population, in other words, increase the ratio of the target cells in the cell population (enrich the target cells), other technical matters can be basically according to a known method for purifying cardiac muscle cells.

In the method for producing target cells of the present invention, the target cell-specific miRNA-responsive mRNA of (i) and/or the mRNA of (ii) is used as the "nucleic acid". When the composition of the present invention containing such a specific nucleic acid is contacted with the cell population containing the target cells, and the above-mentioned predetermined nucleic acid is introduced to the target cells and the other cells, in the target cells, the amount of the "functional gene" expressed is suppressed through the above-mentioned mechanism by the "nucleotide sequence specifically recognized by the miRNA specifically expressed in cardiac muscle cells" (cardiac muscle cell-specific miRNA recognition sequence) or the "nucleotide sequence specifically recognized by the miRNA specifically expressed in ventricular muscle cells" (ventricular muscle cell-specific miRNA recognition sequence) contained in the target cell-specific miRNA-responsive mRNA, and meanwhile, in cells other than the target cells, the amount of the "functional gene" expressed is not suppressed, and is a relatively high expression amount. The cells other than the target cells in the cell population can be eliminated, and the purity of the target cell can be increased using such a difference.

A step for sorting target cells including treatment for dealing with the "functional gene" (in the present specification, referred to as an "target cell sorting step") specifically needs to be performed after the composition contact step to purifying the target cells as mentioned above.

For example, when the "gene encoding fluorescent protein" is used as the "functional gene", the target cell sorting step appropriately includes treatment for detecting a signal emitted from the fluorescent protein (emission of fluorescence) using a predetermined detector. Examples of the detector therefor include a flow cytometer, an imaging cytometer, a fluorescence microscope, a light emission microscope, and a CCD camera. Such a detector can be adjusted for embodiments suitable for the absorption wavelength and the emission wavelength of the fluorescent protein (the configuration of the device, measurement conditions, etc.). Cells having a high amount of the fluorescent protein expressed (high fluorescence intensity), other than the target cells can also be selected and excluded using a fluorescence microscope or using a culture dish coated with a photoresponsive cell culture container material (cells which do not irradiate light can be exfoliated from the culture dish).

In the cell population obtained by the method for purifying the target cells of the present invention, the purity of the target cells can be increased to a certain level. The purity of the target cells in such a cell population can be higher than the purity of the target cells in the cell population obtained without applying the method for purifying the target cells of the present invention, and the degree thereof is not particularly limited. As an index, the purity of the target cells in the cell population obtained by the method for purifying the target cells of the present invention is 60% or more, 70% or more, 80% or more, 81% or more, 82% or more, 83% or more, 84% or more, 85% or more, 86% or more, 87% or more, 88% or more, 89% or more, 90% or more, 91% or more, 92% or more, 93% or more, 94% or more, 95% or more, 96% or more, 97% or more, 98% or more, 99% or more, and 100% (cells other than the target cells cannot be substantially detected).

In the above-mentioned explanations and the other explanations of the present specification as to the method for purifying target cells of the present invention, the "purification method" can be optionally read as the "production method". That is, descriptions as to the invention relating to the "method for purifying cardiac muscle cells" (method for increasing the purity or the ratio of cardiac muscle cells in a cell population) and the "method for purifying ventricular muscle cells" (method for increasing the purity or the ratio of ventricular muscle cells in a cell population) can be read as descriptions as to the "method for producing cardiac muscle cells" (method for producing a cell population in which the purity or the ratio of cardiac muscle cells is increased or the method for producing cardiac muscle cells contained in such a cell population) and the "method for producing ventricular muscle cells" (method for producing a cell population in which the purity or the ratio of ventricular muscle cells is increased or the method for producing ventricular muscle cells contained in such a cell population), respectively. It can be said that the method for purifying target cells and the method for producing target cells of the present invention correspond to the embodiments for purifying and producing target cells in the above-mentioned transfection method of the present invention, respectively. Descriptions relating to technical matters can optionally applied mutually.

Hereinafter, a method for producing the compound of the present invention will be described.

A starting material or a reagent used in each step in the production method given below and the obtained compound may each form a salt. Examples of such a salt include the same as the aforementioned salt of the compound of the present invention.

When the compound obtained in each step is a free compound, this compound can be converted to a salt of interest by a known method. On the contrary, when the compound obtained in each step is a salt, this salt can be converted to a free form or another type of salt of interest by a known method.

The compound obtained in each step may be used in the next reaction in the form of its reaction solution or after being obtained as a crude product. Alternatively, the compound obtained in each step can be isolated and/or purified from the reaction mixture by a separation approach such as concentration, crystallization, recrystallization, distillation, solvent extraction, fractionation, or chromatography according to a routine method.

If a starting material or a reagent compound for each step is commercially available, the commercially available product can be used directly.

In the reaction of each step, the reaction time may differ depending on the reagent or the solvent used and is usually 1 minute to 48 hours, preferably 10 minutes to 8 hours, unless otherwise specified.

In the reaction of each step, the reaction temperature may differ depending on the reagent or the solvent used and is usually −78° C. to 300° C., preferably −78° C. to 150° C., unless otherwise specified.

In the reaction of each step, the pressure may differ depending on the reagent or the solvent used and is usually 1 atm to 20 atm, preferably 1 atm to 3 atm, unless otherwise specified.

In the reaction of each step, a microwave synthesis apparatus, for example, Initiator manufactured by Biotage Japan Ltd., may be used. The reaction temperature may differ depending on the reagent or the solvent used and is usually room temperature to 300° C., preferably room temperature to 250° C., more preferably 50° C. to 250° C., unless otherwise specified. The reaction time may differ depending on the reagent or the solvent used and is usually 1 minute to 48 hours, preferably 1 minute to 8 hours, unless otherwise specified.

In the reaction of each step, the reagent is used at 0.5 equivalents to 20 equivalents, preferably 0.8 equivalents to 5 equivalents, based on the substrate, unless otherwise specified. In the case of using the reagent as a catalyst, the reagent is used at 0.001 equivalents to 1 equivalent, preferably 0.01 equivalents to 0.2 equivalents, based on the substrate. When the reagent also serves as a reaction solvent, the reagent is used in the amount as the solvent.

In the reaction of each step, this reaction is carried out without a solvent or by dissolution or suspension in an appropriate solvent, unless otherwise specified. Specific examples of the solvent include solvents described in Examples and the following:
  alcohols: methanol, ethanol, isopropanol, isobutanol, tert-butyl alcohol, 2-methoxyethanol, and the like;
  ethers: diethyl ether, diisopropyl ether, diphenyl ether, tetrahydrofuran, 1,2-dimethoxyethane, cyclopentyl methyl ether, and the like;
  aromatic hydrocarbons: chlorobenzene, toluene, xylene, and the like;
  saturated hydrocarbons: cyclohexane, hexane, heptane, and the like;
  amides: N,N-dimethylformamide, N-methylpyrrolidone, and the like;
  halogenated hydrocarbons: dichloromethane, carbon tetrachloride, and the like;
  nitriles: acetonitrile and the like;
  sulfoxides: dimethyl sulfoxide and the like;
  aromatic organic bases: pyridine and the like;
  acid anhydrides: acetic anhydride and the like;
  organic acids: formic acid, acetic acid, trifluoroacetic acid, and the like;
  inorganic acids: hydrochloric acid, sulfuric acid, and the like;
  esters: ethyl acetate, acetic acid isopropyl ester, and the like;
  ketones: acetone, methyl ethyl ketone, and the like; and
  water.

Two or more of these solvents may be used as a mixture at an appropriate ratio.

In the case of using a base in the reaction of each step, for example, the following base or a base described in Examples is used:
  inorganic bases: sodium hydroxide, potassium hydroxide, magnesium hydroxide, and the like;

basic salts: sodium carbonate, calcium carbonate, sodium bicarbonate, and the like;

organic bases: triethylamine, diethylamine, N,N-diisopropylethylamine, pyridine, 4-dimethylaminopyridine, N,N-dimethylaniline, 1,4-diazabicyclo[2.2.2]octane, 1,8-diazabicyclo[5.4.0]-7-undecene, imidazole, piperidine, and the like;

metal alkoxides: sodium ethoxide, potassium tert-butoxide, sodium tert-butoxide, and the like;

alkali metal hydrides: sodium hydride, and the like;

metal amides: sodium amide, lithium diisopropylamide, lithium hexamethyldisilazide, and the like; and organic lithiums: n-butyllithium, sec-butyllithium, and the like.

In the case of using an acid or an acidic catalyst in the reaction of each step, for example, the following acid or acidic catalyst or an acid or an acidic catalyst described in Examples is used:

inorganic acids: hydrochloric acid, sulfuric acid, nitric acid, hydrobromic acid, phosphoric acid, and the like;

organic acids: acetic acid, trifluoroacetic acid, citric acid, p-toluenesulfonic acid, 10-camphorsulfonic acid, and the like; and Lewis acids: boron trifluoride-diethyl ether complex, zinc iodide, anhydrous aluminum chloride, anhydrous zinc chloride, anhydrous iron chloride, and the like.

The reaction of each step is carried out according to a known method, for example, a method described in The Fifth Series of Experimental Chemistry, Vol. 13 to Vol. 19 (edited by The Chemical Society of Japan); Shin Jikken Kagaku Koza (in Japanese, translated title: New Experimental Chemistry), Vol. 14 to Vol. 15 (edited by The Chemical Society of Japan); Seimitsu Yuki Kagaku (in Japanese, translated title: Precise Organic Chemistry, original title: Reaktionen und Synthesen im organisch-chemischen Praktikum und Forschungslaboratorium) Revised, 2nd Ed. (L. F. Tietze, Th. Eicher, Nankodo Co., Ltd.); Organic Named Reactions; The Reaction Mechanism and Essence, Revised (Hideo Tougo, Kodansha Ltd.); Organic Syntheses Collective Volume I to VII (John Wiley & Sons, Inc.); Modern Organic Synthesis in the Laboratory: A Collection of Standard Experimental Procedures (Jie Jack Li, Oxford University Press); Comprehensive Heterocyclic Chemistry III, Vol. 1 to Vol. 14 (Elsevier Japan KK); Strategic Applications of Named Reactions in Organic Synthesis (translated by Kiyoshi Tomioka, published by Kagaku-Dojin Publishing Company, Inc.); Comprehensive Organic Transformations (VCH Publishers, Inc.) (1989), etc., or a method described in Examples, unless otherwise specified.

In each step, the protection or deprotection reaction of a functional group is carried out according to a known method, for example, a method described in "Protective Groups in Organic Synthesis, 4th Ed." (Theodora W. Greene, Peter G. M. Wuts), Wiley-Interscience (2007); "Protecting Groups, 3rd Ed." (P. J. Kocienski), Thieme Medical Publishers (2004), etc., or a method described in Examples.

Examples of a protective group for a hydroxy group or a phenolic hydroxy group in an alcohol or the like include: ether-type protective groups such as methoxy methyl ether, benzyl ether, p-methoxy benzyl ether, t-butyl dimethyl silyl ether, t-butyl diphenyl silyl ether, and tetrahydropyranyl ether; carboxylic acid ester-type protective groups such as acetic acid ester; sulfonic acid ester-type protective groups such as methanesulfonic acid ester; and carbonic acid ester-type protective groups such as t-butyl carbonate.

Examples of a protective group for a carbonyl group in an aldehyde include: acetal-type protective groups such as dimethylacetal; and cyclic acetal-type protective groups such as cyclic 1,3-dioxane.

Examples of a protective group for a carbonyl group in a ketone include: ketal-type protective groups such as dimethylketal; cyclic ketal-type protective groups such as cyclic 1,3-dioxane; oxime-type protective groups such as O-methyloxime; and hydrazone-type protective groups such as N,N-dimethylhydrazone.

Examples of a protective group for a carboxyl group include: ester-type protective groups such as methyl ester; and amide-type protective groups such as N,N-dimethylamide.

Examples of a protective group for a thiol include: ether-type protective groups such as benzyl thioether; and ester-type protective groups such as thioacetic acid ester, thiocarbonate, and thiocarbamate.

Examples of a protective group for an amino group or an aromatic heterocyclic ring such as imidazole, pyrrole, or indole include: carbamate-type protective groups such as benzyl carbamate; amide-type protective groups such as acetamide; alkylamine-type protective groups such as N-triphenylmethylamine; and sulfonamide-type protective groups such as methanesulfonamide.

These protective groups can be removed by use of a known method, for example, a method using an acid, a base, ultraviolet light, hydrazine, phenylhydrazine, sodium N-methyldithiocarbamate, tetrabutylammonium fluoride, palladium acetate, or trialkylsilyl halide (e.g., trimethylsilyl iodide and trimethylsilyl bromide), or a reduction method.

In the case of carrying out reduction reaction in each step, examples of the reducing agent used include: metal hydrides such as lithium aluminum hydride, sodium triacetoxyborohydride, sodium cyanoborohydride, diisobutyl aluminum hydride (DIBAL-H), sodium borohydride, and tetramethylammonium triacetoxyborohydride; boranes such as a borane-tetrahydrofuran complex; Raney nickel; Raney cobalt; hydrogen; and formic acid. For example, Raney nickel or Raney cobalt can be used in the presence of hydrogen or formic acid. In the case of reducing a carbon-carbon double bond or triple bond, a method using a catalyst such as palladium-carbon or a Lindlar's catalyst can be used.

In the case of carrying out oxidation reaction in each step, examples of the oxidizing agent used include: peracids such as m-chloroperbenzoic acid (MCPBA), hydrogen peroxide, and t-butyl hydroperoxide; perchlorates such as tetrabutylammonium perchlorate; chlorates such as sodium chlorate; chlorites such as sodium chlorite; periodates such as sodium periodate; high-valent iodine reagents such as iodosylbenzene; reagents having manganese, such as manganese dioxide and potassium permanganate; leads such as lead tetraacetate; reagents having chromium, such as pyridinium chlorochromate (PCC), pyridinium dichromate (PDC), and Jones reagents; halogen compounds such as N-bromosuccinimide (NBS); oxygen; ozone; a sulfur trioxide-pyridine complex; osmium tetroxide; selenium dioxide; and 2,3-dichloro-5,6-dicyano-1,4-benzoquinone (DDQ).

In the case of carrying out radical cyclization reaction in each step, examples of the radical initiator used include: azo compounds such as azobisisobutyronitrile (AIBN); water-soluble radical initiators such as 4-4'-azobis-4-cyanopentanoic acid (ACPA); triethylboron in the presence of air or oxygen; and benzoyl peroxide. Examples of the radical reaction agent used include tributylstannane, tristrimethylsilylsilane, 1,1,2,2-tetraphenyldisilane, diphenylsilane, and samarium iodide.

In the case of carrying out Wittig reaction in each step, examples of the Wittig reagent used include alkylidenephosphoranes. The alkylidenephosphoranes can be prepared by a known method, for example, the reaction between a phosphonium salt and a strong base.

In the case of carrying out Horner-Emmons reaction in each step, examples of the reagent used include: phosphonoacetic acid esters such as methyl dimethylphosphonoacetate and ethyl diethylphosphonoacetate; and bases such as alkali metal hydrides and organic lithiums.

In the case of carrying out Friedel-Crafts reaction in each step, examples of the reagent used include a Lewis acid and an acid chloride or an alkylating agent (e.g., alkyl halides, alcohols, and olefins). Alternatively, an organic acid or an inorganic acid may be used instead of the Lewis acid, and an acid anhydride such as acetic anhydride may be used instead of the acid chloride.

In the case of carrying out aromatic nucleophilic substitution reaction in each step, a nucleophile (e.g., amines and imidazole) and a base (e.g., basic salts and organic bases) are used as reagents.

In the case of carrying out nucleophilic addition reaction using a carbanion, nucleophilic 1,4-addition reaction (Michael addition reaction) using a carbanion, or nucleophilic substitution reaction using a carbanion in each step, examples of the base used for generating the carbanion include organic lithiums, metal alkoxides, inorganic bases, and organic bases.

In the case of carrying out Grignard reaction in each step, examples of the Grignard reagent include: aryl magnesium halides such as phenyl magnesium bromide; and alkyl magnesium halides such as methyl magnesium bromide and isopropyl magnesium bromide. The Grignard reagent can be prepared by a known method, for example, the reaction between alkyl halide or aryl halide and metal magnesium with ether or tetrahydrofuran as a solvent.

In the case of carrying out Knoevenagel condensation reaction in each step, an active methylene compound flanked by two electron-attracting groups (e.g., malonic acid, diethyl malonate, and malononitrile) and a base (e.g., organic bases, metal alkoxides, and inorganic bases) are used as reagents.

In the case of carrying out Vilsmeier-Haack reaction in each step, phosphoryl chloride and an amide derivative (e.g., N,N-dimethylformamide) are used as reagents.

In the case of carrying out azidation reaction of alcohols, alkyl halides, or sulfonic acid esters in each step, examples of the azidating agent used include diphenylphosphorylazide (DPPA), trimethylsilylazide, and sodium azide. In the case of azidating, for example, alcohols, a method using diphenylphosphorylazide and 1,8-diazabicyclo[5.4.0]undec-7-ene (DBU), a method using trimethylsilylazide and a Lewis acid, or the like can be used.

In the case of carrying out reductive amination reaction in each step, examples of the reducing agent used include sodium triacetoxyborohydride, sodium cyanoborohydride, hydrogen, and formic acid. When the substrate is an amine compound, examples of the carbonyl compound used include p-formaldehyde as well as aldehydes such as acetaldehyde, and ketones such as cyclohexanone. When the substrate is a carbonyl compound, examples of the amines used include: primary amine such as ammonia and methylamine; and secondary amine such as dimethylamine.

In the case of carrying out Mitsunobu reaction in each step, azodicarboxylic acid esters (e.g., diethyl azodicarboxylate (DEAD) and diisopropyl azodicarboxylate (DIAD)) and triphenylphosphine are used as reagents.

In the case of carrying out esterification reaction, amidation reaction, or ureation reaction in each step, examples of the reagent used include: an acyl halide form of acid chloride, acid bromide, and the like; and activated carboxylic acids such as an acid anhydride, an active ester form, and a sulfuric acid ester form. Examples of the activator for carboxylic acid include: carbodiimide condensing agents such as 1-ethyl-3-(3-dimethylaminopropyl)carbodiimide hydrochloride (WSCD); triazine condensing agents such as 4-(4,6-dimethoxy-1,3,5-triazin-2-yl)-4-methylmorpholinium chloride-n-hydrate (DMT-MM); carbonic acid ester condensing agents such as 1,1-carbonyldiimidazole (CDI); diphenylphosphorylazide (DPPA); benzotriazol-1-yloxy-trisdimethylaminophosphonium salt (BOP reagent); 2-chloro-1-methyl-pyridinium iodide (Mukaiyama reagent); thionyl chloride; lower alkyl haloformate such as ethyl chloroformate; O-(7-azabenzotriazol-1-yl)-N,N,N',N'-tetramethyluronium hexafluorophosphate (HATU); sulfuric acid; and combinations thereof. In the case of using a carbodiimide condensing agent, an additive such as 1-hydroxybenzotriazole (HOBt), N-hydroxysuccinimide (HOSu), or dimethylaminopyridine (DMAP) may be further added for the reaction.

In the case of carrying out coupling reaction in each step, examples of the metal catalyst used include: palladium compounds such as palladium(II) acetate, tetrakis(triphenylphosphine)palladium(0), dichlorobis(triphenylphosphine)palladium(II), dichlorobis(triethylphosphine)palladium(II), tris(dibenzylideneacetone)dipalladium(0), 1,1'-bis(diphenylphosphino)ferrocene palladium(II) chloride, and palladium(II) acetate; nickel compounds such as tetrakis(triphenylphosphine)nickel(0); rhodium compounds such as tris(triphenylphosphine)rhodium(III) chloride; cobalt compounds; copper compounds such as copper oxide and copper (I) iodide; and platinum compounds. A base may be further added for the reaction. Examples of such a base include inorganic bases and basic salts.

In the case of carrying out thiocarbonylation reaction in each step, diphosphorus pentasulfide is typically used as a thiocarbonylating agent. A reagent having a 1,3,2,4-dithiadiphosphetane-2,4-disulfide structure such as 2,4-bis(4-methoxyphenyl-1,3,2,4-dithiadiphosphetane-2,4-disulfide (Lawesson's reagent) may be used instead of diphosphorus pentasulfide.

In the case of carrying out Wohl-Ziegler reaction in each step, examples of the halogenating agent used include N-iodosuccinimide, N-bromosuccinimide (NBS), N-chlorosuccinimide (NCS), bromine, and sulfuryl chloride. The reaction can be accelerated by the further addition of heat, light, a radical initiator such as benzoyl peroxide or azobisisobutyronitrile for the reaction.

In the case of carrying out halogenation reaction of a hydroxy group in each step, examples of the halogenating agent used include a hydrohalic acid and an acid halide of an inorganic acid, specifically, hydrochloric acid, thionyl chloride, and phosphorus oxychloride for chlorination, and 48% hydrobromic acid for bromination. Also, a method for obtaining an alkyl halide form from an alcohol by the action of triphenylphosphine and carbon tetrachloride or carbon tetrabromide or the like may be used. Alternatively, a method for synthesizing an alkyl halide form through 2-stage reactions involving the conversion of an alcohol to sulfonic acid ester and the subsequent reaction with lithium bromide, lithium chloride, or sodium iodide may be used.

In the case of carrying out Arbuzov reaction in each step, examples of the reagent used include: alkyl halides such as ethyl bromoacetate; and phosphites such as triethyl phosphite and tri(isopropyl) phosphite.

In the case of carrying out sulfone-esterification reaction in each step, examples of the sulfonylating agent used include methanesulfonyl chloride, p-toluenesulfonyl chloride, methanesulfonic anhydride, p-toluenesulfonic anhydride, and trifluoromethanesulfonic anhydride.

In the case of carrying out hydrolysis reaction in each step, an acid or a base is used as a reagent. In the case of carrying out acid hydrolysis reaction of t-butyl ester, formic acid, triethylsilane, or the like may be added in order to reductively trap a by-product t-butyl cation.

In the case of carrying out dehydration reaction in each step, examples of the dehydrating agent used include sulfuric acid, diphosphorus pentoxide, phosphorus oxychloride, N,N'-dicyclohexylcarbodiimide, alumina, and polyphosphoric acid.

The compound (I) can be produced by, for example, a production method given below. In the present invention, the compound (I) having the desired structure can be synthesized by using a starting material appropriate for the structure of the compound (I) of interest, particularly, for esterification. The salt of the compound (I) can be obtained by appropriate mixing with an inorganic base, an organic base, an organic acid, or a basic or acidic amino acid.

[Formula 8-1]
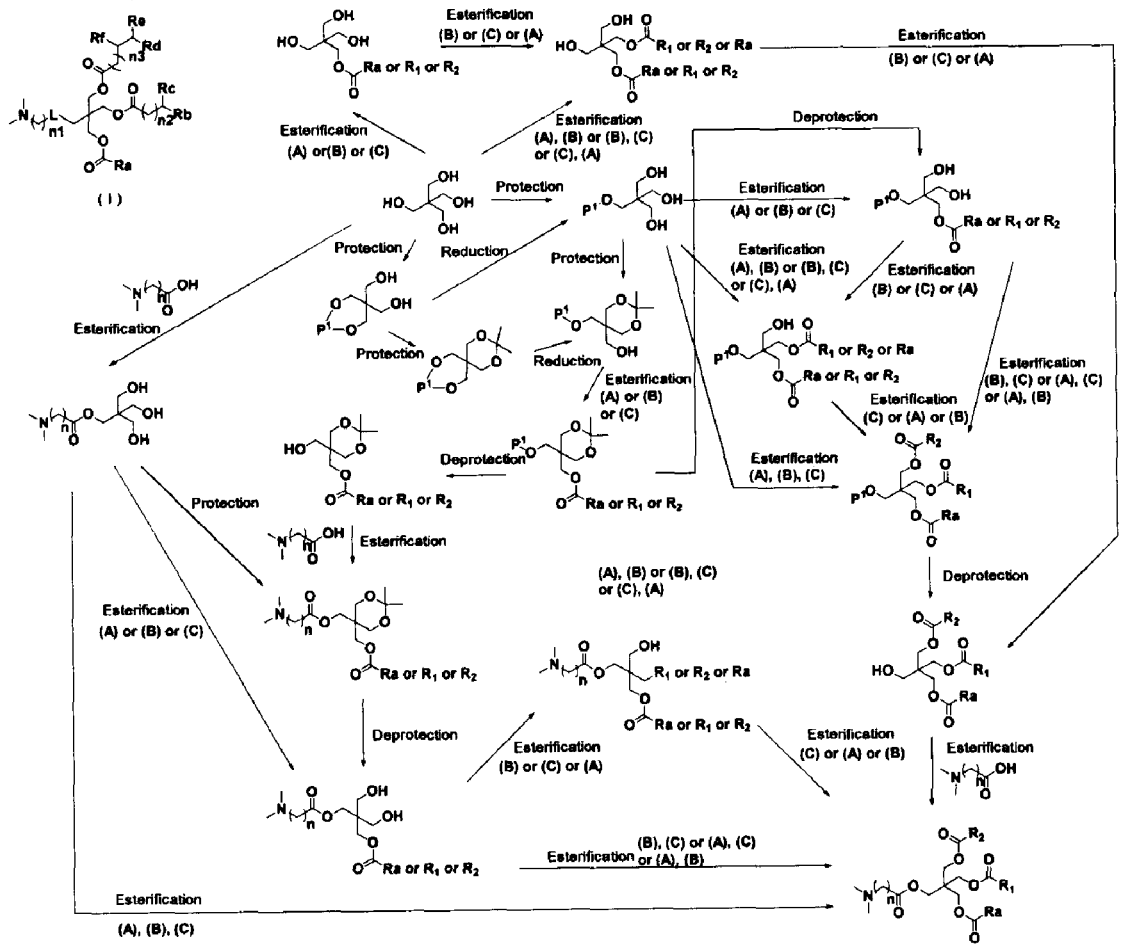
[Formula 8-2]
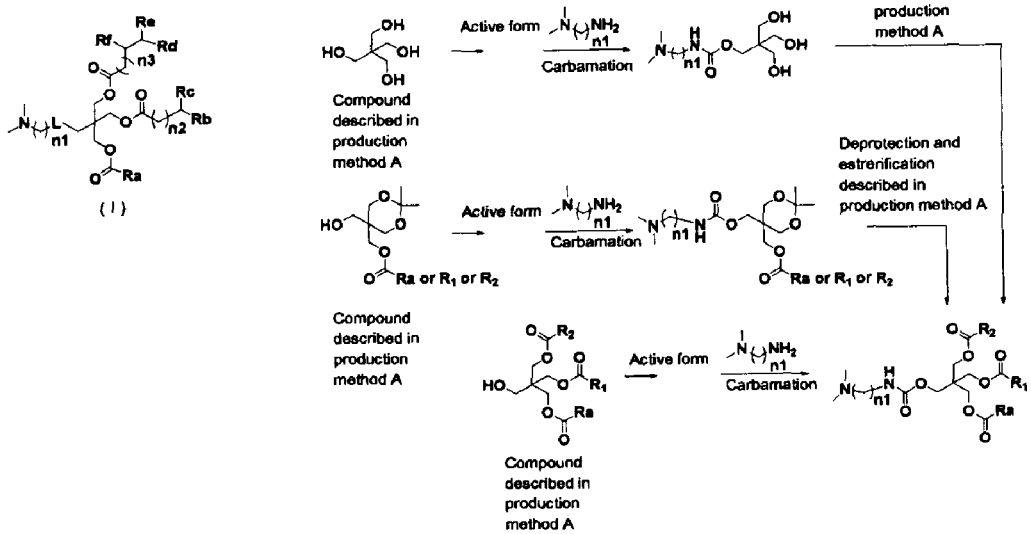

[Formula 8-3]
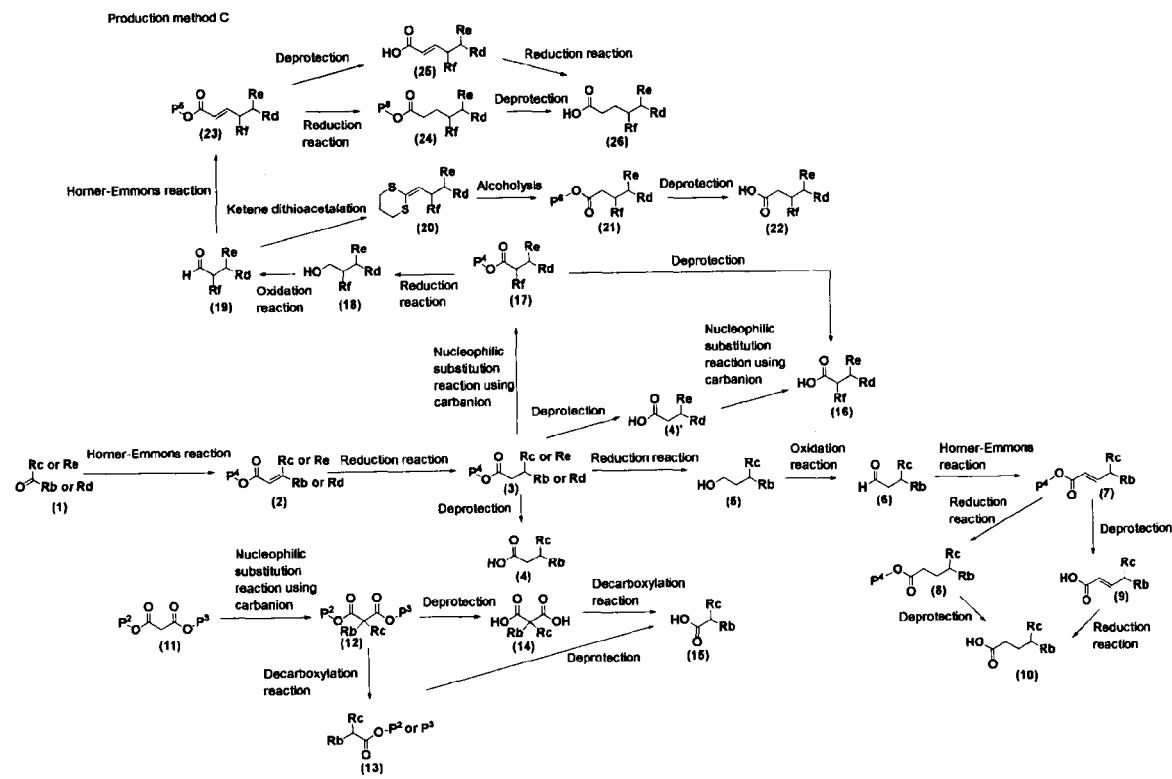
[Formula 8-4]

wherein $P^1$, $P^2$, $P^3$, $P^4$, $P^5$ and $P^6$ each independently represent a protecting group,
the compound (A) represents formula:

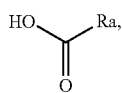

the compound (B) represents formula:

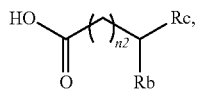

R1 represents

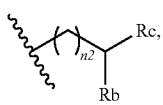

the compound (C) represent formula:

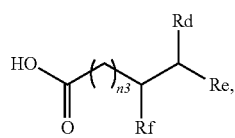

R2 represents

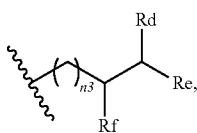

and other symbols represent the same meanings as above.

Hereinafter, methods for producing a lipid particle containing the compound of the present invention and a composition for transfecting a nucleic acid into a cardiac muscle cell, containing the lipid particle and the nucleic acid (composition of the present invention) will be described hereinafter.

The lipid particle of the present invention can be produced by a known method for preparing a lipid particle from the lipid components after mixing of the compound of the present invention as a cationic lipid with an additional lipid component (e.g., structured lipid). For example, the mixed lipid component described above is dissolved in an organic solvent, and the resulting solution in the organic solvent can be mixed (e.g., by an emulsification method) with water or a buffer solution to produce a lipid particle dispersion. The mixing can be performed using a microfluidic mixing system (e.g., NanoAssemblr apparatus (Precision NanoSystems Inc.)). The obtained lipid particle may be subjected to desalting or dialysis and sterile filtration. If necessary, pH adjustment or osmotic pressure adjustment may be carried out.

The compound (I) may assume a plurality of structures by combinations of definitions of n1, n2, n3, L, Ra, Rb, Rc, Rd, Re, and Rf in the formula (I). In the production of the lipid particle, one type of compound having a specific structure may be used as the compound (I), or plural types of compounds differing in structure may be used as a mixture.

Examples of the "structured lipid" include lipids as mentioned above, for example, sterols, phospholipids, and polyethylene glycol lipids. For example, 0.008 to 4 mol of "structured lipid" is used based on 1 mol of the compound of the present invention. The compound of the present invention is preferably mixed especially with cholesterol as a sterol, phosphatidylcholine as a phospholipid, and a polyethylene glycol lipid and used. A preferable mixing ratio when the above-mentioned components are used as the structured lipids is 1 to 4 mol of the compound of the present invention, 0 to 3 mol of the sterol, 0 to 2 mol of the phospholipid and 0 to 1 mol of the polyethylene glycol lipid. A more preferable mixing ratio when the above-mentioned components are used as the structured lipids is 1 to 1.5 mol of the compound of the present invention, 0 to 1.25 mol of the sterol, 0 to 0.5 mol of the phospholipid and 0 to 0.125 mol of the polyethylene glycol lipid.

The concentration of the compound of the present invention or the mixture of the compound of the present invention with the additional lipid component in the solution in the organic solvent described above is preferably 0.5 to 100 mg/mL.

Examples of the organic solvent include methanol, ethanol, 1-propanol, 2-propanol, 1-butanol, tert-butanol, acetone, acetonitrile, N,N-dimethylformamide, dimethyl sulfoxide, and mixtures thereof. The organic solvent may contain 0 to 20% of water or a buffer solution.

Examples of the buffer solution include acidic buffer solutions (e.g., an acetate buffer solution, a citrate buffer solution, a 2-morpholinoethanesulfonic acid (MES) buffer solution, and a phosphate buffer solution), and neutral buffer solutions (e.g., a 4-(2-hydroxyethyl)-1-piperazineethanesulfonic acid (HEPES) buffer solution, a tris(hydroxymethyl)aminomethane (Tris) buffer solution, a phosphate buffer solution, and phosphate-buffered saline (PBS)).

In the case of carrying out the mixing using a microfluidic mixing system, 1 to 5 parts by volume of water or a buffer solution are preferably mixed with 1 part by volume of the solution in the organic solvent. In the system, the flow rate of the mixed solution (the mixed solution of the solution in the organic solvent with water or the buffer solution) is, for example, 0.01 to 20 mL/min, preferably 0.1 to 10 mL/min, and the temperature is, for example, 5 to 60° C., preferably 15 to 45° C.

The composition of the present invention can be produced as a lipid particle dispersion containing a nucleic acid by adding the nucleic acid to water or a buffer solution for the production of the lipid particle or a lipid particle dispersion. The nucleic acid is preferably added such that the concentration of the nucleic acid in water or the buffer solution is, for example, 0.01 to 20 mg/mL, preferably 0.05 to 2.0 mg/mL.

Alternatively, the composition of the present invention may be produced as a lipid particle dispersion containing the nucleic acid also by mixing the lipid particle or a lipid particle dispersion with the nucleic acid or an aqueous solution thereof by a known method. The lipid particle dispersion can be prepared by dispersing the lipid particle in an appropriate dispersion medium. The aqueous solution of the nucleic acid can be prepared by dissolving the nucleic acid in an appropriate solvent.

The content of the compound of the present invention in the composition of the present invention excluding the dispersion medium and the solvent is usually 10 to 70% by weight, preferably 40 to 70% by weight.

The content of the nucleic acid in the composition of the present invention excluding the dispersion medium and the solvent is usually 0.1 to 25% by weight, preferably 1 to 20% by weight.

The dispersion medium in the lipid particle dispersion or the dispersion containing the composition can be replaced with water or a buffer solution by dialysis. The dialysis is carried out at 4° C. to room temperature using an ultrafiltration membrane having a molecular weight cutoff of 10 to 20 K. The dialysis may be performed repetitively. The replacement of the dispersion medium may employ tangential flow filtration (TFF). After the replacement of the dispersion medium, if necessary, pH adjustment or osmotic pressure adjustment may be carried out. Examples of the pH adjuster include sodium hydroxide, citric acid, acetic acid, triethanolamine, sodium hydrogen phosphate, sodium dihydrogen phosphate, and potassium dihydrogen phosphate. Examples of the osmotic pressure adjuster include: inorganic salts such as sodium chloride, potassium chloride, sodium hydrogen phosphate, potassium hydrogen phosphate, sodium dihydrogen phosphate, and potassium dihydrogen phosphate; polyols such as glycerol, mannitol, and sorbitol; and sugars such as glucose, fructose, lactose, and sucrose. The pH is usually adjusted to 6.5 to 8.0, preferably 7.0 to 7.8. The osmotic pressure is preferably adjusted to 250 to 350 Osm/kg.

The composition of the present invention may contain, if necessary, a component other than the lipid particle and the nucleic acid. Examples of such a component include appropriate amounts of a stabilizer and an antioxidant.

Examples of the stabilizer include, but are not particularly limited to, sugars such as glycerol, mannitol, sorbitol, lactose, and sucrose.

Examples of the antioxidant include ascorbic acid, uric acid, cysteine, tocopherol homologs (vitamin E, four isomers tocopherol α, β, γ, and δ, etc.), EDTA, and cysteine.

Hereinafter, methods for analyzing a lipid particle containing the compound of the present invention, and a composition containing the lipid particle and a nucleic acid will be described.

The particle size of the lipid particle (in the composition) can be measured by a known approach. For example, the particle size can be calculated as a Z-average particle size by the cumulant analysis of an autocorrelation function using a particle size measurement apparatus Zetasizer Nano ZS (Malvern Instruments) based on a dynamic light scattering measurement technique. The particle size (average particle size) of the lipid particle (in the composition) is, for example, 10 to 200 nm, preferably 60 to 150 nm.

The concentration and rate of encapsulation of the nucleic acid (e.g., siRNA or mRNA) in the composition of the present invention can be measured by a known approach. For example, the nucleic acid is fluorescently labeled using Quant-iT™ RiboGreen® (Invitrogen Corp.), and the fluorescence intensity can be measured to determine the concentration and the rate of encapsulation. The concentration of the nucleic acid in the composition can be calculated using a calibration curve prepared from aqueous nucleic acid solutions having known concentrations. The rate of encapsulation can be calculated on the basis of the difference in fluorescence intensity between the presence and absence of addition of Triton-X 100 (surfactant for disrupting the lipid particle). The concentration of the nucleic acid in the composition refers to the total concentration of a nucleic acid encapsulated in the lipid particle and an unencapsulated nucleic acid. The rate of encapsulation refers to the ratio of the nucleic acid encapsulated in the lipid particle to all nucleic acids in the composition.

A kit of the present invention will be described hereinafter,

The kit of the present invention contains 1) the compound represented by the formula (I) or the salt thereof (compound of the present invention), 2) the structured lipid, and 3) the nucleic acid. The compound of the present invention, the structured lipid, and the nucleic acid in the kit of the present invention are the same as the compound of the present invention, the structured lipid, and the nucleic acid contained in the composition of the present invention.

EXAMPLES

Although the present invention will be described in further detail by the following Synthesis Examples, Preparation Examples, and Examples, these do not limit the present invention, and may be modified as long as these do not deviate from the scope of the present invention.

In the examples given below, the term "room temperature" usually refers to a temperature of approximately 10° C. to approximately 35° C. The ratio shown in a mixed solvent refers to a volume ratio, unless otherwise specified. The term "%" refers to % by weight, unless otherwise specified.

In the examples, elution for column chromatography was performed under observation by TLC (thin layer chromatography), unless otherwise specified. In the TLC observation, 60 F254 manufactured by Merck KGaA was used as a TLC plate, and a solvent used as an eluting solvent in column chromatography was used as a developing solvent. Detection adopted a UV detector, and a TLC chromogenic reagent was used, if necessary, for observation. In silica gel column chromatography, the term "NH" means that an aminopropylsilane-bound silica gel was used, and the term "Diol" means that a 3-(2,3-dihydroxypropoxy)propylsilane-bound silica gel was used. In preparative HPLC (high-performance liquid chromatography), the term "C18" means that an octadecyl-bound silica gel was used. The ratio shown in an eluting solvent refers to a volume ratio, unless otherwise specified.

$^1$H NMR was measured by Fourier transform NMR. $^1$H NMR was analyzed using ACD/SpecManager (trade name) software or the like. Very gentle peaks of protons of, for example, a hydroxyl group and an amino group may not be described.

MS was measured by LC/MS and MALDI/TOFMS. ESI, APCI, or MALDI was used as an ionization method. CHCA was used as a matrix. Measured values (Found) are shown in data. A molecular ion peak is usually observed. However, the peak observed may be of a fragment ion. For a salt, the peak observed is usually of a free molecular ion, a cationic species, an anionic species or a fragment ion.

The following abbreviations are used in the examples given below.

MS: mass spectrum
M: molar concentration
N: normality
$CDCl_3$: deuterated chloroform
DMSO-$d_6$: deuterated dimethyl sulfoxide
$^1$H NMR: proton nuclear magnetic resonance
LC/MS: liquid chromatograph-mass spectrometer
ESI: electrospray ionization
APCI: atmospheric pressure chemical ionization MALDI: matrix-assisted laser desorption/ionization
TOFMS: time-of-flight mass spectrometry
CHCA: α-cyano-4-hydroxycinnamic acid
DMF: N,N-dimethylformamide
THF: tetrahydrofuran
DMAP: 4-dimethylaminopyridine
TBAF: tetrabutyl ammonium fluoride
DIBAL-H: diisobutyl aluminum hydride
DBU: 1,8-diazabicyclo[5,4,0]undec-7-ene

[Synthesis Example 1] 3-((5-(Dimethylamino)pentanoyl)oxy)-2,2-bis((octanoyloxy)methyl)propyl 4-heptylundecanoate A) 2-Heptylnonanoic acid methyl ester Under nitrogen stream and ice cooling, a suspension of 60% sodium hydride (containing mineral oil) (3.78 g) in dehydrated DMF (100 mL) was stirred for 10 minutes. Then, dimethyl malonate (5.0 g) was added dropwise thereto at 10° C. or lower. After stirring at the same temperature as above for 10 minutes, 1-iodoheptane (18.3 mL) was added dropwise thereto, and the mixture was warmed to room temperature. 4 hours later, the reaction mixture was neutralized with 6 N hydrochloric acid, then diluted with ethyl acetate, washed twice with saturated brine, and then dried over anhydrous sodium sulfate. The solvent was distilled off under reduced pressure. The residue was dissolved in DMSO (75 mL). To the solution, water (0.68 mL) and lithium chloride (3.21 g) were added, and the mixture was warmed to 165° C. After stirring at the same temperature as above for 16 hours, water was added thereto, and the mixture was diluted with ethyl acetate. The dilution was washed twice with saturated brine and then dried over anhydrous sodium sulfate. The solvent was distilled off under reduced pressure. The residue was purified by silica gel column chromatography (ethyl acetate/hexane) to obtain the title compound (8.14 g).
$^1$H NMR (500 MHz, CDCl$_3$) δ ppm 0.84-0.90 (6H, m), 1.20-1.32 (20H, m), 1.36-1.47 (2H, m), 1.54-1.62 (2H, m), 2.33 (1H, tt, J=9.0, 5.4 Hz), 3.67 (3H, s)

B) 2-Heptylnonan-1-ol

Under nitrogen stream and ice cooling, a solution of 2-heptylnonanoic acid methyl ester (7.67 g) in dehydrated THF (50 mL) was added dropwise to a suspension of lithium aluminum hydride (2.15 g) in dehydrated THF (92 mL), and the mixture was stirred at 10° C. or lower for 1 hour. Then, the reaction mixture was warmed to room temperature and stirred for 3 hours. After cooling to 10° C. or lower again, sodium sulfate decahydrate was added thereto in small portions. After dilution with ethyl acetate, insoluble matter was filtered through celite. The solvent was distilled off under reduced pressure to obtain the title compound (6.91 g).
$^1$H NMR (500 MHz, CDCl$_3$) δ ppm 0.86-0.91 (6H, m), 1.16-1.34 (25H, m), 1.41-1.49 (1H, m), 3.54 (2H, t, J=5.2 Hz)

C) 2-Heptylnonanal

Under nitrogen stream, a solution of oxalyl chloride (4.9 mL) in dichloromethane (30 mL) was cooled to −70° C., and a solution of dimethyl sulfoxide (6.1 mL) in dichloromethane (30 mL) was added dropwise thereto while −60° C. or lower was kept. After stirring at −70° C. for 15 minutes, a solution of 2-heptylnonan-1-ol (6.9 g) in dichloromethane (25 mL) was added dropwise thereto while −60° C. or lower was kept. After stirring at −70° C. for 2 hours, triethylamine (23.8 mL) was added thereto, and the mixture was warmed to room temperature. The reaction mixture was subjected to liquid separation operation by the addition of a saturated aqueous solution of ammonium chloride and then dried over anhydrous sodium sulfate. Then, the solvent was distilled off under reduced pressure. The residue was purified by silica gel column chromatography (ethyl acetate/hexane) to obtain the title compound (6.06 g).
$^1$H NMR (500 MHz, CDCl$_3$) δ ppm 0.85-0.92 (6H, m), 1.19-1.33 (20H, m), 1.37-1.47 (2H, m), 1.56-1.65 (2H, m), 2.18-2.25 (1H, m), 9.55 (1H, d, J=3.2 Hz)

D) Ethyl-4-heptylundec-2-enoate

Under nitrogen stream and ice cooling, a suspension of 60% sodium hydride (containing mineral oil) (1.4 g) in dehydrated THF (70 mL) was stirred for 10 minutes. Then, ethyl(diethoxyphosphoryl)acetate (16.8 g) was added dropwise thereto at 10° C. or lower. After stirring at the same temperature as above for 10 minutes, a solution of 2-heptylnonanal (6.0 g) in dehydrated THF (60 mL) was added dropwise thereto, and the mixture was warmed to room temperature. The reaction mixture was stirred for a while and then warmed to 50° C. After stirring for 6 hours, the reaction mixture was brought to 5° C. or lower, and after addition of water, diluted with ethyl acetate, washed twice with saturated brine, and then dried over anhydrous sodium sulfate. The solvent was distilled off under reduced pressure. The residue was purified by silica gel column chromatography (ethyl acetate/hexane) to obtain the title compound (5.4 g).
$^1$H NMR (500 MHz, CDCl$_3$) δ ppm 0.87 (6H, t, J=6.0 Hz), 1.16-1.34 (25H, m), 1.37-1.45 (2H, m) 2.07-2.15 (1H, m), 4.19 (2H, q, J=7.5 Hz), 5.75 (1H, d, J=16.0 Hz), 6.75 (1H, dd, J=16.0, 10.0 Hz)

E) 4-Heptylundecanoic acid

To a solution of ethyl-4-heptylundec-2-enoate (5.40 g) in ethanol (100 mL), 10% Pd carbon (1.08 g) was added at room temperature, and the mixture was stirred for 20 hours in a hydrogen atmosphere. After reaction, Pd carbon was filtered off. Then, the solvent was distilled off under reduced pressure. To the obtained residue, a solution of an 8 N aqueous sodium hydroxide solution (6.38 mL) in ethanol (20 mL) was added, and the mixture was stirred at 60° C. for 5 hours. The solvent was distilled off under reduced pressure. Then, the residue was rendered acidic with 6 N hydrochloric acid. The residue was diluted with hexane, washed once with saturated brine, and then dried over anhydrous sodium sulfate. The solvent was distilled off under reduced pressure to obtain the title compound (4.73 g).
$^1$H NMR (500 MHz, CDCl$_3$) δ ppm 0.88 (6H, t, J=7.5 Hz), 1.17-1.41 (25H, m), 1.16-1.34 (2H, m), 2.22-2.34 (2H, m)

F) 2-(((tert-Butyl(diphenyl)silyl)oxy)methyl)-2-(hydroxymethyl)propane-1,3-diol

To a mixture of 2,2-bis(hydroxymethyl)propane-1,3-diol (5.0 g), 1H-imidazole (2.5 g) and DMF (200 mL), a solution of tert-butylchlorodiphenylsilane (5.1 g) in DMF (10 mL) was added at room temperature. After stirring for 18 hours, the reaction mixture was concentrated under reduced pressure. The residue was diluted with ethyl acetate, washed three times with water and once with saturated brine, and then dried over anhydrous sodium sulfate. The solvent was distilled off under reduced pressure. The residue was purified by silica gel column chromatography (ethyl acetate/hexane) to obtain the title compound (6.4 g).

¹H NMR (500 MHz, CDCl₃) δ ppm 1.07 (9H, s), 2.34 (3H, t, J=5.5 Hz), 3.67 (2H, s), 3.74 (6H, d, J=5.7 Hz), 7.39-7.48 (6H, m), 7.63-7.67 (4H, m)

G) (5-(((tert-Butyl(diphenyl)silyl)oxy)methyl)-2,2-dimethyl-1,3-dioxan-5-yl)methanol To a solution of 2-(((tert-butyl(diphenyl)silyl)oxy) methyl)-2-(hydroxymethyl)propane-1,3-diol (3.5 g) and 2,2-dimethoxypropane (1.5 g) in acetone (35 mL), p-toluenesulfonic acid monohydrate (89 mg) was added at room temperature. After stirring for 2 hours, the reaction mixture was neutralized by the addition of dilute ammonia water. Then, the solvent was distilled off under reduced pressure. The residue was purified by silica gel column chromatography (ethyl acetate/hexane) to obtain the title compound (2.7 g).

¹H NMR (500 MHz, CDCl₃) δ ppm 1.07 (9H, s), 1.27 (3H, s), 1.41 (3H, s), 2.12-2.18 (1H, m), 3.69-3.78 (8H, m), 7.38-7.47 (6H, m), 7.65-7.69 (4H, m)

H) (5-(Hydroxymethyl)-2,2-dimethyl-1,3-dioxan-5-yl)methyl 4-heptylundecanoate To a solution of (5-(((tert-butyl(diphenyl)silyl)oxy) methyl)-2,2-dimethyl-1,3-dioxan-5-yl)methanol (3.56 g), DMAP (1.37 g) and 4-heptylundecanoic acid (3.18 g) in DMF (30 mL), 1-ethyl-3-(3-dimethylaminopropyl)carbodiimide hydrochloride (2.47 g) was added at 50° C. After stirring for 6 hours, ethyl acetate was added to the reaction mixture, and the mixture was washed once with water and once with saturated brine and then dried over anhydrous sodium sulfate. Then, the solvent was distilled off under reduced pressure. To a solution of the obtained residue (6.15 g) in THF (20 mL), a solution of TBAF in THF (1 M, 10.3 mL) was added at room temperature. After stirring for 4 hours, the reaction mixture was concentrated under reduced pressure. The residue was diluted with ethyl acetate, washed once with water and once with saturated brine, and then dried over anhydrous sodium sulfate. The solvent was distilled off under reduced pressure. The residue was purified by silica gel column chromatography (ethyl acetate/hexane) to obtain the title compound (2.34 g).

¹H NMR (500 MHz, CDCl₃) δ ppm 0.88 (6H, t, J=6.9 Hz), 1.22-1.32 (25H, m), 1.42 (6H, s), 1.57-1.62 (2H, m), 2.30-2.35 (2H, m), 3.48 (2H, d, J=6.6 Hz), 3.71-3.73 (4H, m), 4.25 (2H, s)

I) (5-(((5-Dimethylamino)pentanoyl)oxy)methyl)-2,2-dimethyl-1,3-dioxan-5-yl)methyl 4-heptylundecanoate To a solution of (5-(hydroxymethyl)-2,2-dimethyl-1,3-dioxan-5-yl)methyl 4-heptylundecanoate (1.2 g), DMAP (0.94 g) and 5-(dimethylamino)pentanoic acid hydrochloride (0.74 g) in DMF (30 mL), 1-ethyl-3-(3-dimethylaminopropyl)carbodiimide hydrochloride (0.94 g) was added at 40° C. After stirring for 4 hours, ethyl acetate was added to the reaction mixture, and the mixture was washed once with water and once with saturated brine and then dried over anhydrous sodium sulfate. Then, the solvent was distilled off under reduced pressure. The residue was purified by silica gel column chromatography (NH, ethyl acetate/hexane) to obtain the title compound (1.37 g).

¹H NMR (500 MHz, CDCl₃) δ ppm 0.88 (6H, t, J=6.9 Hz), 1.20-1.32 (25H, m), 1.42 (6H, s), 1.45-1.52 (2H, m), 1.54-1.67 (4H, m), 2.21 (6H, s), 2.23-2.31 (4H, m), 2.35 (2H, t, J=7.5 Hz), 3.75 (4H, s), 4.11 (2H, s), 4.12 (2H, s)

J) 3-((5-(Dimethylamino)pentanoyl)oxy)-2,2-bis ((octanoyloxy)methyl)propyl 4-heptylundecanoate To (5-(((5-dimethylamino)pentanoyl)oxy)methyl)-2,2-dimethyl-1,3-dioxan-5-yl)methyl 4-heptylundecanoate (1.37 g), acetic acid (6.85 mL) and water (3.43 mL) were added, and the mixture was stirred at 70° C. for 2 hours. Then, the solvent was distilled off under reduced pressure. Ethyl acetate and a saturated aqueous solution of sodium bicarbonate were added to the residue, and the mixture was stirred for 2 hours. The reaction mixture was washed twice with water and then dried over anhydrous sodium sulfate. Then, the solvent was distilled off under reduced pressure. To the obtained residue (400 mg), a solution of DMAP (478 mg) and octanoic acid (327 mg) in DMF (4 mL) was added, and then, 1-ethyl-3-(3-dimethylaminopropyl)carbodiimide hydrochloride (478 mg) was added at 50° C. After stirring for 4 hours, ethyl acetate was added to the reaction mixture, and the mixture was washed twice with a saturated aqueous solution of sodium carbonate and once with saturated brine and then dried over anhydrous sodium sulfate. Then, the solvent was distilled off under reduced pressure. The residue was purified by silica gel column chromatography (NH, ethyl acetate/hexane) to obtain the title compound (300 mg).

¹H NMR (500 MHz, CDCl₃) δ ppm 0.86-0.91 (12H, m), 1.15-1.34 (45H, m), 1.45-1.52 (2H, m), 1.53-1.66 (4H, m), 2.20 (6H, s), 2.23-2.36 (10H, m), 4.11 (8H, s)

[Synthesis Example 8] 2-(((6-(Dimethylamino) hexanoyl)oxy)methyl)-2-((octanoyloxy)methyl)propane-1,3-diyl bis(2-hexyloctanoate)

A) 2-Hexyloctanoic acid

Under nitrogen stream and ice cooling, a suspension of 60% sodium hydride (containing mineral oil) (3.78 g) in dehydrated DMF (90 mL) was stirred for 10 minutes. Then, dimethyl malonate (5.0 g) was added dropwise thereto at 10° C. or lower. After stirring at the same temperature as above for 10 minutes, 1-iodohexane (16.8 mL) was added dropwise thereto, and the mixture was warmed to room temperature. 8 hours later, acetic acid (1 mL) was added to the reaction mixture. Then, the mixture was diluted with ethyl acetate, washed twice with water and once with saturated brine, and then dried over anhydrous sodium sulfate. The solvent was distilled off under reduced pressure. The residue was dissolved in EtOH (80 mL). To the solution, an 8 N aqueous sodium hydroxide solution (25 mL) was added, and the mixture was stirred at 60° C. for 6 hours. The reaction mixture was neutralized with 6 N hydrochloric acid, then diluted with ethyl acetate, washed with saturated brine, and then dried over anhydrous sodium sulfate. The solvent was distilled off under reduced pressure. The residue was heated at 160° C. for 1.5 hours, cooled to room temperature, and then purified by silica gel column chromatography (ethyl acetate/hexane) to obtain the title compound (7.45 g).

¹H NMR (500 MHz, CDCl₃) δ ppm 0.83-0.92 (6H, m), 1.22-1.35 (16H, m), 1.38-1.52 (2H, m), 1.56-1.67 (2H, m), 2.34 (1H, ddd, J=8.7, 5.4, 3.3 Hz)

B) (2-(4-Methoxyphenyl)-1,3-dioxane-5,5-diyl)dimethanol

A solution of 2,2-bis(hydroxymethyl)propane-1,3-diol (506 g) in water (2.0 L) was stirred at 50° C. Concentrated hydrochloric acid (18 mL) was added thereto, and p-methoxybenzaldehyde (474 mL) was added dropwise thereto around 30° C. over 3 hours. Then, the reaction solution was brought to 25° C. and stirred for 5 hours. A 2

N aqueous sodium hydroxide solution (120 mL) was added thereto, and the mixture was stirred for 1 hour. Crystals were filtered, washed with water, and then recrystallized with ethyl acetate/hexane to obtain the title compound (769 g).

$^1$H NMR (500 MHz, DMSO-$d_6$) δ ppm 3.24 (2H, d, J=5.0 Hz), 3.67 (2H, d, J=5.4 Hz), 3.74 (3H, s), 3.77 (2H, d, J=11.3 Hz), 3.88 (2H, t, J=11.3 Hz), 4.53 (1H, t, J=5.4 Hz), 4.62 (1H, t, J=5.0 Hz), 5.34 (1H, s), 6.90 (2H, d, J=8.9 Hz), 7.33 (2H, d, J=8.9 Hz)

C) 9-(4-Methoxyphenyl)-3,3-dimethyl-2,4,8,10-tetraoxaspiro[5.5]undecane

To a solution of (2-(4-methoxyphenyl)-1,3-dioxane-5,5-diyl)dimethanol (2.00 g) and 2,2-dimethoxypropane (2.46 g) in DMF (8 mL), pyridinium p-toluenesulfonate (20 mg) was added at room temperature. After stirring for 4 hours, the reaction mixture was diluted with ethyl acetate, washed twice with a saturated aqueous solution of sodium bicarbonate and twice with saturated brine, and then dried over anhydrous magnesium sulfate. Then, the solvent was distilled off under reduced pressure. The residue was recrystallized with ethyl acetate/hexane to obtain the title compound (1.62 g).

$^1$H NMR (500 MHz, DMSO-$d_6$) δ ppm 1.34 (6H, s), 3.33 (2H, s), 3.63 (2H, d, J=11.7 Hz), 3.74 (3H, s), 3.99 (2H, s), 4.12 (2H, d, J=11.7 Hz), 5.37 (1H, s), 6.90 (2H, d, J=8.8 Hz), 7.34 (2H, d, J=8.8 Hz)

D) (5-(((4-Methoxybenzyl)oxy)methyl)-2,2-dimethyl-1,3-dioxan-5-yl)methanol

To a suspension of 9-(4-methoxyphenyl)-3,3-dimethyl-2,4,8,10-tetraoxaspiro[5.5]undecane (22.0 g) in toluene (200 mL), a 1.5 M DIBAL-H solution (60 mL) was added dropwise at 5 to 20° C., and the mixture was stirred at 15° C. for 3 hours. Methanol (22 mL) was added thereto, and then, a 2 N aqueous sodium hydroxide solution (100 mL) and a 4 N aqueous sodium hydroxide solution (200 mL) were added dropwise thereto in order. After stirring for 1.5 hours, the toluene layer was separated and washed with 5% brine. The solvent was distilled off under reduced pressure. The residue was purified by silica gel column chromatography (ethyl acetate/hexane) to obtain the title compound (14.7 g).

$^1$H NMR (500 MHz, DMSO-$d_6$) δ ppm 1.29 (3H, s), 1.29 (3H, s), 3.35 (2H, s), 3.39 (2H, d, J=5.1 Hz), 3.61 (4H, s), 3.74 (3H, s), 4.38 (2H, s), 4.59 (1H, t, J=5.1 Hz), 6.90 (2H, d like, J=7.5 Hz), 7.24 (2H, d like, J=7.5 Hz)

E) (5-(((4-Methoxybenzyl)oxy)methyl)-2,2-dimethyl-1,3-dioxan-5-yl)methyloctanoate To a solution of (5-(((4-methoxybenzyl)oxy)methyl)-2,2-dimethyl-1,3-dioxan-5-yl)methanol (2.00 g), DMAP (412 mg) and octanoic acid (1.27 g) in DMF (20 mL), 1-ethyl-3-(3-dimethylaminopropyl)carbodiimide hydrochloride (1.94 g) was added at 50° C. After stirring for 4 hours, ethyl acetate was added to the reaction mixture, and the mixture was washed twice with water and once with saturated brine and then dried over anhydrous sodium sulfate. Then, the solvent was distilled off under reduced pressure. The residue was purified by silica gel column chromatography (ethyl acetate/hexane) to obtain the title compound (2.78 g).

$^1$H NMR (500 MHz, CDCl$_3$) δ ppm 0.84-0.91 (3H, m), 1.22-1.33 (8H, m), 1.40 (6H, s), 1.53-1.61 (2H, m), 2.26 (2H, t, J=7.6 Hz), 3.39 (2H, s), 3.68-3.74 (2H, m), 3.76-3.80 (2H, m), 3.80 (3H, s), 4.15 (2H, s), 4.42 (2H, s), 6.87 (2H, d, J=7.8 Hz), 7.20-7.24 (2H, m)

F) 3-Hydroxy-2-(hydroxymethyl)-2-(((4-methoxybenzyl)oxy)methyl)propyl octanoate To a solution of (5-(((4-methoxybenzyl)oxy)methyl)-2,2-dimethyl-1,3-dioxan-5-yl)methyloctanoate (754 mg) in THF (6 mL), 1 N hydrochloric acid (6 mL) was added, and the mixture was stirred at room temperature for 6 hours. A saturated aqueous solution of sodium bicarbonate or a 2 N aqueous sodium hydroxide solution (4 mL) was added thereto, followed by extraction with ethyl acetate. The extracts were washed with water and saturated brine. This series of operations was repeated four times until completion of deprotection. After the completion of reaction, the solvent was distilled off under reduced pressure to obtain the title compound (608 mg).

$^1$H NMR (500 MHz, DMSO-$d_6$) δ ppm 0.85 (3H, t, J=7.3 Hz), 1.15-1.30 (9H, m), 1.40-1.50 (2H, m), 2.22 (2H, t, J=7.5 Hz), 3.31 (2H, s), 3.39 (4H, d, J=5.4 Hz), 3.76 (3H, s), 3.95 (2H, s), 4.35 (2H, s), 4.43 (2H, t, J=5.4 Hz), 6.89 (2H, d, J=6.6 Hz), 7.21 (2H, d, J=6.6 Hz)

G) 2-(((4-Methoxybenzyl)oxy)methyl)-2-((octanoyloxy)methyl)propane-1,3-diyl bis(2-hexyloctanoate)

To a solution of 3-hydroxy-2-(hydroxymethyl)-2-(((4-methoxybenzyl)oxy)methyl)propyl octanoate (2.0 g), DMAP (0.64 g) and 2-hexyloctanoic acid (2.63 g) in DMF (20 mL), 1-ethyl-3-(3-dimethylaminopropyl)carbodiimide hydrochloride (2.41 g) was added at room temperature. After stirring at room temperature for 15 hours, ethyl acetate was added to the reaction mixture, and the mixture was washed twice with water and once with saturated brine and then dried over anhydrous sodium sulfate. Then, the solvent was distilled off under reduced pressure. The residue was purified by silica gel column chromatography (ethyl acetate/hexane) to obtain the title compound (3.48 g).

$^1$H NMR (500 MHz, CDCl$_3$) δ ppm 0.83-0.91 (15H, m), 1.19-1.33 (42H, m), 1.37-1.47 (4H, m), 1.51-1.61 (4H, m), 2.24 (2H, t, J=7.6 Hz), 2.32 (2H, br t, J=5.4 Hz), 3.41 (2H, s), 3.80 (3H, s), 4.08-4.16 (6H, m), 4.39 (2H, s), 6.86 (2H, d, J=7.6 Hz), 7.19 (2H, d, J=8.8 Hz)

H) 2-(Hydroxymethyl)-2-((octanoyloxy)methyl)propane-1,3-diyl bis(2-hexyloctanoate)

To a solution of 2-(((4-methoxybenzyl)oxy)methyl)-2-((octanoyloxy)methyl)propane-1,3-diyl bis(2-hexyloctanoate) (3.48 g) in ethanol (30 mL), 10% Pd carbon (280 mg) was added at room temperature, and the mixture was stirred for 7 hours in a hydrogen atmosphere. After reaction, Pd carbon was filtered off. Then, the solvent was distilled off under reduced pressure. The residue was purified by silica gel column chromatography (ethyl acetate/hexane) to obtain the title compound (1.68 g).

$^1$H NMR (500 MHz, CDCl$_3$) δ ppm 0.84-0.91 (15H, m), 1.19-1.33 (42H, m), 1.41-1.51 (4H, m), 1.54-1.63 (4H, m), 2.30-2.38 (4H, m), 2.61-2.64 (1H, m), 3.48 (2H, d, J=7.3 Hz), 4.08-4.14 (6H, m)

I) 2-(((6-(Dimethylamino)hexanoyl)oxy)methyl-2-((octanoyloxy)methyl)propane-1,3-diyl bis(2-hexyloctanoate)

To a solution of 2-(hydroxymethyl)-2-((octanoyloxy)methyl)propane-1,3-diyl bis(2-hexyloctanoate) (600 mg), DMAP (54 mg) and 6-(dimethylamino)hexanoic acid (280 mg) in DMF (6 mL), 1-ethyl-3-(3-dimethylaminopropyl)

carbodiimide hydrochloride (303 mg) was added at room temperature. After stirring at 40° C. for 15 hours, ethyl acetate was added to the reaction mixture, and the mixture was washed twice with water and once with saturated brine and then dried over anhydrous sodium sulfate. Then, the solvent was distilled off under reduced pressure. The residue was purified by silica gel column chromatography (NH, ethyl acetate/hexane) to obtain the title compound (513 mg).

$^1$H NMR (500 MHz, CDCl$_3$) δ ppm 0.83-0.92 (15H, m), 1.19-1.34 (42H, m), 1.39-1.50 (6H, m), 1.52-1.73 (8H, m), 2.21 (6H, s), 2.21-2.35 (8H, m), 4.10 (8H, s)

[Synthesis Example 10] 3-((5-(Dimethylamino)pentanoyl)oxy)-2,2-bis((octanoyloxy)methyl)propyl 4,5-dibutylnonanoate A) Ethyl 3-butylhept-2-enoate Under nitrogen stream and ice cooling, a suspension of 60% sodium hydride (containing mineral oil) (3.94 g) in dehydrated THF (100 mL) was stirred for 10 minutes. Then, ethyl(diethoxyphosphoryl)acetate (23.7 g) was added dropwise thereto at 10° C. or lower. After stirring at the same temperature as above for 10 minutes, nonan-5-one (10.0 g) was added thereto, and the mixture was warmed to room temperature. The reaction mixture was stirred for a while and then warmed to 50° C. After stirring for 10 hours, the reaction mixture was brought to 5° C. or lower, and after addition of water, diluted with ethyl acetate, washed twice with saturated brine, and then dried over anhydrous sodium sulfate. The solvent was distilled off under reduced pressure. The residue was purified by silica gel column chromatography (ethyl acetate/hexane) to obtain the title compound (4.47 g).

$^1$H NMR (500 MHz, CDCl$_3$) δ ppm 0.92 (6H, td, J=7.3, 3.2 Hz), 1.25-1.47 (11H, m), 2.14 (2H, td, J=7.6, 1.1 Hz), 2.57-2.62 (2H, m), 4.14 (2H, q, J=7.1 Hz), 5.62 (1H, s)

B) Ethyl 3-butylheptanoate

To a solution of ethyl 3-butylhept-2-enoate (5.80 g) in ethanol (25 mL), 10% Pd carbon (1.50 g) was added at room temperature, and the mixture was stirred for 5 hours in a hydrogen atmosphere. After reaction, Pd carbon was filtered off. Then, the solvent was distilled off under reduced pressure to obtain the title compound (5.49 g).

$^1$H NMR (500 MHz, CDCl$_3$) δ ppm 0.84-0.93 (6H, m), 1.21-1.33 (15H, m), 1.80-1.88 (1H, m), 2.22 (2H, d, J=6.9 Hz), 4.12 (2H, q, J=7.1 Hz)

C) Ethyl 2,3-dibutylheptanoate

Under nitrogen stream, a solution of diisopropylamine (11.8 mL) in dehydrated THF (59 mL) was cooled to −10° C., and a 1.6 M solution of n-BuLi in hexane (35.2 mL) was gradually added dropwise thereto. After the completion of dropwise addition, the reaction solution was brought to 0° C. and stirred for 10 minutes. After cooling to −10° C. again, a solution of ethyl 3-butylheptanoate (5.49 g) in dehydrated THF (16 mL) was added dropwise thereto, and the mixture is stirred around −5° C. for 30 minutes. Then, 1-iodobutane (9.43 g) was added dropwise thereto, and the mixture was stirred for a while and then brought to room temperature. The reaction mixture was stirred for 3 hours, then neutralized with 6 N hydrochloric acid, then diluted with ethyl acetate, washed twice with a 10% aqueous sodium thiosulfate solution and once with saturated brine, and then dried over anhydrous sodium sulfate. The solvent was distilled off under reduced pressure. The residue was purified by silica gel column chromatography (ethyl acetate/hexane) to obtain the title compound (5.57 g).

$^1$H NMR (500 MHz, CDCl$_3$) δ ppm 0.84-0.93 (9H, m), 1.17-1.41 (20H, m), 1.51-1.65 (2H, m), 2.34 (1H, ddd, J=10.6, 6.5, 3.8 Hz), 4.07-4.19 (2H, m)

D) 2,3-Dibutylheptan-1-ol

Under nitrogen stream and ice cooling, a solution of ethyl 2,3-dibutylheptanoate (5.50 g) in dehydrated THF (10 mL) was added dropwise to a suspension of lithium aluminum hydride (1.54 g) in dehydrated THF (66 mL). After the completion of dropwise addition, the mixture was stirred for 10 minutes and brought back to room temperature. The reaction mixture was stirred for 2 hours and then cooled to 5° C. or lower, and sodium sulfate decahydrate was added thereto in small portions. After foaming was no longer seen, the mixture was diluted with ethyl acetate, and insoluble matter was filtered through celite. The solvent was distilled off under reduced pressure to obtain the title compound (4.67 g).

$^1$H NMR (500 MHz, CDCl$_3$) δ ppm 0.86-0.93 (9H, m), 1.12-1.34 (19H, m), 1.37-1.46 (1H, m), 1.47-1.61 (1H, m), 3.49-3.62 (2H, m)

E) 2,3-Dibutylheptanal

Under nitrogen stream, a solution of 2,3-dibutylheptan-1-ol (4.60 g) and DBU (6.02 mL) in dichloromethane (46 mL) was cooled to −10° C., and a solution of N-tert-butylbenzenesulfinimidoyl chloride (6.52 g) in dichloromethane (20 mL) was added dropwise thereto while −5° C. or lower was kept. The mixture was stirred at −10° C. for 3 hours and then rendered acidic with 1 N hydrochloric acid. After liquid separation operation, the solvent was distilled off under reduced pressure. The residue was diluted with ethyl acetate, washed once with saturated brine, and then dried over anhydrous sodium sulfate. The solvent was distilled off under reduced pressure. The residue was purified by silica gel column chromatography (ethyl acetate/hexane) to obtain the title compound (4.11 g).

$^1$H NMR (500 MHz, CDCl$_3$) δ ppm 0.83-0.96 (9H, m), 1.15-1.39 (16H, m), 1.52-1.60 (1H, m), 1.62-1.74 (2H, m), 2.22-2.27 (1H, m), 9.64 (1H, d, J=2.8 Hz)

F) Ethyl 4,5-dibutylnon-2-enoate

Under nitrogen stream and ice cooling, a suspension of 60% sodium hydride (containing mineral oil) (1.0 g) in dehydrated THF (41 mL) was stirred for 10 minutes. Then, ethyl(diethoxyphosphoryl)acetate (6.10 g) was added dropwise thereto at 10° C. or lower. After stirring at the same temperature as above for 10 minutes, a solution of 2,3-dibutylheptanal (4.10 g) in dehydrated THF (8 mL) was added dropwise thereto, and the mixture was warmed to room temperature. The reaction mixture was stirred for a while and then warmed to 50° C. After stirring for 5 hours, the reaction mixture was brought to 5° C. or lower, and after addition of water, diluted with ethyl acetate, washed twice with saturated brine, and then dried over anhydrous sodium sulfate. The solvent was distilled off under reduced pressure. The residue was purified by silica gel column chromatography (ethyl acetate/hexane) to obtain the title compound (4.14 g).

¹H NMR (500 MHz, CDCl₃) δ ppm 0.83-0.97 (9H, m), 1.14-1.38 (22H, m), 2.16-2.30 (1H, m), 4.10-4.22 (2H, m), 5.72-5.78 (1H, m), 6.80 (1H, dd, J=15.6, 9.6 Hz)

G) 4,5-Dibutylnon-2-enoic acid

A solution of ethyl 4,5-dibutylnon-2-enoate (4.10 g) and an 8 N aqueous sodium hydroxide solution (6.1 mL) in ethanol (30 mL) was stirred at 60° C. for 2 hours. The solvent was distilled off under reduced pressure, and the residue was rendered acidic with 1 N hydrochloric acid. The residue was diluted with ethyl acetate, washed twice with water and once with saturated brine, and then dried over anhydrous sodium sulfate. The solvent was distilled off under reduced pressure. The residue was purified by silica gel column chromatography (ethyl acetate/hexane) to obtain the title compound (2.80 g).
¹H NMR (500 MHz, CDCl₃) δ ppm 0.81-0.93 (9H, m), 1.06-1.47 (19H, m), 2.16-2.33 (1H, m), 5.75-5.80 (1H, m), 6.92 (1H, dd, J=15.8, 9.8 Hz)

H) 3-Hydroxy-2-(hydroxymethyl)-2-(((4-methoxybenzyl)oxy)methyl)propyl-4,5-dibutylnon-2-enoate To a solution of (5-(((4-methoxybenzyl)oxy)methyl)-2,2-dimethyl-1,3-dioxan-5-yl)methanol (600 mg), DMAP (240 mg) and 4,5-dibutylnon-2-enoic acid (706 mg) in DMF (4 mL), 1-ethyl-3-(3-dimethylaminopropyl)carbodiimide hydrochloride (582 mg) was added at room temperature. After stirring overnight, ethyl acetate was added to the reaction mixture, and the mixture was washed twice with water and once with saturated brine and then dried over anhydrous sodium sulfate. Then, the solvent was distilled off under reduced pressure.

The obtained residue was dissolved in THF (12 mL). To the solution, 1 N hydrochloric acid (6 mL) was then added, and the mixture was stirred for 3 days. Ethyl acetate was added to the reaction mixture, and the mixture was washed twice with a 5% aqueous sodium bicarbonate solution and once with saturated brine and then dried over anhydrous sodium sulfate. Then, the solvent was distilled off under reduced pressure. The residue was purified by silica gel column chromatography (ethyl acetate/hexane) to obtain the title compound (870 mg).
¹H NMR (500 MHz, CDCl₃) δ ppm 0.84-0.93 (9H, m), 1.13-1.36 (18H, m), 1.40-1.47 (1H, m), 2.21 (1H, dt, J=9.3, 4.8 Hz), 2.69 (2H, td, J=6.6, 2.5 Hz), 3.48 (2H, s), 3.55-3.67 (4H, m), 3.80-3.82 (3H, m), 4.23-4.32 (2H, m), 4.45 (2H, s), 5.74-5.79 (1H, m), 6.82-6.91 (3H, m), 7.21-7.25 (2H, m)

I) 3-((4-Methoxybenzyl)oxy)-2,2-bis((octanoyloxy)methyl)propyl-4,5-dibutylnon-2-enoate To a solution of 3-hydroxy-2-(hydroxymethyl)-2-(((4-methoxybenzyl)oxy)methyl)propyl-4,5-dibutylnon-2-enoate (870 mg), DMAP (210 mg) and octanoic acid (545 mg) in DMF (6 mL), 1-ethyl-3-(3-dimethylaminopropyl)carbodiimide hydrochloride (757 mg) was added at room temperature. After stirring at 60° C. for 4 hours, ethyl acetate was added to the reaction mixture, and the mixture was washed twice with water and once with saturated brine and then dried over anhydrous sodium sulfate. Then, the solvent was distilled off under reduced pressure. The residue was purified by silica gel column chromatography (ethyl acetate/hexane) to obtain the title compound (1.26 g).
¹H NMR (500 MHz, CDCl₃) δ ppm 0.83-0.93 (15H, m), 1.13-1.45 (35H, m), 1.52-1.61 (4H, m), 2.17-2.31 (5H, m), 3.43 (2H, s), 3.80 (3H, s), 4.10-4.22 (6H, m), 4.40 (2H, s), 5.73 (1H, d, J=15.4 Hz), 6.78-6.90 (3H, m), 7.19 (2H, d, J=7.9 Hz)

J) 3-((5-(Dimethylamino)pentanoyl)oxy)-2,2-bis((octanoyloxy)methyl)propyl 4,5-dibutylnonanoate To a solution of 3-((4-methoxybenzyl)oxy)-2,2-bis((octanoyloxy)methyl)propyl-4,5-dibutylnon-2-enoate (1.26 g) in a mixed solvent of ethanol (10 mL) and ethyl acetate (10 mL), 10% Pd carbon (110 mg) was added at room temperature, and the mixture was stirred overnight in a hydrogen atmosphere. After reaction, Pd carbon was filtered off. Then, the solvent was distilled off under reduced pressure. To a solution of the residue (500 mg), DMAP (95 mg) and 5-(dimethylamino)pentanoic acid hydrochloride (170 mg) in DMF (4 mL), 1-ethyl-3-(3-dimethylaminopropyl)carbodiimide hydrochloride (194 mg) was added at room temperature. After stirring at 50° C. for 7 hours, ethyl acetate was added to the reaction mixture, and the mixture was washed twice with water and once with saturated brine and then dried over anhydrous sodium sulfate. Then, the solvent was distilled off under reduced pressure. The residue was purified by silica gel column chromatography (NH, ethyl acetate/hexane) to obtain the title compound (250 mg).
¹H NMR (500 MHz, CDCl₃) δ ppm 0.84-0.91 (15H, m), 1.09-1.31 (37H, m), 1.42-1.52 (2H, m), 1.54-1.66 (6H, m), 1.76-1.97 (1H, m), 2.21 (6H, s), 2.24-2.35 (10H, m), 4.07-4.13 (8H, m)

[Synthesis Example 14] 2-(((4,5-Dibutylnonanoyl)oxy)methyl)-2-(((5-(dimethylamino)pentanoyl)oxy)methyl)propane-1,3-diyl didecanoate A) Ethyl 4,5-dibutylnonanoate To a solution of ethyl 4,5-dibutylnon-2-enoate (2.50 g) in ethanol (20 mL), 10% Pd carbon (0.54 g) was added at room temperature, and the mixture was stirred for 5 hours in a hydrogen atmosphere. After reaction, Pd carbon was filtered off. Then, the solvent was distilled off under reduced pressure to obtain the title compound (2.49 g).
¹H NMR (500 MHz, CDCl₃) δ ppm 0.82-1.00 (9H, m), 1.10-1.33 (23H, m), 1.46-1.63 (2H, m), 2.19-2.36 (2H, m), 4.06-4.19 (2H, m)

B) 4,5-Dibutylnonanoic acid

A solution of ethyl 4,5-dibutylnonanoate (2.49 g) and an 8 N aqueous sodium hydroxide solution (3.55 mL) in ethanol (12.5 mL) was stirred at 60° C. for 7 hours. The solvent was distilled off under reduced pressure, and the residue was rendered acidic with 1 N hydrochloric acid. The residue was diluted with ethyl acetate, washed twice with water and once with saturated brine, and then dried over anhydrous sodium sulfate. The solvent was distilled off under reduced pressure to obtain the title compound (2.36 g).
¹H NMR (500 MHz, CDCl₃) δ ppm 0.83-0.94 (9H, m), 0.95-1.33 (20H, m), 1.49 (1H, ddt, J=13.7, 9.3, 6.8, 6.8 Hz), 1.56-1.74 (1H, m), 2.26-2.42 (2H, m)

C) (5-(Hydroxymethyl)-2,2-dimethyl-1,3-dioxan-5-yl)methyl 4,5-dibutylnonanoate

To a solution of (5-(((tert-butyl(diphenyl)silyl)oxy)methyl)-2,2-dimethyl-1,3-dioxan-5-yl)methanol (800 mg), DMAP (306 mg) and 4,5-dibutylnonanoic acid (678 mg) in DMF (8 mL), 1-ethyl-3-(3-dimethylaminopropyl)carbodiimide hydrochloride (555 mg) was added at room temperature. After stirring at 50° C. for 8 hours, ethyl acetate was added to the reaction mixture, and the mixture was washed twice with water and once with saturated brine and then dried over anhydrous sodium sulfate. Then, the solvent was distilled off under reduced pressure. The residue was purified by silica gel column chromatography (ethyl acetate/hexane). To a solution of this compound in THF (4 mL), a solution of TBAF in THF (1 M, 2.32 mL) was added at room temperature. After stirring overnight at room temperature, the reaction mixture was concentrated under reduced pressure. The residue was diluted with ethyl acetate, washed once with a saturated aqueous solution of sodium bicarbonate and once with saturated brine, and then dried over anhydrous sodium sulfate. The solvent was distilled off under reduced pressure. The residue was purified by silica gel column chromatography (ethyl acetate/hexane) to obtain the title compound (680 mg).

$^1$H NMR (500 MHz, CDCl$_3$) δ ppm 0.89 (9H, t, J=6.8 Hz), 1.09-1.31 (20H, m), 1.42 (6H, s), 1.45-1.54 (1H, m), 1.57-1.62 (1H, m), 2.29-2.37 (3H, m), 3.48 (2H, d, J=6.6 Hz), 3.70-3.75 (4H, m), 4.25 (2H, d, J=1.9 Hz)

D) (5-(((5-(Dimethylamino)pentanoyl)oxy)methyl)-2,2-dimethyl-1,3-dioxan-5-yl)methyl 4,5-dibutylnonanoate To a solution of (5-(hydroxymethyl)-2,2-dimethyl-1,3-dioxan-5-yl)methyl 4,5-dibutylnonanoate (680 mg), DMAP (388 mg) and 5-(dimethylamino)pentanoic acid hydrochloride (576 mg) in DMF (7 mL), 1-ethyl-3-(3-dimethylaminopropyl)carbodiimide hydrochloride (669 mg) was added at room temperature. After stirring at 50° C. for 7 hours, ethyl acetate was added to the reaction mixture, and the mixture was washed twice with water and once with saturated brine and then dried over anhydrous sodium sulfate. Then, the solvent was distilled off under reduced pressure. The residue was purified by silica gel column chromatography (ethyl acetate/hexane) to obtain the title compound (740 mg).

$^1$H NMR (500 MHz, CDCl$_3$) δ ppm 0.89 (9H, t, J=6.9 Hz), 1.09-1.31 (21H, m), 1.42 (6H, s), 1.48 (3H, dt, J=15.1, 7.6 Hz), 1.60-1.66 (2H, m), 2.21 (6H, s), 2.22-2.32 (4H, m), 2.35 (2H, t, J=7.6 Hz), 3.75 (4H, s), 4.09-4.13 (4H, m)

E) 2-(((4,5-Dibutylnonanoyl)oxy)methyl)-2-(((5-(dimethylamino)pentanoyl)oxy)methyl)propane-1,3-diyl didecanoate To (5-(((5-(dimethylamino)pentanoyl)oxy)methyl)-2,2-dimethyl-1,3-dioxan-5-yl)methyl 4,5-dibutylnonanoate (1.68 g), acetic acid (8.4 mL) and water (4.2 mL) were added, and the mixture was stirred at 75° C. for 2 hours. The solvent was distilled off under reduced pressure. Ethyl acetate and a saturated aqueous solution of sodium hydroxide were added to the residue, and the mixture was stirred for 2 hours. The organic layer was washed with a saturated aqueous solution of sodium hydroxide and saturated brine and then dried over anhydrous sodium sulfate. Then, the solvent was distilled off under reduced pressure. To a solution of the residue (700 mg), DMAP (497 mg) and decanoic acid (701 mg) in DMF (7 mL), 1-ethyl-3-(3-dimethylaminopropyl)carbodiimide hydrochloride (859 mg) was added at room temperature. After stirring at 50° C. for 7 hours, ethyl acetate was added to the reaction mixture, and the mixture was washed twice with water and once with saturated brine and then dried over anhydrous sodium sulfate. Then, the solvent was distilled off under reduced pressure. The residue was purified by silica gel column chromatography (ethyl acetate/hexane, ethyl acetate/methanol and NH, ethyl acetate/hexane) to obtain the title compound (405 mg).

$^1$H NMR (500 MHz, CDCl$_3$) δ ppm 0.84-0.93 (15H, m), 1.10-1.32 (44H, m), 1.40-1.54 (3H, m), 1.54-1.66 (7H, m), 2.21 (6H, s), 2.23-2.35 (10H, m), 4.11 (8H, s)

[Synthesis Example 18] 3-(((4-(Dimethylamino)butyl)carbamoyl)oxy)-2,2-bis((octanoyloxy)methyl)propyl 4,5-dibutylnonanoate To a solution of (5-(hydroxymethyl)-2,2-dimethyl-1,3-dioxan-5-yl)methyl 4,5-dibutylnonanoate (0.50 g) in tetrahydrofuran (7.5 mL), 1,1-carbonyldiimidazole (0.28 g) was added at room temperature. After stirring for 1 hour, the reaction mixture was concentrated under reduced pressure. The residue was diluted with hexane, and insoluble matter was removed. Then, the filtrate was concentrated under reduced pressure. Tetrahydrofuran (10 mL), (4-aminobutyl) dimethylamine (0.20 g), and triethylamine (0.24 mL) were added to the residue at room temperature. The mixture was stirred for 20 hours, then diluted with ethyl acetate, and sequentially washed with water, an aqueous ammonium chloride solution, and an aqueous sodium bicarbonate solution. The solvent was distilled off under reduced pressure. Acetic acid (3.3 mL) and water (1.7 mL) were added to the residue, and the mixture was stirred at 65° C. for 5 hours. After cooling to room temperature, the solvent was distilled off under reduced pressure. The residue was diluted with ethyl acetate and sequentially washed with an aqueous sodium bicarbonate solution and water. The solvent was distilled off under reduced pressure. N,N-Dimethylformamide (4 mL), DMAP (61 mg), 1-ethyl-3-(3-dimethylaminopropyl)carbodiimide hydrochloride (288 mg), and octanoic acid (0.19 mL) were added to the residue. After stirring at 60° C. for 3 hours, ethyl acetate was added to the reaction mixture, and the mixture was sequentially washed with water and brine. Then, the solvent was distilled off under reduced pressure. The residue was purified by silica gel column chromatography (NH, ethyl acetate/hexane) to obtain the title compound (215 mg).

$^1$H NMR (500 MHz, CDCl$_3$) δ ppm 0.88 (15H, t, J=7.09 Hz) 1.10-1.33 (32H, m) 1.40-1.62 (14H, m) 2.21 (6H, s) 2.25-2.32 (8H, m) 3.16 (2H, m) 4.10 (8H, s) 5.84 (1H, m)

[Synthesis Example 20] 3-((3-Butylheptanoyl)oxy)-2-(((3-butylheptanoyl)oxy)methyl)-2-(((4-(dimethylamino)butanoyl)oxy)methyl)propyl (9Z)-hexadec-9-enoate A) (5-(((tert-Butyl(diphenyl)silyl)oxy)methyl)-2,2-dimethyl-1,3-dioxan-5-yl)methyl (9Z)-hexadec-9-enoate To a solution of (5-(((tert-butyl(diphenyl)silyl)oxy) methyl)-2,2-dimethyl-1,3-dioxan-5-yl)methanol (1.50 g), DMAP (0.49 g) and palmitoleic acid (1.01 g) in DMF (15 mL), 1-ethyl-3-(3-dimethylaminopropyl)carbodiimide hydrochloride (0.83 g) was added at 50° C. in a nitrogen atmosphere. After stirring for 21 hours, ethyl acetate was added to the reaction mixture, and the mixture was washed once with water and once with saturated brine and then dried over anhydrous sodium sulfate. Then, the solvent was distilled off under reduced pressure. The residue was purified by silica gel column chromatography (ethyl acetate/hexane) to obtain the title compound (2.11 g).

$^1$H NMR (300 MHz, CDCl$_3$) δ ppm 0.85-0.94 (3H, m), 1.01-1.10 (9H, m), 1.24-1.35 (16H, m), 1.40 (6H, d, J=10.3 Hz), 1.52-1.61 (2H, m), 1.97-2.07 (4H, m), 2.25 (2H, t, J=7.6 Hz), 3.66 (2H, s), 3.77 (4H, q, J=11.8 Hz), 4.18 (2H, s), 5.35 (2H, ddd, J=5.8, 3.4, 2.7 Hz), 7.36-7.47 (6H, m), 7.65-7.69 (4H, m)

B) 3-((tert-Butyl(diphenyl)silyl)oxy)-2,2-bis(((3-butylheptanoyl)oxy)methyl)propyl (9Z)-hexadec-9-enoate To (5-(((tert-butyl(diphenyl)silyl)oxy)methyl)-2,2-dimethyl-1,3-dioxan-5-yl)methyl (9Z)-hexadec-9-enoate (2.11 g), acetic acid (10.6 mL) and water (5.3 mL) were added in a nitrogen atmosphere, and the mixture was stirred at 75° C. for 8 hours. After cooling to room temperature, the solvent was distilled off under reduced pressure. The residue was diluted with ethyl acetate, sequentially washed with a saturated aqueous solution of sodium bicarbonate and water, and dried over anhydrous sodium sulfate. Then, the solvent was distilled off under reduced pressure to obtain a residue (1.95 g). The residue (0.95 g) was weighed in a nitrogen atmosphere and dissolved in a DMF (9.5 mL) solution. To the solution, DMAP (0.42 g) and 3-butylheptanoic acid (0.64 g) were then added, and the mixture was stirred for a while. Then, 1-ethyl-3-(3-dimethylaminopropyl)carbodiimide hydrochloride (0.69 g) was added thereto at 50° C. After stirring for 6 hours, ethyl acetate was added to the reaction mixture, and the mixture was washed once with water and once with saturated brine and then dried over anhydrous sodium sulfate. Then, the solvent was distilled off under reduced pressure. The residue was purified by silica gel column chromatography (ethyl acetate/hexane) to obtain the title compound (0.71 g).

$^1$H NMR (300 MHz, CDCl$_3$) δ ppm 0.84-0.93 (15H, m), 1.05 (9H, s), 1.18-1.37 (40H, m), 1.51-1.60 (2H, m), 1.78 (2H, br d, J=5.2 Hz), 1.97-2.07 (4H, m), 2.17-2.26 (6H, m), 3.63 (2H, s), 4.10-4.17 (6H, m), 5.35 (2H, ddd, J=5.6, 3.5, 2.2 Hz), 7.35-7.48 (6H, m), 7.60-7.65 (4H, m)

C) 3-((3-Butylheptanoyl)oxy)-2-(((3-butylheptanoyl)oxy)methyl)-2-(((4-(dimethylamino)butanoyl)oxy)methyl)propyl (9Z)-hexadec-9-enoate To a solution of 3-((tert-butyl(diphenyl)silyl)oxy)-2,2-bis(((3-butylheptanoyl)oxy)methyl)propyl (9Z)-hexadec-9-enoate (0.71 g) in THF (2.1 mL), a solution of TBAF in THF (1 M, 0.9 mL) was added at room temperature. After stirring overnight at room temperature, the reaction mixture was concentrated under reduced pressure. The residue was diluted with ethyl acetate, washed once with a saturated aqueous solution of sodium bicarbonate and once with saturated brine, and then dried over anhydrous sodium sulfate. The solvent was distilled off under reduced pressure. The residue was dissolved in a DMF (5.3 mL) solution. To the solution, DMAP (0.14 g) and 4-(dimethylamino)butanoic acid hydrochloride (0.19 g) were then added, and the mixture was stirred for a while. Then, 1-ethyl-3-(3-dimethylaminopropyl)carbodiimide hydrochloride (0.24 g) was added thereto at 50° C. After stirring for 8 hours, ethyl acetate was added to the reaction mixture, and the mixture was washed once with water and once with saturated brine and then dried over anhydrous sodium sulfate. Then, the solvent was distilled off under reduced pressure. The residue was purified by silica gel column chromatography (NH, ethyl acetate/hexane) to obtain the title compound (0.31 g).

1H NMR (300 MHz, CDCl3) δ ppm 0.85-0.94 (15H, m), 1.20-1.37 (40H, m), 1.55-1.66 (2H, m), 1.66-1.86 (4H, m), 1.97-2.08 (4H, m), 2.21 (6H, s), 2.22-2.39 (10H, m), 4.08-4.17 (8H, m), 5.35 (2H, ddd, J=5.6, 3.5, 2.1 Hz)

Synthesis Examples 2 to 7, 9, 11 to 13, 15 to 17, 19, and 21 in the following tables were produced in accordance with either the methods shown in above-mentioned Synthesis Examples or methods according thereof. The names, the structural formulae, the $^1$H NMR chemical shifts, and the mass numbers (shown as MS in the tables) implemented at the time of production of these Synthesis Examples are shown in Table 3 with Synthesis Examples 1, 8, 10, 14, 18, and 20.

TABLE 3-1

| Synthesis Example No. | IUPAC name | Structural formula | NMR data | MS: m/z (M + H) |
|---|---|---|---|---|
| 1 | 3-((5-(Dimethylamino)pentanoyl)oxy)-2,2-bis((octanoyloxy)methyl)propyl 4-heptylundecanoate | 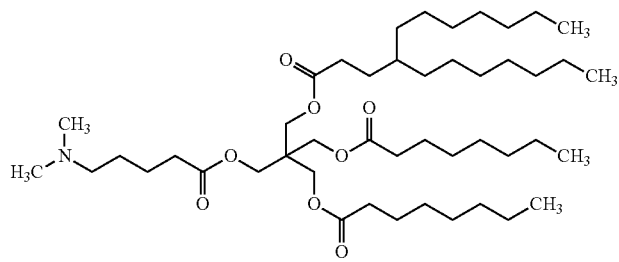<br>Chemical Formula: C$_{46}$H$_{57}$NO$_8$<br>Exact Mass: 781.64<br>Molecular Weight: 782.20 | 1H NMR (500 MHz, CDCl3) d ppm 0.86-0.91 (12 H, m), 1.15-1.34 (45 H, m), 1.45-1.52 (2 H, m), 1.53-1.65 (4 H, m), 2.20 (6 H, s), 2.23-2.36 (10 H, m), 4.11 (8 H, s) | 782.18 |

TABLE 3-1-continued

| Synthesis Example No. | IUPAC name | Structural formula | NMR data | MS: m/z (M + H) |
|---|---|---|---|---|
| 2 | 2-(((4-(Dimethylamino)butanoyl)oxy)methyl)-2-(((2-hexyloctanoyl)oxy)methyl)propane-1,3-diyl dioctanoate | Chemical Formula: $C_{41}H_{77}NO_8$<br>Exact Mass: 711.56<br>Molecular Weight: 712.07 | 1H NMR (300 MHz, CDCl3) d ppm 0.80-0.95 (12 H, m), 1.15-1.35 (32 H, m), 1.37-1.64 (8 H, m), 1.70-1.83 (2 H, m), 2.20 (5 H, s), 2.23-2.41 (9 H, m), 4.11 (8 H, s) | 712.46 |
| 3 | 2-(((5-(Dimethylamino)pentanoyl)oxy)methyl)-2-(((2-hexyloctanoyl)oxy)methyl)propane-1,3-diyl dioctanoate | Chemical Formula: $C_{42}H_{79}NO_8$<br>Exact Mass: 725.58<br>Molecular Weight: 726.09 | 1H NMR (300 MHz, CDCl3) d ppm 0.81-0.93 (12 H, m), 1.14-1.36 (32 H, m), 1.39-1.66 (12 H, m), 2.20 (6 H, s), 2.22-2.38 (9 H, m), 4.11 (8 H, s) | 726.48 |
| 4 | 2-(((4-(Dimethylamino)butanoyl)oxy)methyl)-2-((heptanoyloxy)methyl)propane-1,3-diyl bis(2-pentylheptanoate) | Chemical Formula: $C_{42}H_{79}NO_8$<br>Exact Mass: 725.58<br>Molecular Weight: 726.09 | 1H NMR (300 MHz, CDCl3) d ppm 0.78-0.95 (15 H, m), 1.14-1.35 (30 H, m), 1.37-1.57 (10 H, m), 1.68-1.83 (2 H, m), 2.20 (6 H, s), 2.23-2.42 (8 H, m), 4.10 (8 H, s) | 726.53 |

TABLE 3-1-continued

| Synthesis Example No. | IUPAC name | Structural formula | NMR data | MS: m/z (M + H) |
|---|---|---|---|---|
| 5 | 2-(((5-(Dimethylamino) pentanoyl)oxy) methyl)-2-((heptanoyloxy) methyl)propane-1,3-diyl bis(2-pentylheptanoate) | Chemical Formula: C₄₃H₈₁NO₈<br>Exact Mass: 739.60<br>Molecular Weight: 740.12 | 1H NMR (300 MHz, CDCl3) d ppm 0.81-0.94 (15 H, m), 1.14-1.35 (20 H, m), 1.37-1.66 (14 H, m), 2.20 (6 H, s), 2.22-2.39 (8 H, m), 4.10 (8 H, s) | 740.56 |
| 6 | 2-(((4-(Dimethylamino) butanoyl)oxy)-methyl)-2-((octanoyloxy) methyl)propane-1,3-diyl bis(2-hexyloctanoate) | Chemical Formula: C₄₇H₈₉NO₈<br>Exact Mass: 795.66<br>Molecular Weight: 796.23 | 1H NMR (300 MHz, CDCl3) d ppm 0.81-0.93 (15 H, m), 1.13-1.36 (40 H, m), 1.39-1.61 (10 H, m), 1.70-1.83 (2 H, m), 2.20 (6 H, s), 2.23-2.41 (8 H, m), 4.10 (8 H, s) | 796.58 |
| 7 | 2-(((5-(Dimethylamino) pentanoyl)oxy)-methyl)-2-((octanoyloxy) methyl)propane-1,3-diyl bis(2-hexyloctanoate) | Chemical Formula: C₄₇H₈₉NO₈<br>Exact Mass: 795.66<br>Molecular Weight: 796.23 | 1H NMR (300 MHz, CDCl3) d ppm 0.81-0.93 (15 H, m), 1.13-1.35 (40 H, m), 1.36-1.67 (14 H, m), 2.20 (6 H, s), 2.22-2.39 (8 H, m), 4.10 (8 H, s) | 810.58 |
| 8 | 2-(((6-(Dimethylamino) hexanoyl)oxy)-methyl-2-((octanoyloxy) methyl)propane-1,3-diyl bis(2-hexyloctanoate) | Chemical Formula: C₄₉H₉₃NO₈<br>Exact Mass: 823.69<br>Molecular Weight: 824.28 | 1H NMR (500 MHz, CDCl3) d ppm 0.83-0.92 (15 H, m), 1.19-1.34 (42 H, m), 1.39-1.50 (6 H, m), 1.52-1.73 (8 H, m), 2.21 (6 H, s), 2.21-2.35 (8 H, m), 4.10 (8 H, s) | 824.67 |

TABLE 3-1-continued

| Synthesis Example No. | IUPAC name | Structural formula | NMR data | MS: m/z (M + H) |
|---|---|---|---|---|
| 9 | 2-(((5-(Dimethylamino)pentanoyl)oxy)-methyl-2-((octanoyloxy)methyl)propane-1,3-diyl bis(3-pentyloctanoate) | Chemical Formula: $C_{46}H_{87}NO_8$<br>Exact Mass: 781.64<br>Molecular Weight: 782.20 | 1H NMR (500 MHz, CDCl3) d ppm 0.88 (15H, t, J = 7.09 Hz), 1.22-1.32 (40H, m), 1.45-1.53 (2H, m), 1.55-1.68 (4H, m), 1.77-1.86 (2H, m), 2.22 (6H, s), 2.21-2.30 (10H, m), 4.10 (8H, s) | 782.65 |
| 10 | 3-((5-(Dimethylamino)pentanoyl)oxy)-2,2-bis((octanoyloxy)methyl)propyl 4,5-dibutylnonanoate | Chemical Formula: $C_{45}H_{85}NO_8$<br>Exact Mass: 767.63<br>Molecular Weight: 768.17 | 1H NMR (500 MHz, CDCl3) d ppm 0.84-0.91 (15 H, m), 1.09-1.31 (36 H, m), 1.42-1.52 (3 H, m), 1.54-1.66 (7 H, m), 2.21 (6 H, s), 2.24-2.35 (10 H, m), 4.07-4.13 (8 H, m) | 768.63 |
| 11 | 3-((6-(Dimethylamino)hexanoyl)oxy)-2,2-bis((octanoyloxy)methyl)propyl 4,5-dibutylnonanoate | Chemical Formula: $C_{46}H_{87}NO_8$<br>Exact Mass: 781.64<br>Molecular Weight: 782.20 | 1H NMR (500 MHz, CDCl3) d ppm 0.85-0.92 (15 H, m), 1.11-1.16 (2 H, m), 1.18-1.34 (36 H, m), 1.41-1.51 (3 H, m), 1.54-1.86 (6 H, m), 1.77 (1 H, br s), 2.21 (6 H, s), 2.22-2.33 (10 H, m), 4.11 (8 H, s) | 782.65 |

TABLE 3-1-continued

| Synthesis Example No. | IUPAC name | Structural formula | NMR data | MS: m/z (M + H) |
|---|---|---|---|---|
| 12 | 3-((5-(Dimethylamino)pentanoyl)oxy)-2,2-bis((hexanoyloxy)methyl)propyl 4,5-dipentyldecanoate | 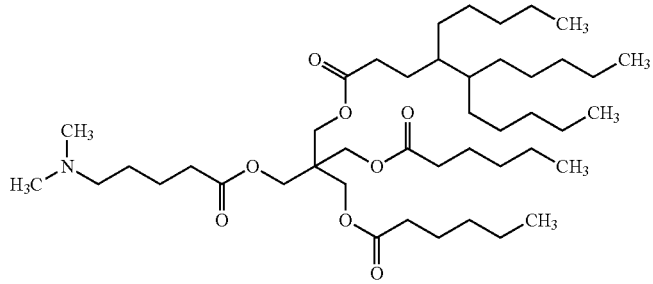<br>Chemical Formula: C<sub>44</sub>H<sub>83</sub>NO<sub>8</sub><br>Exact Mass: 753.61<br>Molecular Weight: 754.15 | 1H NMR (500 MHz, CDCl3) d ppm 0.89 (15 H, td, J = 7.1 4.4 Hz), 1.08-1.18 (3 H, m), 1.19-1.35 (30 H, m), 1.49 (3 H, dt, J = 15.3, 7.5 Hz), 1.54-1.68 (8 H, m), 2.22 (6 H, s), 2.24-2.36 (10 H, m), 4.11 (8 H, s) | 754.62 |
| 13 | 3-((5-(Dimethylamino)pentanoyl)oxy)-2,2-bis((octanoyloxy)methyl)propyl 4,5-dipentyldecanoate | 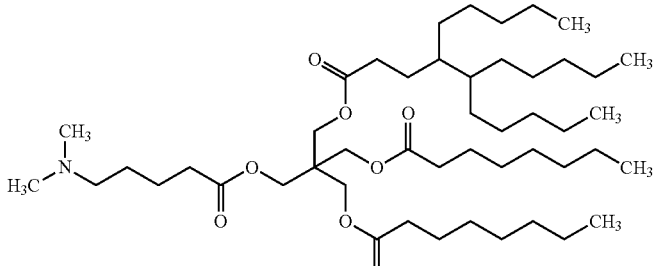<br>Chemical Formula: C<sub>46</sub>H<sub>91</sub>NO<sub>8</sub><br>Exact Mass: 809.67<br>Molecular Weight: 810.25 | 1H NMR (500 MHz, CDCl3) d ppm 0.86-0.91 (15 H, m), 0.98-1.18 (2 H, m), 1.19-1.33 (40 H, m), 1.48 (3 H, dt, J = 15.1, 7.4 Hz), 1.54-1.72 (7 H, m), 2.21 (6 H, s), 2.23-2.35 (10 H, m), 4.11 (8 H, s) | 810.68 |
| 14 | 2-(((4,5-Dibutylnonanoyl)oxy)methyl)-2-(((5-(dimethylamino)pentanoyl)oxy)methyl)propane-1,3-diyl didecanoate | 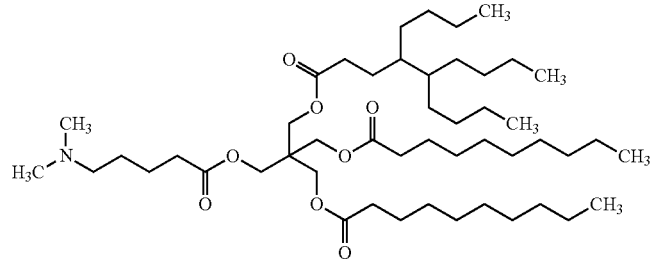<br>Chemical Formula: C<sub>49</sub>H<sub>93</sub>NO<sub>8</sub><br>Exact Mass: 823.69<br>Molecular Weight: 824.28 | 1H NMR (500 MHz, CDCl3) d ppm 0.84-0.93 (15 H, m), 1.10-1.32 (44 H, m), 1.40-1.54 (3 H, m), 1.54-1.68 (3 H, m), 2.21 (6 H, s), 2.23-2.35 (10 H, m), 4.11 (8 H, s) | 824.70 |

TABLE 3-1-continued

| Synthesis Example No. | IUPAC name | Structural formula | NMR data | MS: m/z (M + H) |
|---|---|---|---|---|
| 15 | 3-((5-(Dimethylamino)pentanoyl)oxy)-2,2-bis((hexanoyloxy)methyl)propyl 4,5-dibutylnonanoate | 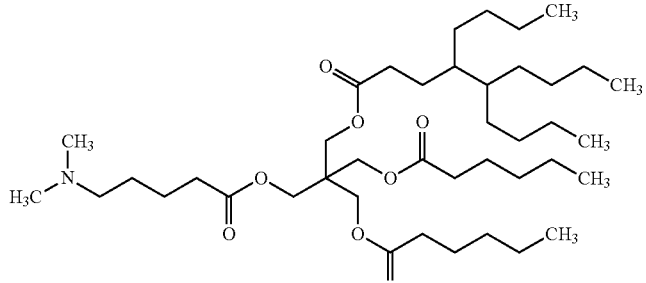 Chemical Formula: $C_{41}H_{77}NO_8$<br>Exact Mass: 711.56<br>Molecular Weight: 712.07 | 1H NMR (500 MHz, CDCl3) d ppm 0.85-0.93 (15 H, m), 1.11-1.35 (29 H, m), 1.41-1.52 (3 H, m), 1.55-1.68 (6 H, m), 2.21 (6 H, s), 2.23-2.38 (10 H, m), 4.12 (8 H, s) | 712.57 |
| 16 | 2-(((5-(Dimethylamino)pentanoyl)oxy)methyl)-2-(((4,5-dipropyloctanoyl)oxy)methyl)propane-1,3-diyl didecanoate | 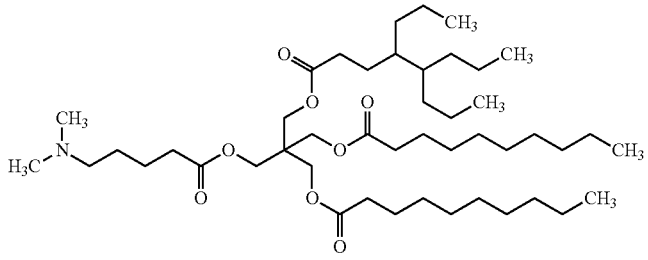 Chemical Formula: $C_{46}H_{87}NO_8$<br>Exact Mass: 781.64<br>Molecular Weight: 782.20 | 1H NMR (500 MHz, CDCl3) d ppm 0.85-0.91 (15 H, m), 1.11 (3 H, dtd, J = 12.6, 6.1, 6.1, 2.8 Hz), 1.18-1.32 (34 H, m), 1.42-1.54 (3 H, m), 1.55-1.65 (8 H, m), 2.21 (5 H, s), 2.22-2.35 (10 H, m), 4.11 (8 H, s) | 782.65 |
| 17 | 3-((5-(Dimethylamino)pentanoyl)oxy)-2,2-bis((octanoyloxy)methyl)propyl 4,5-dipropyloctanoate | 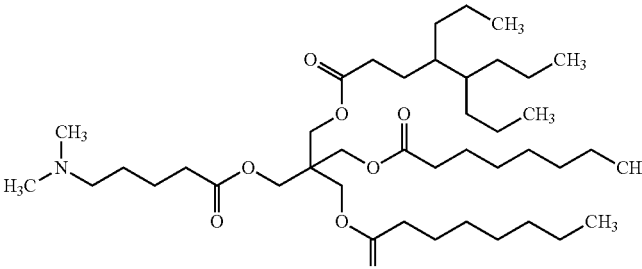 Chemical Formula: $C_{42}H_{79}NO_8$<br>Exact Mass: 725.58<br>Molecular Weight: 726.09 | 1H NMR (500 MHz, CDCl3) d ppm 0.85-0.91 (15 H, m), 1.07-1.15 (3 H, m), 1.18-1.33 (26 H, m), 1.42-1.51 (3 H, m), 1.55-1.68 (8 H, m), 2.20 (6 H, s), 2.22-2.35 (10 H, m), 4.11 (8 H, s) | 726.59 |

TABLE 3-1-continued

| Synthesis Example No. | IUPAC name | Structural formula | NMR data | MS: m/z (M + H) |
|---|---|---|---|---|
| 18 | 3-(((4-(Dimethylamino)-butyl)carbamoyl)oxy)-2,2-bis((octanoyloxy)methyl)propyl 4,5-dibutylnonanoate | 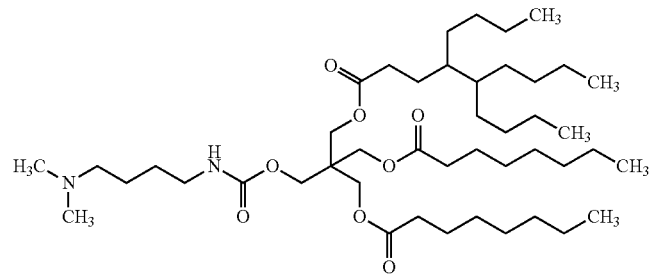<br>Chemical Formula: $C_{45}H_{86}N_2O_8$<br>Exact Mass: 782.64<br>Molecular Weight: 783.19 | 1H NMR (500 MHz, CDCl3) d ppm 0.88 (15H, t, J = 7.09 Hz), 1.10-1.33 (32H, m), 1.40-1.62 (14H, m), 2.21 (6H, s), 2.25-2.32 (8H, m) 3.16 (2H, m) 4.10 (8H, s) 5.84 (1H, m) | 783.65 |
| 19 | 3-((4-(Dimethylamino)butanoyl)oxy)-2,2-bis((octanoyloxy)methyl)propyl 4,5-dibutylnonanoate | 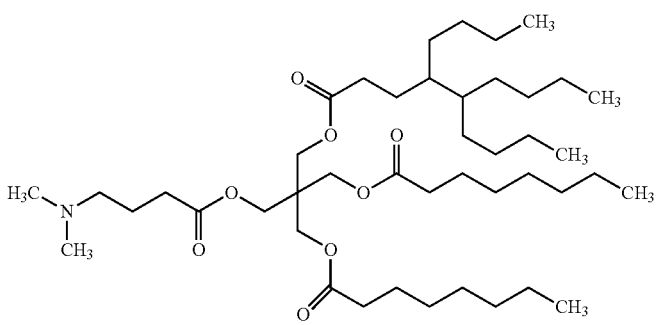<br>Chemical Formula: $C_{44}H_{83}NO_8$<br>Molecular Weight: 754.15 | 1H NMR (300 MHz, CDCl3) d ppm 0.89 (15 H, dq, J = 6.7, 3.4 Hz), 1.05-1.17 (3 H, m), 1.21-1.34 (31 H, m), 1.45-1.83 (10 H, m), 2.22 (6 H, s), 2.24-2.39 (10 H, m), 4.09-4.16 (8 H, m) | 754.62 |
| 20 | 3-((3-Butylheptanoyl)oxy)-2-(((3-butylheptanoyl)oxy)methyl)-2-(((4-(dimethylamino)butanoyl)oxy)methyl)propyl (9Z)-hexadec-9-enoate | 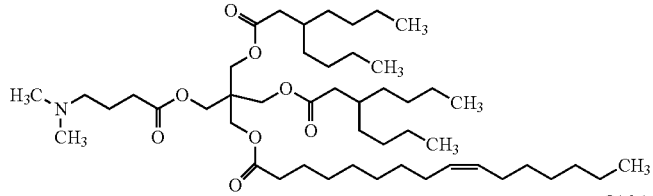<br>Chemical Formula: $C_{49}H_{91}NO_8$<br>Molecular Weight: 822.27 | 1H NMR (300 MHz, CDCl3) d ppm 0.85-0.94 (15 H, m), 1.20-1.37 (40 H, m), 1.55-1.66 (2 H, m), 1.66-1.86 (4 H, m), 1.97-2.08 (4 H, m), 2.21 (6 H, s), 2.22-2.39 (10 H, m), 4.08-4.17 (8 H, m), 5.35 (2 H, ddd, J = 5.5, 3.5, 2.1 Hz) | 822.68 |

TABLE 3-1-continued

| Synthesis Example No. | IUPAC name | Structural formula | NMR data | MS: m/z (M + H) |
|---|---|---|---|---|
| 21 | 3-((3-Butylheptanoyl)oxy)-2-(((3-butylheptanoyl)oxy)methyl)-2-(((4-(dimethylamino)butanoyl)oxy)methyl)propyl (9Z, 12Z)-octadeca-9,12-dienoate | 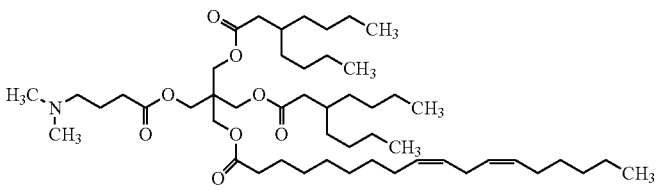<br>Chemical Formula: $C_{61}H_{83}NO_8$<br>Exact Mass: 847.69<br>Molecular Weight: 848.30 | 1H NMR (300 MHz, CDCl3) d ppm 0.84-0.93 (15 H, m), 1.19-1.40 (38 H, m), 1.54-1.67 (6 H, m), 2.00-2.09 (4 H, m), 2.19-2.38 (16 H, m), 2.77 (2 H, t, J = 5.9 Hz), 4.10 (8 H, s), 5.28-5.43 (4 H, m) | 848.70 |

[Preparation Example 8] Preparation of GFP mRNA-Containing LNP Using Compound of Synthesis Example 8

A lipid mixture (cationic lipids:DPPC:Cholesterol:GM-020=60:10.6:28:1.4, molar ratio) was dissolved in 90% of EtOH and 10% of water to obtain a 8.5 mg/ml lipid solution. GFP mRNA (TriLink BioTechnologies, Inc.) was dissolved in a 10 mM 2-morpholinoethanesulfonic acid (MES) buffer solution (pH 4.0) to obtain a 0.22 mg/ml nucleic acid solution. The obtained lipid solution and nucleic acid solution were mixed with a NanoAssemblr device (Precision NanoSystems Inc.) at room temperature at a flow rate ratio of 3 ml/min:6 ml/min to obtain a dispersion containing a composition. The obtained dispersion was dialyzed against water at room temperature for 1 hour and against PBS at 4° C. for 48 hours using Slyde-A-Lyzer (molecular weight cutoff: 20 K, Thermo Fischer Scientific Inc.). Subsequently, the dialysate was filtered through a 0.2-μm syringe filter (Iwaki) and preserved at 4° C. The analysis results of the obtained GFP mRNA-containing LNP were shown in the following table. Hereinafter, the particle size of the lipid particle in the composition was calculated as a Z-average particle size by the cumulant analysis of an autocorrelation function using a particle size measurement apparatus Zetasizer Nano ZS (Malvern Instruments) based on a dynamic light scattering measurement technique.

TABLE 4

| | Average particle size | Polydispersity | mRNA concentration | Encapsulation rate |
|---|---|---|---|---|
| Preparation Example 8 | 95 nm | 0.054 | 158 μg/ml | 91% |

[Preparation Example 10] Preparation of GFP mRNA-Containing LNP Using Compound of Synthesis Example 10

A LNP was prepared in the same way as in Preparation Example 8 except that the compound of Synthesis Example 10 was used instead of using the compound of Synthesis Example 8. The analysis results of the obtained GFP mRNA-containing LNP were shown in the following table.

TABLE 5

| | Average particle size | Polydispersity | mRNA concentration | Encapsulation rate |
|---|---|---|---|---|
| Preparation Example 10 | 121 nm | 0.059 | 157 μg/ml | 98% |

[Preparation Example 11] Preparation of GFP mRNA-Containing LNP Using Compound of Synthesis Example 11

A LNP was prepared in the same way as in Preparation Example 8 except that the compound of Synthesis Example 11 was used instead of using the compound of Synthesis Example 8. The analysis results of the obtained GFP mRNA-containing LNP were shown in the following table.

TABLE 6

| | Average particle size | Polydispersity | mRNA concentration | Encapsulation rate |
|---|---|---|---|---|
| Preparation Example 11 | 126 nm | 0.098 | 163 μg/ml | 97% |

[Example 1] Transfection of Differentiated Cells Derived from iPSCs (and Containing Cardiac Muscle Cells) with LNP In the present example, a LNP containing EGFP mRNA was added to cells differentiated from iPSCs, and the introduction efficiency was confirmed.
(1) Induction to Cardiac Muscle Cell Lineage iPSCs (Ff-I14s04, obtained from Center for iPS Cell Research and Application, Kyoto University) subjected to maintenance culture in StemFit AK03N (Ajinomoto Co., Inc.) using a 10-cm dish coated with iMatrix-511 (Nippi, Incorporated) were treated with Stempro Accutase (Thermo Fischer Scientific Inc.) for around 5 minutes and then dissociated into single cells by pipetting. The medium was removed by centrifugal separation (1,000 rpm, 5 min), and $1 \times 10^7$ cells of the obtained cells were seeded per 30-mL bioreactor (ABLE). To medium obtained by excluding C liquid from StemFit AK03N (Ajinomoto Co., Inc., 400 mL of A liquid and 100 mL of B liquid of AK03N totaled to 500 mL) were added 1% L-glutamine, 150 µg/mL transferrin, 50 µg/mL ascorbic acid (Sigma-Aldrich Co. LLC.), $4 \times 10^{-4}$ M monothioglycerol, 10 µM Rock inhibitor (Y-27632), 2 ng/mL BMP4 (R&D Systems, Inc.), and 0.5% Matrigel (growth factor reduced). The cells were cultured at 37° C. under the condition of 5% oxygen (55 rpm, suspension spinner culture) to form embryoids (the zeroth day). On the next day (the first day), 45 µL of 10 µg/mL activin A (final concentration 15 ng/mL), 15 µL of 10 µg/mL bFGF (final concentration 5 ng/mL), and 54 µL of 10 µg/mL BMP4 (final concentration 20 ng/mL) were added to the bioreactor. The cells were cultured at 37° C. under the condition of 5% oxygen for further two days. Subsequently (on the third day), the obtained embryoids were collected in a 50-mL centrifuge tube and subjected to centrifugal separation (200 g, 1 min), and the medium was then removed. The embryoids were cultured in medium obtained by adding 1% L-glutamine, 150 µg/mL transferrin, 50 µg/mL ascorbic acid (Sigma-Aldrich Co. LLC.), $4 \times 10^{-4}$ M monothioglycerol, 10 ng/mL VEGF, 1 µM IWP-3, 0.6 µM Dorsomorphin, and 5.4 µM SB431542 to medium obtained by excluding the C liquid from StemFit AK03N (Ajinomoto Co., Inc., 400 mL of the A liquid and 100 mL of the B liquid of AK03N totaled to 500 mL) at 37° C. and under the condition of 5% oxygen (55 rpm, suspension spinner culture) for 3 days.

Subsequently (on the sixth day), the bioreactor was left to stand, the embryoids were sedimented, and 80 to 90% of the medium was removed. A medium obtained by excluding the C liquid from StemFit AK03N (Ajinomoto Co., Inc., 400 mL of the A liquid and 100 mL of the B liquid of AK03N totaled to 500 mL) supplemented with 1% L-glutamine, 150 µg/mL transferrin, 50 µg/mL ascorbic acid (Sigma-Aldrich Co. LLC.), $4 \times 10^{-4}$ M monothioglycerol, and 5 ng/mL VEGF was added in a total amount of 30 mL. The embryoids were cultured at 37° C. under the condition of 5% oxygen (55 rpm) until the tenth day. Then, the embryoids were moved to an Ultra Low Attachment 10-cm dish (Corning Incorporated) and cultured at 37° C. under the normal oxygen condition. The medium was exchanged for medium under the same conditions once every 2 to 3 days on and after the sixth day.

(2) RNA Transfection

The embryoids on the fifteenth day after the start of differentiation were treated with 100 µg/ml Liberase (F. Hoffmann-La Roche Ltd.) for 1 hour, washed with a D-PBS (−) solution (FUJIFILM Wako Pure Chemical Corporation) and then treated with TrypLE select (Thermo Fischer Scientific Inc.) for 10 minutes. Then, a medium obtained by excluding the C liquid from StemFit AK03N (Ajinomoto Co., Inc., 400 mL of the A liquid and 100 mL of the B liquid of AK03N totaled to 500 mL) supplemented with 1% L-glutamine, 150 µg/mL transferrin, 50 µg/mL ascorbic acid (Sigma-Aldrich Co. LLC.), $4 \times 10^{-4}$ M monothioglycerol, and 5 ng/mL VEGF was added in an equal amount, and the embryoids were dissociated into single cells by pipetting. The medium was removed by centrifugal separation (1,000 rpm, 5 min), and the obtained cells were suspended at $1 \times 10^6$ cells/ml in a medium obtained by excluding the C liquid from StemFit AK03N (Ajinomoto Co., Inc., 400 mL of the A liquid and 100 mL of B liquid of AK03N totaled to 500 mL) supplemented with 1% L-glutamine, 150 µg/mL transferrin, 50 µg/mL ascorbic acid (Sigma-Aldrich Co. LLC.), $4 \times 10^{-4}$ M monothioglycerol, and 5 ng/mL VEGF. The cell suspension was seeded into a 12-well plate coated with fibronectin (Sigma-Aldrich Co. LLC.) in an amount of 1 ml/well.

A Lipofectamine® MessengerMAX reagent and GFP mRNA (TriLink BioTechnologies, Inc.) were mixed into Opti-MEM medium (Thermo Fischer Scientific Inc.) according to the protocol attached to the Lipofectamine MessengerMAX (Thermo Fischer Scientific Inc.). The mixture was added to the above-mentioned cell suspension on the 12-well plate, followed by mixing. The cells were cultured in an incubator at 37° C. under the normal oxygen condition for 1 day.

The LNP containing mRNA (TriLink BioTechnologies, Inc.) and prepared using the compound (cationic lipid) of Synthesis Example 8, Synthesis Example 10, or Synthesis Example 11 in Preparation Example 8, Preparation Example 10, and Preparation Example 11 as mentioned above was added to the above-mentioned cell suspension on the 12-well plate, and the mixture was mixed in the same way. The cells were cultured in an incubator at 37° C. under the normal oxygen condition for 1 day.

(3) Analysis of Cells to which mRNA was Introduced

GFP expression was observed under a microscope (KEYENCE CORPORATION, BZ-X710) on the day following the transfection (FIG. 1). Subsequently, the cells were treated with trypsin/EDTA (Thermo Fischer Scientific Inc.) for 3 to 4 minutes to analyze introduction efficiency. An IMDM (Thermo Fischer Scientific Inc.) solution containing 50% FBS (Thermo Fischer Scientific Inc.) was added in an equal amount. After light pipetting, the mixture was collected into a 15-mL centrifuge tube and centrifuged (1,000 rpm, 5 min). The supernatant was removed, the resultant was then suspended in a D-PBS (−) solution (FUJIFILM Wako Pure Chemical Corporation) containing 2% FBS (Thermo Fischer Scientific Inc.), and the rate of GFP-positive cells was confirmed using flow cytometry (BD, FACS Aria Fusion) (FIG. 2).

INDUSTRIAL APPLICABILITY

A transfection method according to the present invention using a composition containing a specific compound (compound of the present invention), a structured lipid, and a nucleic acid enables introducing the nucleic acid to a cardiac muscle cell efficiently. Such a transfection method of the present invention can be applied to, for example, a method for purifying cardiac muscle cells in a cell population containing the cardiac muscle cells, in other words, a method for producing a cell population with high purity of cardiac muscle cells. The cell population with high purity of cardiac muscle cells obtained by these methods can be used for the treatment of heart diseases such as heart failure, ischemic heart disease, myocardial infarction, cardiomyopathy, myocarditis, hypertrophic cardiomyopathy, dilated phase of hypertrophic cardiomyopathy, and dilated cardiomyopathy.

Sequence Table Free Text

SEQ ID NO: 16 is a standard cardiac muscle cell-specific miRNA recognition sequence corresponding to has-miR-1 set forth in SEQ ID NO: 1.

SEQ ID NO: 17 is a standard cardiac muscle cell-specific miRNA recognition sequence corresponding to has-miR-22-5p set forth in SEQ ID NO: 2.

SEQ ID NO: 18 is a standard cardiac muscle cell-specific miRNA recognition sequence corresponding to has-miR-133a set forth in SEQ ID NO: 3.

SEQ ID NO: 19 is a standard cardiac muscle cell-specific miRNA recognition sequence corresponding to has-miR-133b set forth in SEQ ID NO: 4.

SEQ ID NO: 20 is a standard cardiac muscle cell-specific miRNA recognition sequence corresponding to has-miR-143-3p set forth in SEQ ID NO: 5.

SEQ ID NO: 21 is a standard cardiac muscle cell-specific miRNA recognition sequence corresponding to has-miR-145-3p set forth in SEQ ID NO: 6.

SEQ ID NO: 22 is a standard cardiac muscle cell-specific miRNA recognition sequence corresponding to has-miR-208a-3p set forth in SEQ ID NO: 7.

SEQ ID NO: 23 is a standard cardiac muscle cell-specific miRNA recognition sequence corresponding to has-miR-208b-3p set forth in SEQ ID NO: 8.

SEQ ID NO: 24 is a standard cardiac muscle cell-specific miRNA recognition sequence corresponding to has-miR-490-3p set forth in SEQ ID NO: 9.

SEQ ID NO: 25 is a standard cardiac muscle cell-specific miRNA recognition sequence corresponding to has-miR-490-5p set forth in SEQ ID NO: 10.

SEQ ID NO: 26 is a standard cardiac muscle cell-specific miRNA recognition sequence corresponding to has-miR-499a-5p set forth in SEQ ID NO: 11.

SEQ ID NO: 27 is a standard cardiac muscle cell-specific miRNA recognition sequence corresponding to has-miR-1271-5p set forth in SEQ ID NO: 12.

SEQ ID NO: 28 is a standard cardiac muscle cell-specific miRNA recognition sequence corresponding to has-miR-3907 set forth in SEQ ID NO: 13.

SEQ ID NO: 29 is a standard cardiac muscle cell-specific miRNA recognition sequence corresponding to has-miR-4324 set forth in SEQ ID NO: 14.

SEQ ID NO: 30 is a standard cardiac muscle cell-specific miRNA recognition sequence corresponding to has-let-7e-5p set forth in SEQ ID NO: 15.

The invention claimed is:

1. A method for transfection of a nucleic acid into a cardiac muscle cell, comprising a step of contacting a composition comprising:

1) A compound represented by the formula (I):

[Formula 1]

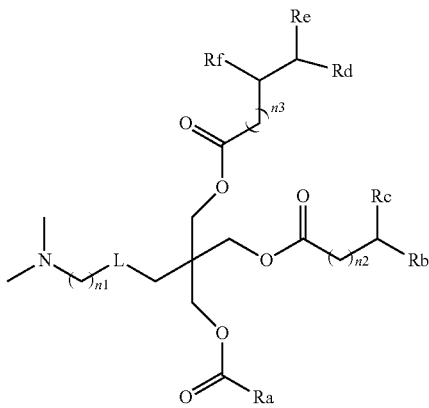

wherein n1 represents an integer of 2 to 6, n2 represents an integer of 0 to 2, n3 represents an integer of 0 to 2, L represents —C(O)O—, Ra represents a linear $C_{5-13}$ alkyl group, Rb represents a linear $C_{2-9}$ alkyl group, Rc represents a hydrogen atom, Rd represents a linear $C_{2-9}$ alkyl group, Re represents a linear $C_{2-9}$ alkyl group, and Rf represents a linear $C_{2-9}$ alkyl group, or a salt thereof;

2) A structured lipid; and

3) A nucleic acid, with a cell population comprising cardiac muscle cells.

2. The method according to claim 1, wherein the nucleic acid is an mRNA.

3. The method according to claim 2, wherein the mRNA comprises:

(i) a cardiac muscle cell-specific miRNA-responsive mRNA comprising: a nucleotide sequence specifically recognized by miRNA specifically expressed in the cardiac muscle cells; and a nucleotide sequence encoding a functional gene; and/or (ii) an mRNA comprising a nucleotide sequence encoding a functional gene.

4. The method according to claim 2, wherein the mRNA comprises:

(i) a ventricular muscle cell-specific miRNA-responsive mRNA comprising: a nucleotide sequence specifically recognized by miRNA specifically expressed in ventricular muscle cells; and a nucleotide sequence encoding a functional gene; and/or (ii) an mRNA comprising a nucleotide sequence encoding a functional gene.

5. The method according to claim 3 or 4, wherein the functional genes of the (i) and the (ii) are each independently one or more genes selected from the group consisting of a drug resistance gene, a gene encoding a fluorescent protein, an apoptosis-inducing gene, and a suicide gene.

6. The method according to claim 1, wherein the cell population comprising the cardiac muscle cells is a cell population comprising cardiac muscle cells differentiated from induced pluripotent stem cells or embryonic stem cells.

* * * * *

```
                              SEQUENCE LISTING

<160> NUMBER OF SEQ ID NOS: 30

<210> SEQ ID NO 1
<211> LENGTH: 22
<212> TYPE: RNA
<213> ORGANISM: Homo sapiens

<400> SEQUENCE: 1
uggaauguaa agaaguaugu au                                                  22

<210> SEQ ID NO 2
<211> LENGTH: 22
<212> TYPE: RNA
<213> ORGANISM: Homo sapiens

<400> SEQUENCE: 2
aguucuucag uggcaagcuu ua                                                  22

<210> SEQ ID NO 3
<211> LENGTH: 22
<212> TYPE: RNA
<213> ORGANISM: Homo sapiens

<400> SEQUENCE: 3
uuuggucccc uucaaccagc ug                                                  22

<210> SEQ ID NO 4
<211> LENGTH: 22
<212> TYPE: RNA
<213> ORGANISM: Homo sapiens

<400> SEQUENCE: 4
uuuggucccc uucaaccagc ua                                                  22

<210> SEQ ID NO 5
<211> LENGTH: 21
<212> TYPE: RNA
<213> ORGANISM: Homo sapiens

<400> SEQUENCE: 5
ugagaugaag cacuguagcu c                                                   21
```

```
<210> SEQ ID NO 6
<211> LENGTH: 22
<212> TYPE: RNA
<213> ORGANISM: Homo sapiens

<400> SEQUENCE: 6
ggauuccugg aaauacuguu cu                                              22

<210> SEQ ID NO 7
<211> LENGTH: 22
<212> TYPE: RNA
<213> ORGANISM: Homo sapiens

<400> SEQUENCE: 7
auaagacgag caaaaagcuu gu                                              22

<210> SEQ ID NO 8
<211> LENGTH: 22
<212> TYPE: RNA
<213> ORGANISM: Homo sapiens

<400> SEQUENCE: 8
auaagacgaa caaaagguuu gu                                              22

<210> SEQ ID NO 9
<211> LENGTH: 22
<212> TYPE: RNA
<213> ORGANISM: Homo sapiens

<400> SEQUENCE: 9
caaccuggag gacuccaugc ug                                              22

<210> SEQ ID NO 10
<211> LENGTH: 20
<212> TYPE: RNA
<213> ORGANISM: Homo sapiens

<400> SEQUENCE: 10
ccauggaucu ccaggugggu                                                 20

<210> SEQ ID NO 11
<211> LENGTH: 21
<212> TYPE: RNA
<213> ORGANISM: Homo sapiens

<400> SEQUENCE: 11
uuaagacuug cagugauguu u                                               21

<210> SEQ ID NO 12
<211> LENGTH: 22
<212> TYPE: RNA
<213> ORGANISM: Homo sapiens

<400> SEQUENCE: 12
cuuggcaccu agcaagcacu ca                                              22

<210> SEQ ID NO 13
<211> LENGTH: 22
<212> TYPE: RNA
<213> ORGANISM: Homo sapiens

<400> SEQUENCE: 13
aggugcucca ggcuggcuca ca                                              22
```

-continued

<210> SEQ ID NO 14
<211> LENGTH: 20
<212> TYPE: RNA
<213> ORGANISM: Homo sapiens

<400> SEQUENCE: 14
cccugagacc cuaaccuuaa                                                    20

<210> SEQ ID NO 15
<211> LENGTH: 22
<212> TYPE: RNA
<213> ORGANISM: Homo sapiens

<400> SEQUENCE: 15
ugagguagga gguuguauag uu                                                 22

<210> SEQ ID NO 16
<211> LENGTH: 22
<212> TYPE: RNA
<213> ORGANISM: Unknown
<220> FEATURE:
<223> OTHER INFORMATION: Standard sequence recognized by the
      cardiomyocyte specific miRNA has-miR-1 represented by the SEQ ID
      NO.1

<400> SEQUENCE: 16
auacauacuu cuuuacauuc ca                                                 22

<210> SEQ ID NO 17
<211> LENGTH: 22
<212> TYPE: RNA
<213> ORGANISM: Unknown
<220> FEATURE:
<223> OTHER INFORMATION: Standard sequence recognized by the
      cardiomyocyte specific miRNA has-miR-22-5p represented by the SEQ
      ID NO.2

<400> SEQUENCE: 17
uaaagcuugc cacugaagaa cu                                                 22

<210> SEQ ID NO 18
<211> LENGTH: 22
<212> TYPE: RNA
<213> ORGANISM: Unknown
<220> FEATURE:
<223> OTHER INFORMATION: Standard sequence recognized by the
      cardiomyocyte specific miRNA has-miR-133a represented by the SEQ
      ID NO.3

<400> SEQUENCE: 18
cagcugguug aagggggacca aa                                                22

<210> SEQ ID NO 19
<211> LENGTH: 22
<212> TYPE: RNA
<213> ORGANISM: Unknown
<220> FEATURE:
<223> OTHER INFORMATION: Standard sequence recognized by the
      cardiomyocyte specific miRNA has-miR-133b represented by the SEQ
      ID NO.4

<400> SEQUENCE: 19
uagcugguug aagggggacca aa                                                22

<210> SEQ ID NO 20
<211> LENGTH: 21

```
<212> TYPE: RNA
<213> ORGANISM: Unknown
<220> FEATURE:
<223> OTHER INFORMATION: Standard sequence recognized by the
      cardiomyocyte specific miRNA has-miR-143-3p represented by the SEQ
      ID NO.5

<400> SEQUENCE: 20
gagcuacagu gcuucaucuc a                                               21

<210> SEQ ID NO 21
<211> LENGTH: 22
<212> TYPE: RNA
<213> ORGANISM: Unknown
<220> FEATURE:
<223> OTHER INFORMATION: Standard sequence recognized by the
      cardiomyocyte specific miRNA has-miR-145-3p represented by the SEQ
      ID NO.6

<400> SEQUENCE: 21
agaacaguau uuccaggaau cc                                              22

<210> SEQ ID NO 22
<211> LENGTH: 22
<212> TYPE: RNA
<213> ORGANISM: Unknown
<220> FEATURE:
<223> OTHER INFORMATION: Standard sequence recognized by the
      cardiomyocyte specific miRNA has-miR-208a-3p represented by the
      SEQ ID NO.7

<400> SEQUENCE: 22
acaagcuuuu ugcucgucuu au                                              22

<210> SEQ ID NO 23
<211> LENGTH: 22
<212> TYPE: RNA
<213> ORGANISM: Unknown
<220> FEATURE:
<223> OTHER INFORMATION: Standard sequence recognized by the
      cardiomyocyte specific miRNA has-miR-208b represented by the SEQ
      ID NO.8

<400> SEQUENCE: 23
acaaaccuuu uguucgucuu au                                              22

<210> SEQ ID NO 24
<211> LENGTH: 22
<212> TYPE: RNA
<213> ORGANISM: Unknown
<220> FEATURE:
<223> OTHER INFORMATION: Standard sequence recognized by the
      cardiomyocyte specific miRNA has-miR-490-3p represented by the SEQ
      ID NO.9

<400> SEQUENCE: 24
cagcauggag uccuccaggu ug                                              22

<210> SEQ ID NO 25
<211> LENGTH: 20
<212> TYPE: RNA
<213> ORGANISM: Unknown
<220> FEATURE:
<223> OTHER INFORMATION: Standard sequence recognized by the
      cardiomyocyte specific miRNA has-miR-490-5p represented by the SEQ
      ID NO.10
```

-continued

<400> SEQUENCE: 25
acccaccugg agauccaugg                                                   20

<210> SEQ ID NO 26
<211> LENGTH: 21
<212> TYPE: RNA
<213> ORGANISM: Unknown
<220> FEATURE:
<223> OTHER INFORMATION: Standard sequence recognized by the
      cardiomyocyte specific miRNA has-miR-499a-5p represented by the
      SEQ ID NO.11

<400> SEQUENCE: 26
aaacaucacu gcaagucuua a                                                 21

<210> SEQ ID NO 27
<211> LENGTH: 22
<212> TYPE: RNA
<213> ORGANISM: Unknown
<220> FEATURE:
<223> OTHER INFORMATION: Standard sequence recognized by the
      cardiomyocyte specific miRNA has-miR-1271-5p represented by the
      SEQ ID NO.12

<400> SEQUENCE: 27
ugagugcuug cuaggugcca ag                                                22

<210> SEQ ID NO 28
<211> LENGTH: 22
<212> TYPE: RNA
<213> ORGANISM: Unknown
<220> FEATURE:
<223> OTHER INFORMATION: Standard sequence recognized by the
      cardiomyocyte specific miRNA has-miR-3907 represented by the SEQ
      ID NO.13

<400> SEQUENCE: 28
ugugagccag ccuggagcac cu                                                22

<210> SEQ ID NO 29
<211> LENGTH: 20
<212> TYPE: RNA
<213> ORGANISM: Unknown
<220> FEATURE:
<223> OTHER INFORMATION: Standard sequence recognized by the
      cardiomyocyte specific miRNA has-miR-4324 represented by the SEQ
      ID NO.14

<400> SEQUENCE: 29
uuaagguuag ggucucaggg                                                   20

<210> SEQ ID NO 30
<211> LENGTH: 22
<212> TYPE: RNA
<213> ORGANISM: Unknown
<220> FEATURE:
<223> OTHER INFORMATION: Standard sequence recognized by the
      cardiomyocyte specific miRNA has-let-7e-5p represented by the SEQ
      ID NO.15

<400> SEQUENCE: 30
aacuauacaa ccuccuaccu ca                                                22